United States Patent
Negishi

(10) Patent No.: US 9,643,880 B2
(45) Date of Patent: May 9, 2017

(54) OPTICAL GLASS AND USE THEREOF

(71) Applicant: HOYA CORPORATION, Tokyo (JP)

(72) Inventor: Tomoaki Negishi, Akishima (JP)

(73) Assignee: HOYA CORPORATION, Tokyo (JP)

( * ) Notice: Subject to any disclaimer, the term of this patent is extended or adjusted under 35 U.S.C. 154(b) by 0 days.

(21) Appl. No.: 14/911,340

(22) PCT Filed: Aug. 22, 2014

(86) PCT No.: PCT/JP2014/071966
§ 371 (c)(1),
(2) Date: Feb. 10, 2016

(87) PCT Pub. No.: WO2015/025943
PCT Pub. Date: Feb. 26, 2015

(65) Prior Publication Data
US 2016/0194237 A1    Jul. 7, 2016

(30) Foreign Application Priority Data

Aug. 23, 2013  (JP) ................................. 2013-173998

(51) Int. Cl.
*C03C 3/068* (2006.01)
*G02B 1/00* (2006.01)
*G02B 27/00* (2006.01)

(52) U.S. Cl.
CPC ................ *C03C 3/068* (2013.01); *G02B 1/00* (2013.01); *G02B 27/0025* (2013.01)

(58) Field of Classification Search
CPC ..................................................... C03C 3/068
See application file for complete search history.

(56) References Cited

U.S. PATENT DOCUMENTS

| | | | |
|---|---|---|---|
| 4,439,531 A * | 3/1984 | Mennemann | C03C 3/068 501/75 |
| 4,584,279 A | 4/1986 | Grabowski et al. | |
| 2004/0145815 A1 * | 7/2004 | Endo | C03C 3/066 359/642 |
| 2009/0197754 A1 * | 8/2009 | Uehara | C03C 3/068 501/42 |
| 2009/0325779 A1 | 12/2009 | Negishi et al. | |
| 2011/0263410 A1 | 10/2011 | Negishi et al. | |
| 2015/0045204 A1 * | 2/2015 | Negishi | C03C 3/068 501/78 |
| 2015/0203395 A1 * | 7/2015 | Kuang | C03C 3/068 501/78 |

FOREIGN PATENT DOCUMENTS

| | | |
|---|---|---|
| JP | S60-33229 A | 2/1985 |
| JP | S60-131845 A | 7/1985 |
| JP | 2010030879 A | 2/2010 |
| WO | 2010053214 A1 | 5/2010 |

OTHER PUBLICATIONS

Nov. 18, 2014 International Search Report issued in International Patent Application No. PCT/JP2014/071966.
Mar. 3, 2016 International Preliminary Report on Patentability issued in International Patent Application No. PCT/JP2014/071966.
Aug. 2, 2016 Office Action issued in Japanese Patent Application No. 2013-173998.
Jan. 12, 2017 Office Action issued in Korean Patent Application No. 10-2016-7003954.

* cited by examiner

*Primary Examiner* — Elizabeth A Bolden
(74) *Attorney, Agent, or Firm* — Oliff PLC

(57) ABSTRACT

An optical glass that is oxide glass, containing $Si^{4+}$, $B^{3+}$, $La^{3+}$, $Ti^{4+}$, $Nb^{5+}$, and $Zr^{4+}$; containing, denoted as cation %, $Si^{4+}$ and $B^{3+}$ of 5 to 55% in total, $La^{3+}$ of 10 to 50%, with a total content of $La^{3+}$, $Gd^{3+}$, $Y^{3+}$ and $Yb^{3+} \leq 70\%$, and $Ti^{4+}$, $Nb^{5+}$, $Ta^{5+}$ and $W^{6+}$ of 22 to 55% in total, with a content of $Ti^{4+} \leq 22\%$, wherein $[Si^{4+}/(Si^{4+}+B^{3+})] \leq 0.40$; the total content of $La^{3+}$, $Gd^{3+}$, $Y^{3+}$, $Yb^{3+}$, $Zr^{4+}$, $Ti^{4+}$, $Nb^{5+}$, $Ta^{5+}$, $W^{6+}$ and $Bi^{3+} \geq 65\%$; $[Y^{3+}/(La^{3+}+Gd^{3+}+Y^{3+}+Yb^{3+})] \leq 0.12$; $[Ba^{2+}/(La^{3+}+Gd^{3+}+Y^{3+}+Yb^{3+})] \leq 0.40$; $[(Zr^{4+}+Ti^{4+}+Nb^{5+}+Ta^{5+}+W^{6+})/Zr^{4+}] \geq 2$; $(Ti^{4+}/B^{3+}) \geq 0.85$; and an Abbé number vd is in a range from 23 to 35, and a refractive index nd satisfies $nd \geq 2.205-(0.0062 \times vd)$.

6 Claims, No Drawings

OPTICAL GLASS AND USE THEREOF

CROSS-REFERENCE TO RELATED APPLICATIONS

This application claims the benefit of priority to Japanese Patent Application No. 2013-173998 filed on Aug. 23, 2013, which is expressly incorporated herein by reference in its entirety.

TECHNICAL FIELD

The present invention relates to optical glass having a high refractive index and a low dispersion property, to a press-molding glass gob and an optical element blank which are comprised of the optical glass, and to an optical element.

BACKGROUND ART

Lenses made of high refractive index and low dispersion glass make it possible, by being combined with a lens made of hyper low dispersion glass, to downsize an optical system while correcting chromatic aberration, and thus the lenses occupy a very important place as an optical element constituting an imaging optical system and projection optical system such as a projector.

In Literature 1 (Japanese Unexamined Patent Publication (KOKAI) Showa No. 60-33229), which is expressly incorporated herein by reference in its entirety, high refractive index and low dispersion glass having a refractive index of 1.90 to 2.10, and an Abbé number vd of 22 to 35 is disclosed although the glass is not an optical element material for an imaging optical system or a projection optical system.

In contrast, in Literature 2 (Japanese Unexamined Patent Publication (KOKAI) Showa No. 60-131845) or English language family member U.S. Pat. No. 4,584,279, which are expressly incorporated herein by reference in their entirety, optical glass having a refractive index equal to or higher than 1.90, and an Abbé number equal to or higher than 25 is disclosed.

SUMMARY OF THE INVENTION

Regarding optical properties of optical glass, when plotting the change in optical properties in the case where a glass composition of the conventional optical glass is changed, on a graph referred to as an optical property chart obtained by defining the Abbé number vd on the horizontal axis (the Abbé number vd decreases as it moves from left side to right side) and defining the refractive index nd on the vertical axis (the refractive index nd increases as it moves from the lower side to the upper side), plots are distributed within a belt-shaped range that goes from the lower left toward the upper right of the optical property chart. When the composition is changed so as to obtain optical properties belonging to ranges of upper left than the belt-shaped range that goes from the lower left toward the upper right of the optical property chart, the stability of the glass is lowered, with the result that the glass tends to be devitrified or not to become vitrified.

In contrast, from the viewpoint of use, high refractive index and low dispersion optical glass that shows a refractive index nd and an Abbé number vd in the upper left ranges of the optical property chart can be a glass material for an optical element that is effective for high functionalization and downsizing of an optical system.

However, generally, in the conventional high refractive index and low dispersion glasses having compositions that are described in Literatures 1 and 2, glass having a higher refractive index can be obtained along with the decrease in the Abbé number vd. In contrast, in these conventional high refractive index and low dispersion glass, when enhancing the refractive index while maintaining the Abbé number vd, the stability of the glass tends to be lowered, with the result that the glass tends not to become vitrified.

Accordingly, it is very significant to provide optical glass that exhibits a refractive index nd and an Abbé number vd in the upper left range of the optical property chart while maintaining the glass stability.

An aspect of the present invention provides for optical glass having excellent stability while it is high refractive index and low dispersion glass.

The present inventors have conducted extensive research, and as the result, have found that optical glass with high stability was able to be obtained by adjustment of the glass composition although the optical glass was high refractive index and low dispersion glass.

An aspect of the present invention relates to optical glass that is oxide glass:

containing $Si^{4+}$, $B^{3+}$, $La^{3+}$, $Ti^{4+}$, $Nb^{5+}$, and $Zr^{4+}$ as essential components;

containing, denoted as cation %;

$Si^{4+}$ and $B^{3+}$ of 5 to 55% in total, $La^{3+}$ of 10 to 50%, with a total content of $La^{3+}$, $Gd^{3+}$, $Y^{3+}$ and $Yb^{3+}$ being equal to or less than 70%, and $Ti^{4+}$, $Nb^{5+}$, $Ta^{5+}$ and $W^{6+}$ of 22 to 55% in total, with a content of $Ti^{4+}$ being equal to or less than 22%, wherein:

a cation ratio of a content of $Si^{4+}$ to the total content of $Si^{4+}$ and $B^{3+}[Si^{4+}/(Si^{4+}+B^{3+})]$ is equal to or less than 0.40;

the total content of $La^{3+}$, $Gd^{3+}$, $Y^{3+}$, $Yb^{3+}$, $Zr^{4+}$, $Ti^{4+}$, $Nb^{5+}$, $Ta^{5+}$, $W^{6+}$ and $Bi^{3+}$ is equal to or more than 65%;

a cation ratio of a content of $Y^{3+}$ to the total content of $La^{3+}$, $Gd^{3+}$, $Y^{3+}$ and $Yb^{3+}[Y^{3+}/(La^{3+}+Gd^{3+}+Y^{3+}+Yb^{3+})]$ is equal to or less than 0.12;

a cation ratio of a content of $Ba^{2+}$ to the total content of $La^{3+}$, $Gd^{3+}$, $Y^{3+}$ and $Yb^{3+}[Ba^{2+}/(La^{3+}+Gd^{3+}+Y^{3+}+Yb^{3+})]$ is equal to or less than 0.40;

a cation ratio of the total content of $Zr^{4+}$, $Ti^{4+}$, $Nb^{5+}$, $Ta^{5+}$ and $W^{6+}$ to a content of $Zr^{4+}[(Zr^{4+}+Ti^{4+}+Nb^{5+}+Ta^{5+}+W^{6+})/Zr^{4+}]$ is equal to or more than 2;

a cation ratio of a content of $Ti^{4+}$ to a content of $B^{3+}(Ti^{4+}/B^{3+})$ is equal to or more than 0.85; and an Abbé number vd is in a range from 23 to 35, and a refractive index nd satisfies Expression (1) below, $$nd \geq 2.205 - (0.0062 \times vd) \quad (1).$$

Another aspect of the present invention relates to optical glass that is oxide glass:

containing $Si^{4+}$, $B^{3+}$, $La^{3+}$, $Ti^{4+}$, $Nb^{5+}$, and $Zr^{4+}$ as essential components;

containing, denoted as cation %;

$Si^{4+}$ and $B^{3+}$ of 5 to 55% in total, $La^{3+}$ of 10 to 50%, with a total content of $La^{3+}$, $Gd^{3+}$, $Y^{3+}$ and $Yb^{3+}$ being equal to or less than 70%, $Ti^{4+}$, $Nb^{5+}$, $Ta^{5+}$ and $W^{6+}$ of 23 to 70% in total, with a content of $Ti^{4+}$ being more than 22%, wherein:

a cation ratio of a content of $Y^{3+}$ to the total content of $La^{3+}$, $Gd^{3+}$, $Y^{3+}$ and $Yb^{3+}[Y^{3+}/(La^{3+}+Gd^{3+}+Y^{3+}+Yb^{3+})]$ is equal to or less than 0.14;

a cation ratio of a content of $Ba^{2+}$ to the total content of $La^{3+}$, $Gd^{3+}$, $Y^{3+}$ and $Yb^{3+}[Ba^{2+}/(La^{3+}+Gd^{3+}+Y^{3+}+Yb^{3+})]$ is equal to or less than 0.40;

a cation ratio of the total content of $Zr^{4+}$, $Ti^{4+}$, $Nb^{5+}$, $Ta^{5+}$ and $W^{6+}$ to a content of $Zr^{4+}[(Zr^{4+}+Ti^{4+}+Nb^{5+}+Ta^{5+}+W^{6+})/Zr^{4+}]$ is equal to or more than 2;

a cation ratio of a content of $Ti^{4+}$ to a content of $B^{3+}(Ti^{4+}/B^{3+})$ is equal to or more than 0.85; and an Abbé number νd is in a range from equal to or more than 18 to less than 35, and a refractive index nd satisfies Expression (2) below, $$nd \geq 2.540 - (0.02 \times \nu d) \qquad (2).$$

A further aspect of the present invention relates to a press-molding glass gob, which is comprised of the optical glass of the above-described aspect.

A further aspect of the present invention relates to an optical element blank, which is comprised of the optical glass of the above-described aspect.

A further aspect of the present invention relates to an optical element, which is comprised of the optical glass of the above-described aspect.

According to an aspect of the present invention, optical glass having excellent glass stability can be provided while it is high refractive index and low dispersion glass. In addition, a press-molding glass gob, an optical element blank and an optical element comprised of the above-described optical glass can be provided.

With the above-described optical element, and optical elements produced from the press-molding glass gob or the optical element blank, for example, a lens, a compact optical system for chromatic aberration correction can also be provided by being combined with a lens made of high refractive index and high dispersion glass.

MODE FOR CARRYING OUT THE INVENTION

[Optical Glass I]

An aspect of the optical glass of the present invention (hereinafter, referred to as "optical glass I") is optical glass that is oxide glass, containing $Si^{4+}$, $B^{3+}$, $La^{3+}$, $Ti^{4+}$, $Nb^{5+}$, and $Zr^{4+}$ as essential components; containing, denoted as cation %, $Si^{4+}$ and $B^{3+}$ of 5 to 55% in total, $La^{3+}$ of 10 to 50%, with a total content of $La^{3+}$, $Gd^{3+}$, $Y^{3+}$ and $Yb^{3+}$ being equal to or less than 70%, and $Ti^{4+}$, $Nb^{5+}$, $Ta^{5+}$ and $W^{6+}$ of 22 to 55% in total, with a content of $Ti^{4+}$ being equal to or less than 22%, wherein:

a cation ratio of a content of $Si^{4+}$ to the total content of $Si^{4+}$ and $B^{3+}[Si^{4+}/Si^{4+}+B^{3+})]$ is equal to or less than 0.40;

the total content of $La^{3+}$, $Gd^{3+}$, $Y^{3+}$, $Yb^{3+}$, $Zr^{4+}$, $Ti^{4+}$, $Nb^{5+}$, $Ta^{5+}$, $W^{6+}$ and $Bi^{3+}$ is equal to or more than 65%;

a cation ratio of a content of $Y^{3+}$ to the total content of $La^{3+}$, $Gd^{3+}$, $Y^{3+}$ and $Yb^{3+}[Y^{3+}/(La^{3+}+Gd^{3+}+Y^{3+}+Yb^{3+})]$ is equal to or less than 0.12;

a cation ratio of a content of $Ba^{2+}$ to the total content of $La^{3+}$, $Gd^{3+}$, $Y^{3+}$ and $Yb^{3+}[Ba^{2+}/(La^{3+}+Gd^{3+}+Y^{3+}+Yb^{3+})]$ is equal to or less than 0.40;

a cation ratio of the total content of $Zr^{4+}$, $Ti^{4+}$, $Nb^{5+}$, $Ta^{5+}$ and $W^{6+}$ to a content of $Zr^{4+}[(Zr^{4+}+Ti^{4+}+Nb^{5+}+Ta^{5+}+W^{6+})/Zr^{4+}]$ is equal to or more than 2;

a cation ratio of a content of $Ti^{4+}$ to a content of $B^{3+}(Ti^{4+}/B^{3+})$ is equal to or more than 0.85; and an Abbé number νd is in a range from 23 to 35, and a refractive index nd satisfies Expression (1) below, $$nd \geq 2.205 - (0.0062 \times \nu d) \qquad (1).$$

Another aspect of the optical glass of the present invention (optical glass II) will be described later.

The optical glass I will be further explained in detail below.

Hereinafter, the reason why the composition is specified to the above-described range will be explained, and unless otherwise noted, the content of each component and the total content will be denoted as cation %.

$Si^{4+}$ and $B^{3+}$ are network-forming components and have a function of maintaining glass stability. When the total content of $Si^{4+}$ and $B^{3+}$ is less than 5%, the glass stability deteriorates and liquidus temperature rises, and when the total content exceeds 55%, the realization of a desired refractive index becomes difficult. Accordingly, the total content of $Si^{4+}$ and $B^{3+}$ is set to 5 to 55%. A preferable upper limit of the total content of $Si^{4+}$ and $B^{3+}$ is 50%, more preferable upper limit is 45%, still more preferable upper limit is 40%, further preferable upper limit is 35% and further more preferable upper limit is 30%, and a preferable lower limit of the total content of $Si^{4+}$ and $B^{3+}$ is 10%, more preferable lower limit is 13%, still more preferable lower limit is 15%, further preferable lower limit is 18% and further more preferable lower limit is 20%.

$Si^{4+}$ is an essential component that is effective for maintaining viscosity suitable for molding molten glass and improving chemical durability, in addition to the above-described function. In order to effectively obtain the above-described functions, the content thereof is preferably equal to or more than 1%. In contrast, in order to suppress the rise of liquidus temperature and glass transition temperature while obtaining a desired refractive index, the content of $Si^{4+}$ is preferably equal to or less than 30%. In addition, also from the viewpoint of realizing a desired Abbé number, maintaining melting properties, and improving resistance to devitrification of glass, the content of $Si^{4+}$ is preferably equal to or less than 30%. Accordingly, the content of $Si^{4+}$ is preferably set in the range from 1 to 30%. A more preferable upper limit of the content of $Si^{4+}$ is 25%, a still more preferable upper limit is 20%, a further preferable upper limit is 18%, a further more preferable upper limit is 15%, and a still further more preferable upper limit is 12%. From the viewpoint of preferably obtaining the effect of containing the above $Si^{4+}$, a more preferable lower limit of the content of $Si^{4+}$ is 2%, a still more preferable lower limit is 3%, a further preferable lower limit is 4%, a further more preferable lower limit is 5%, and a still further more preferable lower limit is 6%.

$B^{3+}$ is an essential component that is effective for maintaining melting properties, lowering liquidus temperature, and realizing low dispersion of glass, in addition to the above-described function. In order to effectively obtain the above-described functions, the content thereof is preferably equal to or more than 1%. The fact that the content of $B^{3+}$ is equal to or more than 1% is preferable also from the viewpoint of glass stability. In contrast, from the viewpoint of maintaining good chemical durability and the like while obtaining a desired refractive index, the content of $B^{3+}$ is preferably equal to or less than 50%. Accordingly, the content of $B^{3+}$ is preferably set in the range from 1 to 50%. A more preferable upper limit of $B^{3+}$ is 40%, a still more preferable upper limit is 35%, a further preferable upper limit is 30%, a further more preferable upper limit is 25%, a still further more preferable upper limit is 22% and a particularly further more preferable upper limit is 20%; and a more preferable lower limit of the content of $B^{3+}$ is 3%, a still more preferable lower limit is 5%, a further preferable lower limit is 7%, a further more preferable lower limit is 9%, and a still further more preferable lower limit is 11%.

When the cation ratio of the content of $Si^{4+}$ to the total content of $Si^{4+}$ and $B^{3+}[Si^{4+}/Si^{4+}+B^{3+})]$ exceeds 0.40, it becomes difficult to obtain desired optical properties while maintaining glass stability, and in addition, melting properties are lowered and melting of glass starting materials become difficult. Accordingly, in the optical glass I, the cation ratio [$Si^{4+}/(Si^{4+}+B^{3+})$] is set to be equal to or less than 0.40. For the above-described reason, a preferable upper limit of the cation ratio [$Si^{4+}/(Si^{4+}+B^{3+})$] is 0.38, a more preferable upper limit is 0.36, a still more preferable upper limit is 0.35, a further preferable upper limit is 0.34, and a further more preferable upper limit is 0.32. Since the optical glass I contains $Si^{4+}$ and $B^{3+}$ as essential components, lower limit of the cation ratio [$Si^{4+}/(Si^{4+}+B^{3+})$] is more than 0 From the viewpoint of improving glass stability and setting the viscosity of molten glass to be viscosity that is suitable for molding, a preferable lower limit of the cation ratio [$Si^{4+}/(Si^{4+}+B^{3+})$] is 0.10, a more preferable lower limit is 0.14, a still more preferable lower limit is 0.17, a further preferable lower limit is 0.20, and a further more preferable lower limit is 0.23.

$La^{3+}$ is an essential component that is excellent in the function of achieving a high refractive index and low dispersion while maintaining glass stability, and is a component that has also the function of improving chemical durability. When the content of $La^{3+}$ is less than 10%, it becomes difficult to obtain the above-described effect, and when the content of $La^{3+}$ exceeds 50%, resistance to devitrification deteriorates and liquidus temperature rises. Accordingly, the content of $La^{3+}$ is set to 10 to 50%. A preferable upper limit of the content of $La^{3+}$ is 45%, a more preferable upper limit is 40%, a further preferable upper limit is 35% and a further more preferable upper limit is 33%; and a preferable lower limit of the content of $La^{3+}$ is 15%, a more preferable lower limit is 18%, a still more preferable lower limit is 20%, a further preferable lower limit is 22% and a further more preferable lower limit is 24%.

$Gd^{3+}$, $Y^{3+}$ and $Yb^{3+}$ are, as in the case of $La^{3+}$, components that can achieve high refractive index and low dispersion, and have also the functions of improving chemical durability. When the total content of $La^{3+}$, $Gd^{3+}$, $Y^{3+}$ and $Yb^{3+}$ exceeds 70%, glass stability deteriorates and liquidus temperature rises. Accordingly, the total content of $La^{3+}$, $Gd^{3+}$, $Y^{3+}$ and $Yb^{3+}$ is set to be equal to or less than 70%. A preferable upper limit of the total content of $La^{3+}$, $Gd^{3+}$, $Y^{3+}$ and $Yb^{3+}$ is 60%, a more preferable upper limit is 50%, a still more preferable upper limit is 45%, a further preferable upper limit is 40%, and a further more preferable upper limit is 38%. From the viewpoint of achieving a desired refractive index and Abbé number, a preferable lower limit of the total content of $La^{3+}$, $Gd^{3+}$, $Y^{3+}$ and $Yb^{3+}$ is 11%, a more preferable lower limit is 15%, a still more preferable lower limit is 20%, a further preferable lower limit is 23%, a further more preferable lower limit is 25%, a still further more preferable lower limit is 28%, and a particularly preferable lower limit is 30%.

In the optical glass I, in order to achieve high refractive index and low dispersion while maintaining glass stability and suppressing the rise of liquidus temperature, the cation ratio of the content of $Y^{3+}$ to the total content of $La^{3+}$, $Gd^{3+}$, $Y^{3+}$ and $Yb^{3+}$ [$Y^{3+}/(La^{3+}+Gd^{3+}+Y^{3+}+Yb^{3+})$] is set to be equal to or less than 0.12. A preferable upper limit of the cation ratio [$Y^{3+}/(La^{3+}+Gd^{3+}+Y^{3+}+Yb^{3+})$] is 0.11, a more preferable upper limit is 0.10, a still more preferable upper limit is 0.08, a further preferable upper limit is 0.04 and a further more preferable upper limit is 0.02. The cation ratio [$Y^{3+}/(La^{3+}+Gd^{3+}+Y^{3+}+Yb^{3+})$] can also be set to 0.

From the viewpoint of lowering liquidus temperature and improving resistance to devitrification, a preferable upper limit of the content of $Gd^{3+}$ is 20%, a more preferable upper limit is 15%, a still more preferable upper limit is 10%, a further preferable upper limit is 8%, and a further more preferable upper limit is 6%. A preferable lower limit of the content of $Gd^{3+}$ is 0.5%, a more preferable lower limit is 1%, a further preferable lower limit is 2%, and a further more preferable lower limit is 3%. The content of $Gd^{3+}$ can also be set to 0%.

A preferable upper limit of the content of $Y^{3+}$ is 15%, a more preferable upper limit is 10%, a still more preferable upper limit is 7%, a further preferable upper limit is 5%, a further more preferable upper limit is 3%, and a still further more preferable upper limit is 2%. A preferable lower limit of the content of $Y^{3+}$ is 0.1%. The content of $Y^{3+}$ can also be set to 0%.

A preferable upper limit of the content of $Yb^{3+}$ is 10%, a more preferable upper limit is 8%, a still more preferable upper limit is 6%, an even more preferable upper limit is 4%, a further preferable upper limit is 2%, a further more preferable upper limit is 1%, a still further more preferable upper limit is 0.5%, and an even further more preferable upper limit is 0.1%. The content of $Yb^{3+}$ can also be set to 0%. Since $Yb^{3+}$ has an absorption in infrared regions, it is not suitable for use in optical systems with high sensitivity which require photosensitive characteristics in near infrared regions, such as high-resolution video cameras and monitoring cameras. Glass in which the content of $Yb^{3+}$ is reduced is preferable for the above use.

From the viewpoint of realizing high refractive index and low dispersion while satisfactorily maintaining glass stability, the cation ratio of the total content of $Gd^{3+}$, $Y^{3+}$ and $Yb^{3+}$ to the total content of $La^{3+}$, $Gd^{3+}$, $Y^{3+}$ and $Yb^{3+}$[$(Gd^{3+}+Y^{3+}+Yb^{3+})/(La^{3+}+Gd^{3+}+Y^{3+}+Yb^{3+})$] preferably exceeds 0, is more preferably equal to or more than 0.02, still more preferably equal to or more than 0.06, further preferably equal to or more than 0.10, and further more preferably equal to or more than 0.14.

In contrast, from the viewpoint of further improving glass stability, a preferable upper limit of the cation ratio [$(Gd^{3+}+Y^{3+}+Yb^{3+})/(La^{3+}+Gd^{3+}+Y^{3+}+Yb^{3+})$] is 0.80, a more preferable upper limit is 0.50, a still more preferable upper limit is 0.40, a further preferable upper limit is 0.30, and a further more preferable upper limit is 0.20.

$Ti^{4+}$, $Nb^{5+}$, $Ta^{5+}$ and $W^{6+}$ have the functions of improving resistance to devitrification, suppressing the rise of liquidus temperature, and improving chemical durability, in addition to enhancing a refractive index. When the total content of $Ti^{4+}$, $Nb^{5+}$, $Ta^{5+}$ and $W^{6+}$ is less than 22%, it becomes difficult to obtain the effects, and when the total content of $Ti^{4+}$, $Nb^{5+}$, $Ta^{5+}$ and $W^{6+}$ exceeds 55%, resistance to devitrification deteriorates and liquidus temperature rises. In addition, dispersion becomes high and coloring of glass is intensified. Accordingly, the total content of $Ti^{4+}$, $Nb^{5+}$, $Ta^{5+}$ and $W^{6+}$ is set to 22 to 55%. A preferable upper limit of the total content of $Ti^{4+}$, $Nb^{5+}$, $Ta^{5+}$ and $W^{6+}$ is 45%, a more preferable upper limit is 40%, a still more preferable upper limit is 35%, a further preferable upper limit is 33% and a further more preferable upper limit is 31%; and a preferable lower limit of the total content of $Ti^{4+}$, $Nb^{5+}$, $Ta^{5+}$ and $W^{6+}$ is 23%, a more preferable lower limit is 24%, a still more preferable lower limit is 25%, a further preferable lower limit is 26%, and a further more preferable lower limit is 27%.

In the optical glass I, with the total content of $Ti^{4+}$, $Nb^{5+}$, $Ta^{5+}$ and $W^{6+}$ being in the above-described range, the content of $Ti^{4+}$ is equal to or less than 22% and $Zr^{4+}$ is contained as an essential component. Furthermore, resistance to devitrification can be improved and the rise of liquidus temperature can be suppressed, by adjusting the cation ratio of the total content of $Zr^{4+}$, $Ti^{4+}$, $Nb^{5+}$, $Ta^{5+}$ and $W^{6+}$ to the content of $Zr^{4+}[(Zr^{4+}+Ti^{4+}+Nb^{5+}+Ta^{5+}+W^{6+})/Zr^{4+}]$. When the cation ratio $[(Zr^{4+}+Ti^{4+}+Nb^{5+}+Ta^{5+}+W^{6+})/Zr^{4+}]$ is less than 2, resistance to devitrification deteriorates and liquidus temperature rises. Therefore, in the optical glass I, the range of the cation ratio $[(Zr^{4+}+Ti^{4+}+Nb^{5+}+Ta^{5+}+W^{6+})/Zr^{4+}]$ is set to be equal to or more than 2. A preferable lower limit of the cation ratio $[(Zr^{4+}+Ti^{4+}+Nb^{5+}+Ta^{5+}+W^{6+})/Zr^{4+}]$ is 3.0, a more preferable lower limit is 3.5, a still more preferable lower limit is 4.0, a further preferable lower limit is 4.5 and a further more preferable lower limit is 5.0. In addition, from the viewpoint of further improving resistance to devitrification, a preferable upper limit of the cation ratio $[(Zr^{4+}+Ti^{4+}+Nb^{5+}+Ta^{5+}+W^{6+})/Zr^{4+}]$ is 56, a more preferable upper limit is 50, a still more preferable upper limit is 40, a further preferable upper limit is 30, a further more preferable upper limit is 20, and a still further more preferable upper limit is 10.

From the viewpoint of realizing desired optical properties while maintaining glass stability, a preferable lower limit of the content of $Ti^{4+}$ is 10%, a more preferable lower limit is 12%, a still more preferable lower limit is 14%, a further preferable lower limit is 16%, and a further more preferable lower limit is 18%; and a preferable upper limit of the content of $Ti^{4+}$ is 21.9%, a more preferable upper limit is 21.8%, a still more preferable upper limit is 21.7%, a further preferable upper limit is 21.6%, and a further more preferable upper limit is 21.5%.

From the viewpoint of realizing desired optical properties while maintaining glass stability, a preferable lower limit of the content of $Nb^{5+}$ is 1%, a more preferable lower limit is 2%, a still more preferable lower limit is 3%, a further preferable lower limit is 4%, and a further more preferable lower limit is 5%; and a preferable upper limit of the content of $Nb^{5+}$ is 30%, a more preferable upper limit is 25%, a still more preferable upper limit is 20%, a further preferable upper limit is 15%, a further more preferable upper limit is 10%, and a still further more preferable upper limit is 8%.

As compared with $Ti^{4+}$, $Nb^{5+}$ or $W^{6+}$, $Ta^{5+}$ has the function of enhancing a refractive index without enhancing dispersion, and of enhancing glass stability. When the content of $Ta^{5+}$ exceeds 10%, liquidus temperature rises and resistance to devitrification deteriorates, and thus the content of $Ta^{5+}$ is preferably set to 0 to 10%. Considering that $Ta^{5+}$ is an expensive component, a preferable range of the content of $Ta^{5+}$ is 0 to 8%, a more preferable range is 0 to 6%, a still more preferable range is 0 to 4%, a further preferable range is 0 to 2%, and a further more preferable range is 0 to 1%. It is further more preferable not to contain $Ta^{5+}$.

From the viewpoint of improving glass stability while obtaining desired optical properties, the cation ratio of the total content of $Nb^{5+}$ and $Ta^{5+}$ to the content of $Nb^{5+}[(Nb^{5+}+Ta^{5+})/Nb^{5+}]$ is preferably equal to or more than 1. When the cation ratio $[(Nb^{5+}+Ta^{5+})/Nb^{5+}]$ exceeds 11, the specific gravity of glass increases, and when the glass is to be used for a lens, driving power consumption at the time of auto focusing increases, and since a large amount of $Ta^{5+}$ that is more expensive than $Nb^{5+}$ that is an essential component, is required, the cation ratio $[(Nb^{5+}+Ta^{5+})/Nb^{5+}]$ is preferably equal to or less than 11. A preferable upper limit of the cation ratio $[(Nb^{5+}+Ta^{5+})/Nb^{5+}]$ is 9, a more preferable upper limit is 7, further preferable upper limit is 5 and a further more preferable upper limit is 3, and the cation ratio $[(Nb^{5+}+Ta^{5+})/Nb^{5+}]$ can also be set to 1.

$W^{6+}$ is an optional component that enhances a refractive index and lowers liquidus temperature and contributes to improvement of resistance to devitrification, but from the viewpoint of suppressing coloring of glass while suppressing the rise of liquidus temperature and enhancing resistance to devitrification, the content of $W^{6+}$ is preferably set to 0 to 10%. A preferable range of the content of $W^{6+}$ is 0 to 8%, a more preferable range is 0 to 6%, a still more preferable range is 0 to 4%, a further preferable range is 0 to 2% and a further more preferable range is 0 to 1%, and it is still further more preferable not to contain $W^{6+}$.

In order to enhance a refractive index while maintaining glass stability, the cation ratio of the content of $W^{6+}$ to the total content of $Ti^{4+}$, $Nb^{5+}$, $Ta^{5+}$ and $W^{6+}[W^{6+}/(Ti^{4+}+Nb^{5+}+Ta^{5+}+W^{6+})]$ is preferably set to less than 0.10. From the viewpoint of enhancing the refractive index while maintaining glass stability, the upper limit of the cation ratio $[W^{6+}/(Ti^{4+}+Nb^{5+}+Ta^{5+}+W^{6+})]$ is more preferably 0.095, still more preferably 0.090, further preferably 0.070, further more preferably 0.050 and still further more preferably 0.030. The lower limit of the cation ratio $[W^{6+}/(Ti^{4+}+Nb^{5+}+Ta^{5+}+W^{6+})]$ is 0.

From the viewpoint of achieving a high refractive index and low dispersion while maintaining glass stability, the cation ratio of the total content of $Nb^{5+}$ and $Ta^{5+}$ to the total content of $Ti^{4+}$, $Nb^{5+}$, $Ta^{5+}$ and $W^{6+}[(Nb^{5+}+Ta^{5+})/(Ti^{4+}+Nb^{5+}+Ta^{5+}+W^{6+})]$ is preferably set to be equal to or less than 0.41. In contrast, from the viewpoint of achieving a high refractive index and low dispersion as well as lowering a partial dispersion ratio while maintaining glass stability, the cation ratio $[(Nb^{5+}+Ta^{5+})/(Ti^{4+}+Nb^{5+}+Ta^{5+}+W^{6+})]$ is preferably set to be equal to or more than 0.05. A preferable upper limit of the cation ratio $[(Nb^{5+}+Ta^{5+})/(Ti^{4+}+Nb^{5+}+Ta^{5+}+W^{6+})]$ is 0.41 as described above, a more preferable upper limit is 0.39, a still more preferable upper limit is 0.36, a further preferable upper limit is 0.33, and a further more preferable upper limit is 0.30. A more preferable lower limit of the cation ratio $[(Nb^{5+}+Ta^{5+})/(Ti^{4+}+Nb^{5+}+Ta^{5+}+W^{6+})]$ is 0.10, a still more preferable lower limit is 0.15, a further preferable lower limit is 0.20, and a further more preferable lower limit is 0.25.

Among components that have the functions of achieving a high refractive index, $La^{3+}$, $Gd^{3+}$, $Y^{3+}$ and $Yb^{3+}$ have the functions of achieving a high refractive index while maintaining a low dispersion property, and $Ti^{4+}$, $Nb^{5+}$, $Ta^{5+}$ and $W^{6+}$ are components that achieve a high refractive index and high dispersion. From the viewpoint of obtaining desired optical properties while satisfactorily maintaining glass stability, the cation ratio of the total content of $Ti^{4+}$, $Nb^{5+}$, $Ta^{5+}$ and $W^{6+}$ to the total content of $La^{3+}$, $Gd^{3+}$, $Y^{3+}$ and $Yb^{3+}[(Ti^{4+}+Nb^{5+}+Ta^{5+}+W^{6+})/(La^{3+}+Gd^{3+}+Y^{3+}+Yb^{3+})]$ is preferably equal to or more than 0.10. A more preferable lower limit of the cation ratio $[(Ti^{4+}+Nb^{5+}+Ta^{5+}+W^{6+})/(La^{3+}+Gd^{3+}+Y^{3+}+Yb^{3+})]$ is 0.30, a still more preferable lower limit is 0.50, a further preferable lower limit is 0.60, and a further more preferable lower limit is 0.70.

From the viewpoint of obtaining desired optical properties while satisfactorily maintaining glass stability, the cation ratio $[(Ti^{4+}+Nb^{5+}+Ta^{5+}+W^{6+})/(La^{3+}+Gd^{3+}+Y^{3+}+Yb^{3+})]$ is preferably equal to or less than 1.50. A more preferable upper limit of the cation ratio $[(Ti^{4+}+Nb^{5+}+Ta^{5+}+W^{6+})/(La^{3+}+Gd^{3+}+Y^{3+}+Yb^{3+})]$ is 1.40, a still more preferable upper limit is 1.30, a further preferable upper limit is 1.20, and a further more preferable upper limit is 1.00.

In the optical glass I, in order to enhance a refractive index while maintaining glass stability, the cation ratio of the content of $Ti^{4+}$ to the content of $B^{3+}(Ti^{4+}/B^{3+})$ is set to be equal to or more than 0.85. When the cation ratio $(Ti^{4+}/B^{3+})$ is less than 0.85, crystals are easily deposited at the time of glass manufacturing in the case of enhancing a refractive index while maintaining a low dispersion property.

From the viewpoint of enhancing a refractive index while maintaining glass stability, the lower limit of the cation ratio $(Ti^{4+}/B^{3+})$ is more preferably 0.90, further preferably 0.95, and further more preferably 1.00. The upper limit of the cation ratio $(Ti^{4+}/B^{3+})$ is naturally determined from the composition range of the optical glass of the above-described aspect, and the upper limit may be considered to be, for example, 10.

$Zr^{4+}$ is an essential component in the optical glass I, has the function of enhancing a refractive index and improving chemical durability, and as the result of the coexistence with $Ti^{4+}$, has the function of improving resistance to devitrification and suppressing the rise of liquidus temperature. In order to obtain the effects, the content of $Zr^{4+}$ is preferably set to be equal to or more than 1%. From the viewpoint of suppressing the rise of the glass transition temperature and liquidus temperature as well as lowering of resistance to devitrification, a preferable upper limit of the content of $Zr^{4+}$ is 15%. A preferable upper limit of the content of $Zr^{4+}$ is 10%, more preferable upper limit is 8% and further preferable upper limit is 7%, and a preferable lower limit of the content of $Zr^{4+}$ is 1%, more preferable lower limit is 2%, still more preferable lower limit is 3%, and further preferable lower limit is 4%.

Although $Zn^{2+}$ deteriorates a refractive index and glass stability, it has the function of improving melting properties and clarifying properties of glass. Each of oxides of $La^{3+}$, $Gd^{3+}$, $Y^{3+}$, $Yb^{3+}$, $Ti^{4+}$, $Nb^{5+}$, $Ta^{5+}$, $W^{6+}$ and $Zr^{4+}$ has a very high melting point, and in the optical glass I containing these components as essential components or optional components, it is preferable to contain $Zn^{2+}$ that is effective for improving melting properties and clarifying properties. Accordingly, from the viewpoint of satisfactorily maintaining a high refractive index and maintaining glass stability, the content of $Zn^{2+}$ is preferably set to be equal to or less than 15%, more preferably set to be equal to or less than 12%, still more preferably set to be equal to or less than 10%, further preferably set to be equal to or less than 8%, further more preferably set to be equal to or less than 6%, and still further more preferably set to be equal to or less than 3%. In addition, from the viewpoint of improving melting properties and clarifying properties of glass, and suppressing the rise of melting temperature and accordingly, suppressing the increase in glass coloring, the content of $Zn^{2+}$ is preferably set to be equal to or more than 0.1%, more preferably set to be equal to or more than 0.5%, still more preferably set to be equal to or more than 0.8%, and further preferably set to be equal to or more than 1.0%. The content of $Zn^{2+}$ can also be set to 0%.

$Ti^{4+}$, $Nb^{5+}$, $Ta^{5+}$ and $W^{6+}$ are components that enhance a refractive index, but that increase melting temperature, and melting properties, clarifying properties and optical properties such as refractive index can be adjusted by using, as an index, the cation ratio of the content of $Zn^{2+}$ that lowers a refractive index but improves melting properties and clarifying properties, to the total content of these components: $Zn^{2+}/(Ti^{4+}+Nb^{5+}+Ta^{5+}+W^{6+})$. From the viewpoint of improving melting properties and clarifying properties of glass, the cation ratio $[Zn^{2+}/(Ti^{4+}+Nb^{5+}+Ta^{5+}+W^{6+})]$ is preferably set to be equal to or more than 0.01, more preferably set to be equal to or more than 0.02, still more preferably set to be equal to or more than 0.03, and further preferably set to be equal to or more than 0.04. In addition, from the viewpoint of enhancing a refractive index, the cation ratio $[Zn^{2+}/(Ti^{4+}+Nb^{5+}+Ta^{5+}+W^{6+})]$ is preferably set to be equal to or less than 0.65, more preferably set to be equal to or less than 0.60, still more preferably set to be equal to or less than 0.50, further preferably set to be equal to or less than 0.40, further more preferably set to be equal to or less than 0.30, still further more preferably set to be equal to or less than 0.20, and particularly preferably set to be equal to or less than 0.10.

$Li^+$, $Na^+$ and $K^+$ are optional components that have the functions of improving melting properties and lowering the glass transition temperature. From the viewpoint of suppressing the rise of liquidus temperature, as well as suppressing the lowering of glass stability and chemical durability while realizing a high refractive index, the total content of $Li^+$, $Na^+$ and $K^+$ is preferably set to in the range from 0 to 10%. A more preferable range of the total content of $Li^+$, $Na^+$ and $K^+$ is 0 to 8%, a still more preferable range is 0 to 6%, a further preferable range is 0 to 4%, a further more preferable range is from 0 to 2%, a still further more preferable range is 0 to 1%, and a particularly further preferably, the above-described alkali metal components are not contained.

Regarding the each content of components of $Li^+$, $Na^+$ and $K^+$, respectively, preferable ranges are 0 to 10%, more preferable ranges are from 0 to 8%, still more preferable ranges are from 0 to 6%, even more preferable ranges are 0 to 4%, further preferable ranges are 0 to 2%, further more preferable ranges are 0 to 1%, still further more preferable ranges are 0 to 0.1%, and still further more preferably, the above-described respective alkali metal components are not contained.

$Mg^{2+}$, $Ca^{2+}$, $Sr^{2+}$ and $Ba^{2+}$ have the functions of improving melting properties of glass, and of lowering the glass transition temperature Tg. In addition, a defoaming effect can also be obtained by introducing these into glass in the form of nitrate or sulfate.

In glass of a high refractive index and low dispersion, among the above-described alkali earth metal components, when containing $Ba^{2+}$ in a large amount to the total content of $La^{3+}$, $Gd^{3+}$, $Y^{3+}$ and $Yb^{3+}$, it becomes difficult to further achieve a high refractive index and low dispersion while maintaining glass stability. For example, molding of a molten glass is usually performed by casting the molten glass into a mold which has a bottom surface and side walls and in which one of their side surfaces opens, and a molded glass is continuously drawn out from the opened side surface of the mold (which is referred to as an E-bar molding method). However, when aiming at achieving a high refractive index and low dispersion by and containing $Ba^{2+}$ in a large amount relative to the total content of $La^{3+}$, $Gd^{3+}$, $Y^{3+}$ and $Yb^{3+}$, the glass tends to be easily devitrified in the above molding method. Therefore, there may be no other choice but to use a special molding method of preventing devitrification by casting a molten glass in a through-hole through the use of a mold having the through-hole, increasing a contact area of the molten glass per unit volume with the mold, and making a cooling rate of the glass extremely quick. In the molding method using a mold having a through-hole, the molded glass is drawn out downward, and thus it is difficult to horizontally carry the glass directly through a continuous annealing furnace of a tunnel type referred to as a rare furnace and to anneal the glass.

It is possible to mold homogeneous optical glass while preventing devitrification, even by a general E-bar molding method, by adjusting and optimizing the ratio of the content of $Ba^{2+}$ and the total content of $La^{3+}$, $Gd^{3+}$, $Y^{3+}$ and $Yb^{3+}$.

In addition, since the molded glass can be carried directly through a rare furnace and be annealed, glass can be manufactured under high productivity.

As described above, in order to prevent the lowering of glass stability caused by achieving a high refractive index and low dispersion, in the optical glass I, the cation ratio of the content of $Ba^{2+}$ to the total content of $La^{3+}$, $Gd^{3+}$, $Y^{3+}$ and $Yb^{3+}$ [$Ba^{2+}/(La^{3+}+Gd^{3+}+Y^{3+}+Yb^{3+})$] is set to be equal to or less than 0.40. When the cation ratio [$Ba^{2+}/(La^{3+}+Gd^{3+}+Y^{3+}+Yb^{3+})$] exceeds 0.40, the devitrification tendency of the glass increases, and it becomes difficult to manufacture high-quality optical glass by the E-bar molding method. An upper limit of the cation ratio [$Ba^{2+}/(La^{3+}+Gd^{3+}+Y^{3+}+Yb^{3+})$] is, as described above, 0.40, a preferable upper limit is 0.30, a more preferable upper limit is 0.25, a still more preferable upper limit is 0.20, a further preferable upper limit is 0.10, and a further more preferable upper limit is 0.05. The cation ratio [$Ba^{2+}/(La^{3+}+Gd^{3+}+Y^{3+}+Yb^{3+})$] may be 0.

From the viewpoint of suppressing the lowering of resistance to devitrification, a refractive index and chemical durability while preventing the rise of liquidus temperature, the total content, of $Mg^{2+}$, $Ca^{2+}$, $Sr^{2+}$ and $Ba^{2+}$ is preferably set to from 0 to 10% while the cation ratio [$Ba^{2+}/(La^{3+}+Gd^{3+}+Y^{3+}+Yb^{3+})$] being set in the above-described range. A more preferable range of the total content of $Mg^{2+}$, $Ca^{2+}$, $Sr^{2+}$ and $Ba^{2+}$ is 0 to 8%, a still more preferable range is 0 to 6%, a further preferable range is 0 to 4%, a further more preferable range is 0 to 2%, and a still further more preferable range is 0 to 1%, and even further more preferably, the above-described alkali earth metal components are not contained.

Regarding the each content of components of $Mg^{2+}$, $Ca^{2+}$, $Sr^{2+}$ and $Ba^{2+}$, respective preferable ranges are 0 to 10%, more preferable ranges are 0 to 8%, still more preferable ranges are 0 to 6%, even more preferable ranges are 0 to 4%, further preferable ranges are 0 to 2%, and further more preferable ranges are 0 to 1%, and still further more preferably, each of the above-described alkali earth metal components is not contained.

$Ge^{4+}$ is a network-forming component, and since the $Ge^{4+}$ also has the function of enhancing a refractive index, it is a component that can enhance a refractive index while maintaining glass stability. However, the $Ge^{4+}$ is an extremely expensive component as compared with other components, and is a component the content of which is desired to be reduced. In the optical glass I, since the composition is determined as described above, both the realization of desired optical properties and the realization of excellent glass stability can be simultaneously satisfied even when suppressing the content of $Ge^{4+}$ to be, for example, equal to or less than 10%. Accordingly, it is preferable to set the content of $Ge^{4+}$ to 0 to 10%. A more preferable range of the content of $Ge^{4+}$ is 0 to 8%, a still more preferable range is 0 to 6%, a further preferable range is 0to 4%, a further more preferable range is from 0to 2%, and a still further more preferable range is from 0 to 1%. It is particularly preferable not to contain $Ge^{4+}$, that is, to be Ge-free glass.

$Bi^{3+}$ has the function of enhancing glass stability while enhancing a refractive index, but when the content thereof exceeds 10%, a light transmittance in visible region is lowered. Accordingly, it is preferable to set the content of $Bi^{3+}$ to be 0 to 10%. A more preferable range of the content of $Bi^{3+}$ is 0 to 8%, a still more preferable range is 0 to 6%, a further preferable range is 0 to 4%, a further more preferable range is 0 to 2%, and a still further more preferable range is 0 to 1%, and particularly preferably, $Bi^{3+}$ is not contained.

Among above-described components, $La^{3+}$, $Gd^{3+}$, $Y^{3+}$, $Yb^{3+}$, $Zr^{4+}$, $Ti^{4+}$, $Nb^{5+}$, $Ta^{5+}$, $W^{6+}$ and $Bi^{3+}$ are components for achieving a high refractive index, and the total content of $La^{3+}$, $Gd^{3+}$, $Y^{3+}$, $Yb^{3+}$, $Zr^{4+}$, $Ti^{4+}$, $Nb^{5+}$, $Ta^{5+}$, $W^{6+}$ and $Bi^{3+}$ is set to be equal to or more than 65% for obtaining a desired refractive index and dispersion. In the optical glass I, since the total content of $Si^{4+}$ and $B^{3+}$ that are network-forming components is equal to or more than 5% for maintaining glass stability, and thus the total content of $La^{3+}$, $Gd^{3+}$, $Y^{3+}$, $Yb^{3+}$, $Zr^{4+}$, $Ti^{4+}$, $Nb^{5+}$, $Ta^{5+}$, $W^{6+}$ and $Bi^{3+}$ becomes naturally equal to or less than 95%. From the viewpoint of obtaining desired optical properties, a preferable lower limit of the total content of $La^{3+}$, $Gd^{3+}$, $Y^{3+}$, $Yb^{3+}$, $Zr^{4+}$, $Ti^{4+}$, $Nb^{5+}$, $Ta^{5+}$, $W^{6+}$ and $Bi^{3+}$ is 66%, more preferable lower limit is 67%, still more preferable lower limit is 68%, further preferable lower limit is 69%, and further more preferable lower limit is 70%.

From the viewpoint of satisfactorily maintaining glass stability, a preferable upper limit of the total content of $La^{3+}$, $Gd^{3+}$, $Y^{3+}$, $Yb^{3+}$, $Zr^{4+}$, $Ti^{4+}$, $Nb^{5+}$, $Ta^{5+}$, $W^{6+}$ and $Bi^{3+}$ is 90%, more preferable upper limit is 85%, still more preferable upper limit is 80%, further preferable upper limit is 75%, and further more preferable upper limit is 73%.

$Al^{3+}$ has the function, when the content thereof is small, of improving glass stability and chemical durability, but when the content exceeds 10%, the $Al^{3+}$ exhibits a tendency of increasing liquidus temperature and lowering resistance to devitrification. Accordingly, it is preferable to set the content of $Al^{3+}$ to be 0 to 10%. A more preferable range of the content of $Al^{3+}$ is 0 to 8%, a still more preferable range is 0 to 6%, a further preferable range is 0 to 4%, a further more preferable range is 0 to 2%, and a still further more preferable range is 0 to 1%, and it is particularly preferable not to contain $Al^{3+}$.

From the viewpoint of providing, as the optical glass I, optical glass having a high refractive index and a low dispersion property and having excellent glass stability, the content of optional cation components other than above-described cation components is preferably set to 0 to 5%, more preferably set to 0 to 4%, still more preferably set to 0 to 3%, further preferably set to 0 to 2.5%, further more preferably set to 0 to 2%, still further more preferably set to 0 to 1.5%, even further more preferably set to 0 to 1.0%, and particularly preferably set to 0 to 0.5%. The content of optional cation components other than above-described cation components may be set to 0%.

Sb can be added as a clarifying agent, and has also the function of suppressing the lowering of a light transmittance caused by mixing of an impurity such as Fe by the addition of Sb in a small amount, but when Sb is added in an amount more than 1% by mass as a ratio of the content when converted to the oxide $Sb_2O_3$ to the total content other than $Sb_2O_3$, the glass develops color or a powerful oxidation effect ends up promoting deterioration of the molding surface of the mold. Accordingly, the content of Sb added is preferably 0 to 1% by mass, more preferably 0 to 0.5% by mass, and still more preferably 0 to 0.1% by mass, as a ratio of the content when converted to $Sb_2O_3$ to the total content other than $Sb_2O_3$. The content of Sb added as a ratio of the content when converted to $Sb_2O_3$ to the total content other than $Sb_2O_3$ means the content of $Sb_2O_3$ based on % by mass when the total of the contents of glass components other than $Sb_2O_3$ is defined as 100% by mass.

Sn can also be added as a clarifying agent, but when Sn is added in an amount more than 1% by mass as a ratio of the content when converted to the oxide $SnO_2$ to the total content other than $SnO_2$, the glass develops color or an oxidation effect ends up promoting deterioration of the molding surface of the mold. Accordingly, the content of Sn added is preferably 0 to 1% by mass, and more preferably 0 to 0.5% by mass, as a ratio of the content when converted to $SnO_2$ to the total content other than $SnO_2$. The content of Sn added as a ratio of the content when converted to $SnO_2$ to the total content other than $SnO_2$ means the content of $SnO_2$ based on % by mass when the total of the contents of glass components other than $SnO_2$ is defined as 100% by mass.

In addition to above-described components, Ce oxide, sulfate, nitrate, chloride, or fluoride can also be added in a small amount as a clarifying agent.

Since the optical glass I can maintain glass stability while realizing optical properties of a high refractive index and low dispersion, components such as Lu, Hf, Ga, In and Sc may not be contained. Since Lu, Hf, Ga, In and Sc are also expensive components, each of contents of $Lu^{3+}$, $Ga^{3+}$, $In^{3+}$ and $Sc^{3+}$ is preferably suppressed to be 0 to 1%, each is more preferably suppressed to be 0 to 0.5%, each is still more preferably suppressed to be 0 to 0.1%, and it is particularly preferable not to introduce $Lu^{3+}$, not to introduce $Hf^{4+}$, not to introduce $Ga^{3+}$, not to introduce $In^{3+}$, and not to introduce $Sc^{3+}$, respectively.

In addition, in consideration of an environmental effect, it is preferable not to introduce As, Pb, U, Th, Te and Cd.

Furthermore, from the viewpoint of making the most use of an excellent light transmitting property, it is preferable not to introduce materials that become a factor of coloring such as Cu, Cr, V, Fe, Ni, Co, Nd and Tb.

Accordingly, preferably the optical glass I substantially does not contain above-described Pb or the like. In the present invention, "substantially does not contain" means "not introducing actively these materials as a glass component," and unintentional mixing as impurities is assumed to be allowed.

The optical glass I is oxide glass, and a main anion component is $O^{2-}$. As aforementioned, $Cl^-$ or $F^-$ can also be added in a small amount as a clarifying agent, but from the viewpoint of providing optical glass having a high refractive index and a low dispersion property and having excellent glass stability, the content of $O^{2-}$ is preferably set to be equal to or more than 98 anion %, more preferably set to be equal to or more than 99 anion %, still more preferably set to be equal to or more than 99.5 anion %, even more preferably set to be equal to or more than 99.9 anion %, and further preferably set to 100 anion %.

(Refractive Index Nd and Abbé Number vd)

The Abbé number vd of the optical glass I is in the range of 23 to 35. When providing an optical element material suitable for chromatic aberration correction while utilizing a low dispersion property, a larger Abbé number vd is advantageous. From such viewpoints, the lower limit of the Abbé number vd is preferably 24.0, more preferably 24.5, still more preferably 25.0, further preferably 25.5, and further more preferably 26.0.

In contrast, relaxation of the upper limit of the Abbé number vd advantageously works for maintaining and improving glass stability. From such viewpoints, the upper limit of the Abbé number vd is preferably 32.00, more preferably equal to or less than 31.00, still more preferably equal to or less than 30.00, further preferably equal to or less than 29.00, and further more preferably equal to or less than 28.00.

As to the optical glass I, the refractive index nd is determined in a relationship with the Abbé number vd. Optical systems such as imaging optical systems and projection optical systems can be downsized and highly functionalized, by enhancing a refractive index while maintaining a low dispersion property. In the optical glass I, the refractive index nd and the Abbé number vd satisfy Expression (1) below. The glass that satisfies Expression (1) is glass having a higher refractive index at the same Abbé number vd as compared with the conventional high refractive index and low dispersion glasses, that is, glass that is positioned in the upper left range in the optical property chart having previously been described, and is glass of high usefulness.

$$nd \geq 2.205 - (0.0062 \times vd) \quad (1)$$

Since the upper limit of the refractive index nd is naturally determined from the composition range of the optical glass I, the upper limit is not particularly limited. From the viewpoint of maintaining glass stability, the refractive index nd is preferably set to be equal to or less than 2.20, more preferably set to be equal to or less than 2.15, still more preferably set to be equal to or less than 2.10, and further preferably set to be equal to or less than 2.09.

From the viewpoint of highly functionalizing and downsizing of optical elements and optical systems obtained by incorporating the above optical element, the refractive index nd and Abbé number vd are in the above-described range, and in addition, preferably satisfy Expression (1-1) below, more preferably satisfy Expression (1-2) below, still more preferably satisfy Expression (1-3) below, further preferably satisfy Expression (1-4) below, and further more preferably satisfy Expression (1-5) below.

$$nd \geq 2.207 - (0.0062 \times vd) \quad (1\text{-}1)$$

$$nd \geq 2.209 - (0.0062 \times vd) \quad (1\text{-}2)$$

$$nd \geq 2.211 - (0.0062 \times vd) \quad (1\text{-}3)$$

$$nd \geq 2.213 - (0.0062 \times vd) \quad (1\text{-}4)$$

$$nd \geq 2.215 - (0.0062 \times vd) \quad (1\text{-}5)$$

Optical glass having achieved a still higher refractive index are favorable as materials of optical elements suitable for downsizing and highly functionalizing optical systems such as imaging optical systems and projection optical systems. Furthermore, also in the case of making a lens having the same focal distance, since the absolute value of the curvature of an optically functional surface of the lens can be made smaller (the curve can be made more gradual), it is also advantageous from the viewpoint of molding and processing of the lens. In contrast, as the result of making optical glass have still higher refractive index, the glass exhibits tendencies of lowering thermal stability and increasing coloring, that is, decreasing a light transmittance in visible and short wavelength regions. Accordingly, from the viewpoint of satisfactorily maintaining the thermal stability and suppressing the increase in coloring of glass, the refractive index nd and Abbé number vd preferably satisfy Expression (1-6) below, more preferably satisfy Expression (1-7) below, still more preferably satisfy Expression (1-8) below, further preferably satisfy Expression (1-9) below, and further more preferably satisfy Expression (1-10) below.

$$nd \leq 2.320 - (0.0062 \times vd) \quad (1\text{-}6)$$

$$nd \leq 2.300 - (0.0062 \times vd) \quad (1\text{-}7)$$

$$nd \leq 2.280 - (0.0062 \times vd) \quad (1\text{-}8)$$

$$nd \leq 2.260-(0.0062 \times vd) \quad (1\text{-}9)$$

$$nd \leq 2.240-(0.0062 \times vd) \quad (1\text{-}10)$$

In the optical glass I, desired optical properties indicate optical properties within a range in which the Abbé number vd is in the range of 23 to 35, and the refractive index nd and the Abbé number vd satisfy the above Expression (1), and preferable optical properties among desired optical properties indicate those within an arbitrary range of the preferable range of the above refractive index nd and the above Abbé number vd.

(Liquidus Temperature)

High refractive index glass contains a large amount of components for achieving a high refractive index (for example, $La^{3+}(La_2O_3)$, $Gd^{3+}(Gd_2O_3)$, $Y^{3+}(Y_2O_3)$, $Yb^{3+}(Yb_2O_3)$, $Ti^{4+}(TiO_2)$, $Nb^{5+}(Nb_2O_5)$, $Ta^{5+}(Ta_2O_5)$, $W^{6+}(WO_3)$, $Zr^{4+}(ZrO_2)$), and each of these components has singly a very high melting point. In addition, when the total amount of the components for achieving a high refractive index is large, the total amount of components having the function of lowering the melting temperature of alkali metal components, alkali earth metal components or the like is relatively decreased, and melting properties and resistance to devitrification are lowered, with the result that the melting temperature has to be raised in order to obtain homogeneous glass.

When the melting temperature rises, corrosive properties of glass melt are intensified to corrode a melting vessel, and a material constituting the vessel, for example, platinum or platinum alloy dissolves in the glass melt to thereby color the glass or form a platinum impriry. Furthermore, when the melting temperature is high, a problem is also generated, in which a volatile component such as $B^{3+}$ volatilizes and the glass composition varies with the lapse of time to thereby fluctuate optical properties.

For solving the problem, it is sufficient to suppress the rise of melting temperature. The range of the melting temperature may be considered to be a temperature zone that gives a homogeneous glass melt, and the lower limit of the temperature zone may be considered to generally change in conjunction with the rise/drop of the liquidus temperature. Accordingly, the rise of the melting temperature can also be suppressed as long as the rise of the liquidus temperature can be suppressed.

In addition, the suppression of rise of the liquidus temperature, if possible, is effective for preventing devitrification in glass molding, the viscosity of the glass can also be adjusted in a range suitable for molding, with the result that a glass molded article of high quality is easily produced.

As described above, since the increase and decrease of a refractive index and rise/drop of liquidus temperature are linked together with the increase and decrease in the amount of components for achieving a high refractive index, the evaluation of melting properties and resistance to devitrification can be appropriately performed by using an index obtained by taking the refractive index and the liquidus temperature into consideration. In the optical glass I, when the liquidus temperature is denoted by LT [° C.], the above-described index is defined as LT/(nd−1) for glass of the refractive index nd. The denominator is a value obtained by subtracting the refractive index of 1 of vacuum from the refractive index of the glass, and the value reflects the total level of increase and decrease of the refractive index. A lower LT/(nd−1) means that the glass has more excellent melting properties and resistance to devitrification, as high refractive index glass.

The preferable embodiment of the optical glass I can satisfy Expression (3) below, because amounts of respective components are determined in a balanced manner so as to suppress the rise of liquidus temperature while maintaining desired optical properties.

$$LT/(nd-1) \leq 1250° \text{ C.} \quad (3)$$

From the viewpoint of obtaining glass having more improved melting properties and resistance to devitrification, optical glass that satisfies Expression (3-1) below is preferable, optical glass that satisfies Expression (3-2) below is more preferable, optical glass that satisfies Expression (3-3) below is still more preferable, optical glass that satisfies Expression (3-4) below is further preferable, optical glass that satisfies Expression (3-5) below is further more preferable, and optical glass that satisfies Expression (3-6) below is still further more preferable.

$$LT/(nd-1) \leq 1230° \text{ C.} \quad (3\text{-}1)$$

$$LT/(nd-1) \leq 1220° \text{ C.} \quad (3\text{-}2)$$

$$LT/(nd-1) \leq 1210° \text{ C.} \quad (3\text{-}3)$$

$$LT/(nd-1) \leq 1205° \text{ C.} \quad (3\text{-}4)$$

$$LT/(nd-1) \leq 1200° \text{ C.} \quad (3\text{-}5)$$

$$LT/(nd-1) \leq 1190° \text{ C.} \quad (3\text{-}6)$$

On the other hand, when lowering LT/(nd−1), since a tendency of becoming difficult to maintain desired optical properties is exhibited, it is preferable not to excessively reduce LT/(nd−1). From such viewpoints, optical glass that satisfies Expression (3-7) below is preferable, optical glass that satisfies Expression (3-8) below is more preferable, optical glass that satisfies Expression (3-9) below is still more preferable, optical glass that satisfies Expression (3-10) below is further preferable, optical glass that satisfies Expression (3-11) below is further more preferable, and optical glass that satisfies Expression (3-12) below is still further more preferable.

$$LT/(nd-1) \geq 1050° \text{ C.} \quad (3\text{-}7)$$

$$LT/(nd-1) \geq 1070° \text{ C.} \quad (3\text{-}8)$$

$$LT/(nd-1) \geq 1080° \text{ C.} \quad (3\text{-}9)$$

$$LT/(nd-1) \geq 1090° \text{ C.} \quad (3\text{-}10)$$

$$LT/(nd-1) \geq 1110° \text{ C.} \quad (3\text{-}11)$$

$$LT/(nd-1) \geq 1120° \text{ C.} \quad (3\text{-}12)$$

(Partial Dispersion Property)

The optical glass I is preferably glass of a small partial dispersion ratio when the Abbé number vd is fixed. An optical element such as lens made of such optical glass is suitable for high-order chromatic aberration correction.

In the present invention, the partial dispersion ratio Pg, F is represented as (ng−nF)/(nF−nc), by using respective refractive indices of ng, nF and nc at the g line, F line and c line.

From the viewpoint of providing optical glass suitable for high-order chromatic aberration correction, as the optical glass I, glass in which the partial dispersion ratio Pg, F and the Abbé number vd satisfy the relationship of Expression (4-1) below is preferable, glass that satisfies the relationship of Expression (4-2) below is more preferable, and glass that satisfies Expression (4-3) below is further preferable.

$$Pg, F \leq -0.005 \times vd + 0.750 \quad (4\text{-}1)$$

$$Pg, F \leq -0.005 \times vd + 0.745 \quad (4\text{-}2)$$

$$Pg, F \leq -0.005 \times vd + 0.743 \quad (4\text{-}3)$$

On a partial dispersion ratio Pg, F—Abbé number vd chart, when a partial dispersion ratio on a normal line to be the standard of a normal partial dispersion glass is denoted by Pg, F(0), the Pg, F(0) can be represented by the following expression by using the Abbé number vd.

$$Pg, F(0) = 0.6483 - (0.0018 \times vd)$$

ΔPg, F is deviation of the partial dispersion ratio Pg, F from the normal line, and can be represented by the following expression.

$$\Delta Pg, F = Pg, F - Pg, F(0)$$
$$= Pg, F + (0.0018 \times vd) - 0.6483$$

In a preferable embodiment in the optical glass of the above-described aspect, the deviation ΔPg, F is equal to or less than 0.030, which is suitable as an optical element material for high-order chromatic aberration correction. A more preferable range of ΔPg, F is equal to or less than 0.025, a still more preferable range is equal to or less than 0.020, a further preferable range is equal to or less than 0.015, and a further more preferable range is equal to or less than 0.001. A lower limit of the deviation ΔPg, F is more preferably equal to or more than 0.0000, still more preferably equal to or more than 0.001, further preferably equal to or more than 0.003, and further more preferably equal to or more than 0.005.

(Specific Gravity)

The optical glass of the above-described aspect is high refractive index glass, and generally, glass exhibits a tendency of increasing the specific gravity when being made to have a high refractive index. However, the increase in the specific gravity causes the increase in the weight of an optical element, which is not preferable. In contrast, the optical glass of above-described aspect can be made to have specific gravity being equal to or less than 5.60 although the optical glass is high refractive index glass, by having the above-described glass composition. A preferable upper limit of the specific gravity is 5.50, a more preferable upper limit is 5.40, and a further preferable upper limit is 5.30. However, since excessive reduction in the specific gravity exhibits a tendency of lowering the stability of the glass and of raising liquidus temperature, the specific gravity is preferably set to be equal to or more than 4.50. A more preferable lower limit of the specific gravity is 4.70, a still more preferable lower limit is 4.90, a further preferable lower limit is 5.00, and a further more preferable lower limit is 5.10.

(Transmittance Properties)

Next, light transmitting properties of the optical glass I will be described.

The optical glass I can exhibit high light transmittance over a broad wavelength region in the visible region. In a preferable embodiment of the optical glass I, a coloring degree of λ70 being equal to or less than 680 nm is shown. A more preferable range of λ70 is equal to or less than 660 nm, a still more preferable range is equal to or less than 650 nm, a further preferable range is equal to or less than 600 nm, a further more preferable range is equal to or less than 560 nm, and a still further more preferable range is equal to or less than 530 nm. The lower limit of λ70 is not particularly limited, and 380 nm may be considered as a rough standard of the lower limit of λ70.

In the present invention, λ70 means a wavelength at which light transmittance becomes 70%, in the wavelength range of 280 to 700 nm. Here, the light transmittance means spectral transmittance obtained by using a glass sample having been polished so as to have a thickness of 10.0±0.1 mm and having surfaces that are parallel to each other and by causing light to enter the sample from the direction perpendicular to the polished surface, that is, the light transmittance means Iout/Iin when denoting the intensity of light entering the sample by Iin and denoting the intensity of light having passed through the sample by Tout. The spectral transmittance also includes reflection loss of light on the surface of a sample. Furthermore, the above-described polishing means that the surface roughness has been smoothened to a sufficiently small state with respect to a wavelength in a measurement wavelength range. The optical glass I preferably has light transmittance exceeding 70% in the visible region on a wavelength side longer than λ70.

λ5 is a wavelength at which the light transmittance measured by the method described above regarding the λ70 becomes 5%, and a preferable range of λ5 is equal to or less than 450 nm, a more preferable range is equal to or less than 430 nm, a still more preferable range is equal to or less than 410 nm, a further preferable range is equal to or less than 400 nm, a further more preferable range is equal to or less than 390 nm, and a still further more preferable range is equal to or less than 380 nm. The lower limit of λ5 is not particularly limited, and 300 nm may be considered as a rough standard of the lower limit of λ5.

The above spectral transmittance is measured in the wavelength range of 280 to 700 nm as described above, and usually, when making a wavelength longer starting from λ5, light transmittance increases, and when λ70 is reached, high transmittance of equal to or more than 70% is kept up to wavelength of 700 nm.

(Glass Transition Temperature)

The optical glass I is glass suitable for forming a smooth optically functional surface by polishing. The suitability to cold processing such as polishing, that is, the cold processing property, is indirectly related to the glass transition temperature. Glass with a low glass transition temperature is better suited to precision press molding than to cold processing. In contrast, glass with a high glass transition temperature is better suited to cold processing than to precision press molding, and have a good cold processing property. Accordingly, also in the optical glass I, the glass transition temperature is preferably set to not an excessively low temperature, preferably set to be equal to or more than 650° C., more preferably set to be equal to or more than 680° C., still more preferably set to be equal to or more than 700° C., further preferably set to be equal to or more than 710° C., further more preferably set to be equal to or more than 730° C., and still further more preferably set to be equal to or more than 740° C.

However, when the glass transition temperature is too high, heating temperature in performing molding after reheating and softening glass becomes high, and deterioration of a mold to be used for the molding becomes significant, annealing temperature also becomes high, and deterioration as well as wear and tear of an annealing furnace also become significant. Accordingly, the glass transition temperature is preferably set to be equal to or less than 850° C., more preferably set to be equal to or less than 800° C., still more preferably set to be equal to or less than 780° C., and is further preferably equal to or less than 760° C.

[Optical Glass II]

Next, optical glass II that is optical glass of another aspect of the present invention will be described.

The optical glass II is oxide glass:
containing $Si^{4+}$, $B^{3+}$, $La^{3+}$, $Ti^{4+}$, $Nb^{5+}$, and $Zr^{4+}$ as essential components;
containing, denoted as cation %;
$Si^{4+}$ and $B^{3+}$ of 5 to 55% in total,
$La^{3+}$ of 10 to 50%, with a total content of $La^{3+}$, $Gd^{3+}$, $Y^{3+}$ and $Yb^{3+}$ being equal to or less than 70%,
$Ti^{4+}$, $Nb^{5+}$, $Ta^{5+}$ and $W^{6+}$ of 23 to 70% in total, with a content of $Ti^{4+}$ being more than 22%, wherein:
a cation ratio of a content of $Y^{3+}$ to the total content of $La^{3+}$, $Gd^{3+}$, $Y^{3+}$ and $Yb^{3+}$ [$Y^{3+}/(La^{3+}+Gd^{3+}+Y^{3+}+Yb^{3+})$] is equal to or less than 0.14;
a cation ratio of a content of $Ba^{2+}$ to the total content of $La^{3+}$, $Gd^{3+}$, $Y^{3+}$ and $Yb^{3+}$ [$Ba^{2+}/(La^{3+}+Gd^{3+}+Y^{3+}+Yb^{3+})$] is equal to or less than 0.40;
a cation ratio of the total content of $Zr^{4+}$, $Ti^{4+}$, $Nb^{5+}$, $Ta^{5+}$ and $W^{6+}$ to a content of $Zr^{4+}$ [$(Zr^{4+}+Ti^{4+}+Nb^{5+}+Ta^{5+}+W^{6+})/Zr^{4+}$] is equal to or more than 2;
a cation ratio of a content of $Ti^{4+}$ to a content of $B^{3+}$ ($Ti^{4+}/B^{3+}$) is equal to or more than 0.85; and
an Abbé number vd is in a range from being equal to or more than 18 to less than 35, and a refractive index nd satisfies Expression (2) below, $$nd \geq 2.540 - (0.02 \times vd) \quad (2).$$

The optical glass II is glass having a high refractive index and a low dispersion property while maintaining glass stability, as in the case of the optical glass I, but has a content of $Ti^{4+}$ more than that in the optical glass I. In the optical glass I, the content of $Ti^{4+}$ is set to be equal to or less than 22%, and spectral transmittance in the visible region is set to be high and a partial dispersion ratio is suppressed to be low so as to be advantageous for high-order chromatic aberration correction. Furthermore, in the range in which the Abbé number vd is approximately equal to or more than 24.28, the lower limit of the refractive index is higher than the lower limit of the refractive index of the optical glass I.

In contrast, the optical glass II has the content of $Ti^{4+}$ that exceeds 22%, and exhibits a high refractive index and a low dispersion property within a range in which the Abbé number vd is broader than the range in the optical glass I.

Hereinafter, points different from those in the optical glass I will be described regarding the composition and properties of the optical glass II. Accordingly, explanations regarding the composition and properties which are not described below are the same as the composition and properties in the optical glass I.

$Ti^{4+}$, $Nb^{5+}$, $Ta^{5+}$ and $W^{6+}$ have the functions of enhancing the refractive index, and of improving resistance to devitrification, suppressing the rise of liquidus temperature, and improving chemical durability. When the total content of $Ti^{4+}$, $Nb^{5+}$, $Ta^{5+}$ and $W^{6+}$ is less than 23%, it becomes difficult to obtain the effects, and when the total content of $Ti^{4+}$, $Nb^{5+}$, $Ta^{5+}$ and $W^{6+}$ exceeds 70%, resistance to devitrification is deteriorated and the liquidus temperature rises. Furthermore, dispersion becomes high and coloring of the glass is intensified. Accordingly, the total content of $Ti^{4+}$, $Nb^{5+}$, $Ta^{5+}$ and $W^{6+}$ is set to 23 to 70%. A preferable upper limit of the total content of $Ti^{4+}$, $Nb^{5+}$, $Ta^{5+}$ and $W^{6+}$ is 60%, a more preferable upper limit is 55%, a still more preferable upper limit is 50%, a further preferable upper limit is 45%, and a further more preferable upper limit is 40%; and a preferable lower limit of the total content of $Ti^{4+}$, $Nb^{5+}$, $Ta^{5+}$ and $W^{6+}$ is 24%, a more preferable lower limit is 25%, a still more preferable lower limit is 26%, a further preferable lower limit is 27%, and a further more preferable lower limit is 28%.

In the optical glass II, resistance to devitrification can be improved by setting the content of $Ti^{4+}$ to be more than 22% while setting the total content of $Ti^{4+}$, $Nb^{5+}$, $Ta^{5+}$ and $W^{6+}$ to be in the above-described range. In addition, it is effective also from the viewpoint of suppressing the rise of liquidus temperature.

A preferable lower limit of the content of $Ti^{4+}$ is 22.5%, a more preferable lower limit is 23%, and a still more preferable lower limit is 24%; and a preferable upper limit of the content of $Ti^{4+}$ is 60%, a more preferable upper limit is 50%, a still more preferable upper limit is 45%, a further preferable upper limit is 40%, a further more preferable upper limit is 35%, and a still further more preferable upper limit is 30%.

The cation ratio of the content of $Y^{3+}$ to the total content of $La^{3+}$, $Gd^{3+}$, $Y^{3+}$ and $Yb^{3+}$ [$Y^{3+}/(La^{3+}+Gd^{3+}+Y^{3+}+Yb^{3+})$] is set to be equal to or less than 0.14, in order to achieve a high refractive index and low dispersion while maintaining glass stability. For the above reason, a preferable upper limit of the cation ratio [$Y^{3+}/(La^{3+}+Gd^{3+}+Y^{3+}+Yb^{3})$] is 0.13, a more preferable upper limit is 0.12, and a still more preferable upper limit is 0.11. Among La, Gd, Y and Yb, an element having the smallest atomic weight is Y. Accordingly, from the viewpoint of making the specific gravity of the glass small, a preferable lower limit of the cation ratio [$Y^{3+}/(La^{3+}+Gd^{3+}+Y^{3+}+Yb^{3+})$] is 0.01, a more preferable lower limit is 0.02, a still more preferable lower limit is 0.03, a further preferable lower limit is 0.04, and a further more preferable lower limit is 0.05. The optical glass II is suitable as the material of a lens for a camera in which an autofocus function is mounted, and power consumption at the time of autofocusing can be reduced by making the specific gravity of the glass small.

From the viewpoint of making the specific gravity of the glass small, the cation ratio of the content of $Y^{3+}$ to the total content of $Gd^{3+}$, $Y^{3+}$ and $Yb^{3+}$ [$Y^{3+}/(Gd^{3+}+Y^{3+}+Yb^{3+})$] is preferably set to be more than 0.60 while the cation ratio [$Y^{3+}/(La^{3+}+Gd^{3+}+Y^{3+}+Yb^{3+})$] being set to be equal to or less than 0.14. For the above-described reason, a more preferable lower limit of the cation ratio [$Y^{3+}/(Gd^{3+}+Y^{3+}+Yb^{3+})$] is 0.61, a still more preferable lower limit is 0.62, a further preferable lower limit is 0.63, and a further more preferable lower limit is 0.64.

From the viewpoint of achieving a high refractive index and low dispersion while satisfactorily maintaining the glass stability, the total content of $Gd^{3+}$, $Y^{3+}$ and $Yb^{3+}$ is preferably set to be equal to or more than 1.0%. Each of $Gd^{3+}$, $Y^{3+}$ and $Yb^{3+}$ has the function of lowering liquidus temperature and considerably improving resistance to devitrification, by causing the each to coexist with $La^{3+}$. In order to satisfactorily obtain the function, the total content of $Gd^{3+}$, $Y^{3+}$ and $Yb^{3+}$ is more preferably set to be equal to or more than 1.5%, still more preferably set to be equal to or more than 2.0%, further preferably set to be equal to or more than 2.5%, further more preferably set to be equal to or more than 3.0%, and still further more preferably set to be equal to or more than 3.5%. A preferable upper limit of the total content of $Gd^{3+}$, $Y^{3+}$ and $Yb^{3+}$ is 35%, a more preferable upper limit is 30%, a still more preferable upper limit is 25%, a further preferable upper limit is 20%, a further more preferable upper limit is 15%, a still further more preferable upper limit is 10%, and an even further more preferable upper limit is 7%.

For the reason same as that for the optical glass I, a preferable lower limit exists also in the cation ratio $[(Gd^{3+}+Y^{3+}+Yb^{3+})/(La^{3+}+Gd^{3+}+Y^{3+}+Yb^{3+})]$. A preferable lower limit of the cation ratio $[(Gd^{3+}+Y^{3+}+Yb^{3+})/(La^{3+}+Gd^{3+}+Y^{3+}+Yb^{3+})]$ exceed 0, a more preferable lower limit is 0.02, a still more preferable lower limit is 0.03, further preferable lower limit is 0.04, and a further more preferable lower limit is 0.05.

For the reason same as that for the optical glass I, a preferable range exists also in the total content of $La^{3+}$, $Gd^{3+}$, $Y^{3+}$, $Yb^{3+}$, $Zr^{4+}$, $Ti^{4+}$, $Nb^{5+}$, $Ta^{5+}$, $W^{6+}$ and $Bi^{3+}$. A preferable lower limit of the total content of $La^{3+}$, $Gd^{3+}$, $Y^{3+}$, $Yb^{3+}$, $Zr^{4+}$, $Ti^{4+}$, $Nb^{5+}$, $Ta^{5+}$, $W^{6+}$ and $Bi^{3+}$ is 60%, a more preferable lower limit is 64%, a still more preferable lower limit is 65%, a further preferable lower limit is 66%, and a further more preferable lower limit is 67%. A preferable upper limit of the total content of $La^{3+}$, $Gd^{3+}$, $Y^{3+}$, $Yb^{3+}$, $Zr^{4+}$, $Ti^{4+}$, $Nb^{5+}$, $Ta^{5+}$, $W^{6+}$ and $Bi^{3+}$ is 90%, a more preferable upper limit is 85%, a still more preferable upper limit is 80%, and a further preferable upper limit is 75%.

For the reason same as that for the optical glass I, a preferable range exists also in the cation ratio $[Si^{4+}/(Si^{4+}+B^{3+})]$. A preferable lower limit of the cation ratio $[Si^{4+}/(Si^{4+}+B^{3+})]$ is 0.10, a more preferable lower limit is 0.13, a still more preferable lower limit is 0.16, a further preferable lower limit is 0.19, and a further more preferable lower limit is 0.22. A preferable range exists also in the cation ratio $[Si^{4+}/(Si^{4+}+B^{3+})]$. A preferable upper limit of the cation ratio $[Si^{4+}/(Si^{4+}+B^{3+})]$ is 0.80, a more preferable upper limit is 0.60, a still more preferable upper limit is 0.50, a further preferable upper limit is 0.40, and a further more preferable upper limit is 0.35.

From the viewpoint of achieving a high refractive index and low dispersion while satisfactorily maintaining glass stability, a preferable lower limit of the cation ratio of the total content $Si^{4+}$ and $B^{3+}$ to the total content of $La^{3+}$, $Gd^{3+}$, $Y^{3+}$ and $Yb^{3+}$ $[(Si^{4+}+B^{3+})/(La^{3+}+Gd^{3+}+Y^{3+}+Yb^{3+})]$ is 0.10, a more preferable lower limit is 0.20, a still more preferable lower limit is 0.30, a further preferable lower limit is 0.40, a further more preferable lower limit is 0.50, and a still further more preferable lower limit is 0.60; and a preferable upper limit is 1.05, a more preferable upper limit is 1.0, a still more preferable upper limit is 0.95, a further preferable upper limit is 0.90, a further more preferable upper limit is 0.85, and a still further more preferable upper limit is 0.83.

From the viewpoint of imparting a high refractive index and a low dispersion property while maintaining glass stability, the cation ratio of the total content of $Zr^{4+}$, $Ti^{4+}$, $Nb^{5+}$, $Ta^{5+}$ and $W^{6+}$ to the content of $Zr^{4+}[(Zr^{4+}+Ti^{4+}+Nb^{5+}+Ta^{5+}+W^{6+})/Zr^{4+}]$ is equal to or more than 2. For the above-described reason, a preferable lower limit of the cation ratio $[(Zr^{4+}+Ti^{4+}+Nb^{5+}+Ta^{5+}+W^{6+})/Zr^{4+}]$ is 3, a more preferable lower limit is 3.5, a still more preferable lower limit is 4, a further preferable lower limit is 4.5, and a further more preferable lower limit is 5; and a preferable upper limit is 72, a more preferable upper limit is 50, a still more preferable upper limit is 40, a further preferable upper limit is 30, a further more preferable upper limit is 20, and a still further more preferable upper limit is 10.

As compared with the optical glass I in which the content of $Ti^{4+}$ is equal to or less than 22% and the Abbé number vd is in the range from 23 to 35, the optical glass II contains $Ti^{4+}$ in an amount more than 22% and has a lower limit of the Abbé number vd is 18, and exhibits excellent glass stability and a high refractive index property even in the range of small Abbé number vd.

In the optical glass II, when the Abbé number vd exceeds 35, it becomes difficult to satisfactorily maintain the glass stability. On the other hand, since the optical glass II contains $Ti^{4+}$ in a relatively large amount, the lower limit of the Abbé number vd is 18.

(Refractive Index Nd and Abbé Number vd)

From the viewpoint of providing an optical element material suitable for chromatic aberration correction, a preferable lower limit of the Abbé number vd is 19, a more preferable lower limit is 20, a still more preferable lower limit is 21, a further preferable lower limit is 22, and a further more preferable lower limit is 23. On the other hand, from the viewpoint of satisfactorily maintaining the glass stability, a preferable upper limit of the Abbé number vd is 32, a more preferable upper limit is 30, a still more preferable upper limit is 29, a further preferable upper limit is 28, and a further more preferable upper limit is 27.

In the optical glass II in which the Abbé number vd can be adjusted in a relatively broad range, from the viewpoint of providing a glass material suitable for downsizing and achieving high functionalization of the optical systems, the refractive index nd and the Abbé number vd satisfy the Expression (2) below. The glass that satisfies the Expression (2) is, as compared with conventional high refractive index and low dispersion glass, also glass having a high refractive index at the same Abbé number vd, that is, the glass within the upper left range in the optical property chart having previously explained, and is the glass of high usefulness.

$$nd \geq 2.540 - (0.02 \times vd) \qquad (2)$$

Furthermore, from the above-described reason, the refractive index nd and the Abbé number vd preferably satisfy Expression (2-1) below, more preferably satisfy Expression (2-2) below, further preferably satisfy Expression (2-3) below, and further more preferably satisfy Expression (2-4) below.

$$nd \geq 2.543 - (0.02 \times vd) \qquad (2-1)$$

$$nd \geq 2.546 - (0.02 \times vd) \qquad (2-2)$$

$$nd \geq 2.549 - (0.02 \times vd) \qquad (2-3)$$

$$nd \geq 2.550 - (0.02 \times vd) \qquad (2-4)$$

Since the upper limit of the refractive index nd is naturally determined from the composition range of the optical glass II, the upper limit is not particularly limited. From the viewpoint of maintaining the glass stability, the refractive index nd is preferably set to be equal to or less than 2.40, more preferably set to be equal to or less than 2.30, still more preferably set to be equal to or less than 2.20, even more preferably set to be equal to or less than 2.15, yet more preferably set to be equal to or less than 2.10, and further preferably set to be equal to or less than 2.09.

(Partial Dispersion Property)

A preferable upper limit and lower limit of the partial dispersion ratio Pg, F, and a preferable upper limit of ΔPg, F in the optical glass II are the same as those in the optical glass I. In contrast, a preferable lower limit of ΔPg, F in the optical glass II is −0.001, a more preferable lower limit is 0.000, and a further preferable lower limit is 0.003.

(Specific Gravity)

For the purpose of achieving downsizing of the optical elements, a preferable range of the specific gravity of the optical glass II is equal to or less than 5.50, a more preferable range is equal to or less than 5.40, a still more preferable range is equal to or less than 5.30, and a further preferable range is equal to or less than 5.20. However, since excessive reduction in the specific gravity exhibits tendencies of lowering the stability of the glass and raising liquidus temperature, the specific gravity is preferably set to be equal to or more than 4.50. A preferable lower limit of the specific gravity is 4.60, a still more preferable lower limit is 4.70, a further preferable lower limit is 4.80, and a further more preferable lower limit is 4.90.

(Transmittance Properties)

Light transmitting properties of the optical glass II are similar to properties of the optical glass I, but a preferable range of $\lambda 5$ is equal to or less than 450 nm, a more preferable range is equal to or less than 430 nm, a still more preferable range is equal to or less than 410 nm, a further preferable range is equal to or less than 400 nm, a further more preferable range is equal to or less than 390 nm, and a still further more preferable range is equal to or less than 380 nm. The lower limit of $\lambda 5$ is not particularly limited, and it may be considered that 300 nm is a rough standard of the lower limit of $\lambda 5$.

(Glass Transition Temperature)

Also in the case of the glass transition temperature of the optical glass II, preferable lower limit and preferable upper limit exist for the same reason as that for the glass transition temperature of the optical glass I. A preferable lower limit of the glass transition temperature of the optical glass II is 650° C., a more preferable lower limit is 670° C., a still more preferable lower limit is 680° C., a further preferable lower limit is 690° C., a further more preferable lower limit is 700° C., a still further more preferable lower limit is 710° C., and an even further more preferable lower limit is 720° C. On the other hand, a preferable upper limit of the glass transition temperature is 850° C., a more preferable upper limit is 800° C., a still more preferable upper limit is 780° C., a further preferable upper limit is 760° C., a still further preferable upper limit is 750° C., and a further more preferable upper limit is 740° C.

Other compositions and properties of the optical glass II are the same as those of the optical glass I.

[Manufacturing Method of Optical Glass]

Next, a manufacturing method of the optical glass according to an aspect of the present invention will be described.

The manufacturing method of the optical glass according to an aspect of the present invention is a method which includes melting glass starting materials through heating and then molding the obtained molten glass, in which the glass starting materials are compounded so as to give the above optical glass of the present invention, and the melting is performed using a glass melting vessel made of platinum or platinum alloy.

For example, powdery compound starting materials or cullet starting materials are weighed and compounded in accordance with a desired glass composition, the resultant starting materials are supplied into a melting vessel made of platinum or platinum alloy, and then are molten through heating the starting materials. After vitrifying the starting materials by sufficiently melting the same, the temperature of the molten glass is raised and the glass is subjected to clarification. The clarified molten glass is homogenized by stirring with a stirrer, and the resultant glass is continuously supplied to a glass outflow pipe, flowed out, quenched, and solidified to thereby give a glass molded article.

From the viewpoint of obtaining a glass having stable various properties including homogeneity, low coloring and optical properties, the melting temperature of optical glass is desirably set to be in the range of 1200 to 1500° C.

[Press-molding Glass Gob]

The press-molding glass gob according to an aspect of the present invention is comprised of the optical glass of the above-described aspect. The shape of the gob is set to a shape that is easily press-molded in accordance with a shape of a desired press-molded article. Furthermore, the mass of the gob is also set in accordance with a press-molded article. According to an aspect of the present invention, since glass excellent in stability can be used, the glass is hard to be devitrified even when reheating, softening and press molding are performed, and molded articles with high quality can be stably manufactured.

A manufacturing example of a press-molding glass gob is as follows.

In a first manufacturing example, the molten glass flowed out from the pipe is continuously cast into a mold disposed horizontally on the lower side of an outflow pipe, and the resultant molten glass is molded in a plate shape having a certain thickness. The molded glass is continuously drawn out from an opening provided on a side surface of the mold in the horizontal direction. The drawing-out of the plate-shaped glass molded article is performed with a belt conveyer. It is possible to obtain a glass molded article having a prescribed thickness and a prescribed plate width by setting the draw-out rate of the belt conveyer to be constant so that the plate thickness of the glass molded article becomes constant. The glass molded article is conveyed, with the belt conveyer, to an annealing furnace and is gradually cooled. The gradually cooled glass molded article is cut or cleaved in the plate thickness direction, and the resultant molded article was formed into a press-molding glass gob by being subjected to polishing processing or barrel-polishing.

In a second manufacturing example, in place of the above-described mold, molten glass is cast into a mold having a cylindrical shape to thereby mold a column-shaped glass molded article. The glass molded article molded in the mold is drawn out vertically downward from an opening at the bottom part of the mold, at a constant rate. The draw-out rate may be implemented so that the liquid level of the molten glass in the mold becomes constant. After gradually cooling the glass molded article, the molded article is cut or cleaved, and is then subjected to polishing processing or barrel-polishing to thereby be formed into a press-molding glass gob.

In a third manufacturing example, a molding machine in which plural molding molds are arranged at regular intervals on the circumference of a circular turn table is disposed on the lower side of the outflow pipe, the turn table is index-rotated, one of staying positions of molding molds is determined to be a positon where molten glass is supplied to the molding mold (referred to as a cast positon) and the molten glass is supplied, and after molding the supplied molten glass into a glass molded article, the glass molded article is taken out from a prescribed staying position of the molding mold (take-out position), different from the cast positon. Which staying positon is to be selected as the take-out position may be determined in consideration of the rotation rate of the turn table, cooling rate of the glass, and the like. The supply of the molten glass into the molding mold at the cast positon can be performed by: a method of dropping molten glass from a glass outflow port of the outflow pipe and receiving the glass droplets with the above-described molding mold; a method of bringing a molding mold that stays at the cast positon close to the glass outflow port to thereby support the lower end part of the flown-out molten glass flow and to form a constriction in the middle of the glass flow, and quickly moving down the molding mold in the vertical direction at a prescribed timing to thereby separate the molten glass below the constriction and receive it on the molding mold; a method of cutting the flown-out molten glass flow with a cutting blade and receiving a block of separated molten glass with a molding mold that stays at the cast position, or the like.

It suffices to use a known method to mold the glass on the molding mold. Among such methods, gas can be blown upward from the molding mold to apply upward air pressure to the glass gob, the glass gob can be molded while being floated, and the generation of wrinkles in the surface of the molded glass article and cracking of the molded glass article due to contact with the mold can be prevented.

The shape of the glass molded article can be formed into a spherical shape, an ellipsoidal shape, or a shape which has one axis of rotational symmetry and in which two surfaces facing the axis direction of the axis of rotational symmetry are both convex outward, depending on the selection of the shape of a molding mold or the way of gas ejection. These shapes are suitable for a glass gob for press-molding an optical element such as a lens or an optical element blank. The glass molded article thus obtained can be formed into a press-molding glass gob, directly or by polishing or barrel polishing of the surface thereof.

[Optical Element Blank and Manufacturing Method Thereof]

Next, the optical element blank according to an aspect of the present invention and a manufacturing method thereof will be described.

The optical element blank according to an aspect of the present invention is comprised of the optical glass of the above-described aspect. The optical element blank according to an aspect of the present invention is suitable as the glass base material for producing an optical element having various properties of the optical glass of the above-described aspect.

The optical element blank is a glass molded article having a shape that approximates the shape of an optical element, in which a processing margin to be removed by grinding and polishing is added to the shape of a desired optical element.

A first aspect of the manufacturing method of the optical element blank according to an aspect of the present invention is a manufacturing method of an optical element blank to be finished to an optical element by grinding and polishing, in which the press-molding glass gob of the above-described aspect is heated and softened to perform press molding. The method is also referred to as a reheating press molding method.

A second aspect of the manufacturing method of the optical element blank according to an aspect of the present invention is a manufacturing method of an optical element blank to be finished to an optical element by grinding and polishing, in which glass starting materials are molten by heating to subject the obtained molten glass to press molding, thereby producing the optical element blank of the above-described aspect. This method is also referred to as a direct press molding method.

In the first aspect, a press molding mold having a molding surface of a shape that approximates the shape obtained by reversing the surface shape of a desired optical element is prepared. The press molding mold is composed of molding parts including an upper mold, a lower mold, and as needed, a body mold Next, the press-molding glass gob is softened by heating, introduced into a preheated lower mold, pressed by an upper mold facing the lower mold, and molded into an optical element blank. To prevent fusion of the glass and the mold during press molding, the surface of the press-molding glass gob can be uniformly coated in advance with a mold separating agent in powder form, such as boron nitride.

Next, the molds are separated, and the optical element blank is removed from the pressing mold and annealed. This annealing process reduces distortion within the glass and achieves optical properties such as the refractive index that are of the desired values.

Known items can be applied for the conditions under which the glass gob is heated, the press-molding conditions, the materials employed in the pressing mold, and the like. The above processing can be conducted in air.

In the second aspect, the pressing mold is comprised of mold parts including an upper mold, a lower mold, and as needed, a body mold. The molding surfaces of the pressing mold are processed into a shape that is the reverse of the surface shape of the optical element blank, as set forth above.

A powder mold release agent such as boron nitride is suitably and uniformly coated on the molding surface of the lower mold, and a glass melt that has been molten in conformity with the method of manufacturing optical glass set forth above is caused to flow out onto the molding surface of the lower mold. When a desired quantity of glass melt has accumulated on the lower mold, the flow of glass melt is cut with a cutting blade called a shear. After obtaining a glass melt gob on the lower mold in this manner, the lower mold is displaced for each glass melt gob to a position where the upper mold is standing by above. The glass is pressed by the upper mold and the lower mold to mold an optical element blank.

The mold is then separated, the optical element blank is removed from the pressing mold, and an annealing process is conducted. This annealing process reduces distortion within the glass and achieves optical properties such as the refractive index that are of the desired values.

Known items can be applied for the conditions under which the glass gob is heated, the press-molding conditions, the materials employed in the pressing mold, and the like. The above processing can be conducted in air.

[Optical Element and Manufacturing Method Thereof]

Next, the optical element according to an aspect of the present invention will be described.

The optical element according to an aspect of the present invention is comprised of the optical glass of the above-described aspect. Since the optical element according to an aspect of the present invention has various properties of the optical glass of the above-described aspect, the optical element is effective for highly functionalizing and downsizing optical systems. Various types of lenses, prisms and the like can be exemplified as optical elements of the present invention. Furthermore, as examples of lenses, various lenses in which the lens surface is a spherical surface or an aspheric surface, such as concave-meniscus lenses, convex-meniscus lenses, biconvex lenses, biconcave lenses, plano-convex lenses and plano-concave lenses, can be exemplified.

These lenses can correct chromatic aberration by being combined with a lens made of high dispersion glass or a lens made of low dispersion glass, and are suitable as lenses for chromatic aberration correction. In addition, these lenses are lenses that are useful also for downsizing optical systems.

Moreover, since the prism has a high refractive index, when being incorporated in an imaging optical system, an optical system that is compact and has a broad field angle can also be realized by bending a light path and directing the path to a desired direction.

A film that controls light transmittance, such as an anti-reflective film, can also be provided on the optically functional surface of the optical element according to an aspect of the present invention.

Next, a manufacturing method of the optical element according to an aspect of the present invention will be described.

The manufacturing method of the optical element according to an aspect of the present invention is characterized by processing the optical element blank produced by the method of the above-described aspect. In an aspect of the present invention, since optical glass having excellent processability can be used as the optical glass constituting the optical element blank, known methods can be applied as a processing method.

EXAMPLES

Next, the present invention will be described in more detail on the basis of Examples. However, the present invention is not limited at all to embodiments shown in Examples. Optical glasses according to various aspects of the present invention can be obtained by applying the above-described method for adjusting the content of each of glass components while referring to Examples described below.

(Production Example of Optical Glass)

First, nitrate, sulfate, hydroxide, oxide, boric acid and the like were used as starting materials so that oxide glasses Nos. 1 to 15 having compositions (denoted as cation %) shown in Table 1 and oxide glasses Nos. 16 to 70 shown in Table 2 can be obtained, respective starting material powders were weighed and sufficiently mixed to thereby form compounded starting materials, and each of the compounded starting materials was placed in a platinum crucible or a platinum alloy crucible, which was heated to 1300 to 1500° C., molten, clarified and stirred, with the result that homogeneous molten glass was formed.

The molten glass was poured into a preheated mold and quenched, kept for 2 hours at temperatures close to the glass transition temperature, and after that, the resultant glass was cooled gradually to thereby give respective optical glasses of oxide glasses Nos. 1 to 70. Mixing of imprities such as platinum inclusion was not recognized in glasses of Nos. 1 to 70.

The anion component of oxide glasses Nos. 1 to 70 is $O^{2-}$ in the whole amount.

Oxide glasses Nos. 1 to 15 correspond to the optical glass I, and oxide glasses Nos. 16 to 70 correspond to the optical glass II.

Measurement of Glass Properties

Properties of respective glasses were measured by methods shown below. Measurement results are shown in Tables 1 and 2.

(1) Refractive index nd and Abbé number vd

Measurements were performed on the optical glass having been cooled at a temperature drop rate of 30° C. per 1 hour.

(2) Partial dispersion ratio Pg, F; Difference ΔPg, F of partial dispersion ratio from normal line After measuring refractive indices ng, nF and nc for the optical glass having been cooled at a temperature drop rate of 30° C. per 1 hour, the partial dispersion ratio Pg, F was calculated from these values.

Difference ΔPg, F of a partial dispersion ratio from the normal line was calculated from the partial dispersion ratio Pg, F and the partial dispersion ratio Pg, F(0) on the normal line that was calculated from the Abbé number vd.

(3) Glass transition temperature Tg

Tg was measured under a condition of temperature rise rate of 10° C./min, by using a differential scanning calorimeter (DSC).

(4) Liquidus temperature

The glass was placed in a furnace heated to a prescribed temperature and was kept for 2 hours, the resultant glass was cooled and then the inside of the glass was observed with an optical microscope at 100-fold magnification, and liquidus temperature was determined from the presence or absence of crystal.

(5) Specific gravity

Specific gravity was measured by the Archimedes method.

(6) λ70, λ5

Through the use of a glass sample having been polished to a thickness of 10.0±0.1 mm and having surfaces parallel to each other, light having intensity of Iin was caused to enter the sample from the direction vertical to the polished surface, the intensity Tout of light having passed through the sample was measured and light transmittance Iout/Iin was calculated by a spectrophotometer, and the wavelength at which the light transmittance became 70% was defined as λ70 and the wavelength at which the light transmittance became 5% was defined as λ5.

Measurement of Number Density of Crystals Deposited in Glass Manufacturing

Glass is obtained by molding molten glass. When glass stability is lowered, the number of crystal grains contained in glass obtained by pouring molten glass into a mold and then molding the same increases.

Accordingly, the glass stability, in particular, resistance to devitrification when molding glass melt can be evaluated on the basis of the number of crystals contained in glass that has been molten and molded under a constant condition. An example of evaluation methods will be shown below.

Through the use of nitrate, sulfate, hydroxide, oxide, boric acid and the like as starting materials, respective starting material powders are weighed and mixed sufficiently to thereby form compounded starting materials, and the compounded starting materials are placed in a crucible made of platinum having a volume of 300 ml, the resultant starting materials are heated and molten at 1400° C. for 2 hours to thereby produce 200 g of homogeneous molten glass. In the process, the molten glass is stirred and shaken several times.

After the lapse of 2 hours, the crucible in which the molten glass is placed is taken out from a furnace at 1300 to 1500° C., which is stirred and shaken for 15 to 20 seconds, and after that, the molten glass is poured into a mold (60 mm×40 mm×10 mm to 15 mm) made of carbon and is put into a gradually cooling furnace, with the result that distortion is removed.

The inside of the obtained glass is observed using an optical microscope (magnification of 100), the number of crystals having been deposited is counted and the number of crystals contained per 1 kg of the glass is calculated, and the resultant value is defined as a number density (/kg) of crystals.

All number densities of respective glass crystals of Nos. 1 to 59 that were evaluated by the above method were 0/kg.

COMPARATIVE EXAMPLE

For comparison, reproduction experiments were carried out for compositions in Example Nos. 3 and 5 in Literature 1 and compositions in Example No. 16 in Literature 2. Denoted as cation %, the compositions in Example Nos. 3 and 5 in Literature 1 are shown in Table 2, and the composition in Example No. 16 in Literature 2 is shown in Table 1.

Furthermore, vitrification was attempted by melting starting materials for a composition which satisfies conditions of the optical glass I excluding the cation ratio of $Ti^{4+}/B^{3+}$ and which has a cation ratio of $Ti^{4+}/B^{3+}$ of 0.804 that is smaller than the cation ratio of $Ti^{4+}/B^{3+}$ in the optical glass I. The composition is referred to as a composition A. The composition A is shown in Table 1.

Moreover, vitrification was attempted by melting starting materials for a composition that satisfies conditions of the optical glass II excluding the cation ratio of $Ti^{4+}/B^{3+}$ and which has a cation ratio of $Ti^{4+}/B^{3+}$ of 0.803 that is smaller than the cation ratio of $Ti^{4+}/B^{3+}$ in the optical glass II. The composition is referred to as a composition B. The composition B is shown in Table 2.

In the cases of the compositions in Example Nos. 3 and 5 in Literature 1, the composition in Example No. 16 in Literature 2 and the composition A, molten materials became clouded and were not vitrified.

Although the composition B was vitrified, but when the number density of crystals having deposited in the glass was measured by the above measurement method of a number density of crystals deposited at the time of glass manufacturing, the number density was 998/kg.

The fact that the number density of crystals, obtained by the above-described evaluation method, is less than 1000/kg, more preferably less than 500/kg, still more preferably less than 300/kg, further preferably less than 200/kg, further more preferably less than 100/kg, still further more preferably less than 50/kg, even further more preferably less than 20/kg, and yet further more preferably 0/kg, can be used as indices of homogeneous optical glass having further more excellent glass stability.

TABLE 1

| | No. 1 Cation % | No. 2 Cation % | No. 3 Cation % | No. 4 Cation % | No. 5 Cation % | No. 6 Cation % | No. 7 Cation % |
| --- | --- | --- | --- | --- | --- | --- | --- |
| $Si^{4+}$ | 7.16 | 8.81 | 8.33 | 6.70 | 7.69 | 7.65 | 9.50 |
| $B^{3+}$ | 20.77 | 18.88 | 19.68 | 21.66 | 19.72 | 20.38 | 18.83 |
| $Li^+$ | 0.00 | 0.00 | 0.00 | 0.00 | 0.00 | 0.00 | 0.00 |
| $Na^+$ | 0.00 | 0.00 | 0.00 | 0.00 | 0.00 | 0.00 | 0.00 |
| $K^+$ | 0.00 | 0.00 | 0.00 | 0.00 | 0.00 | 0.00 | 0.00 |
| $Mg^{2+}$ | 0.00 | 0.00 | 0.00 | 0.00 | 0.00 | 0.00 | 0.00 |
| $Ca^{2+}$ | 0.00 | 0.00 | 0.00 | 0.00 | 0.00 | 0.00 | 0.00 |
| $Sr^{2+}$ | 0.00 | 0.00 | 0.00 | 0.00 | 0.00 | 0.00 | 0.00 |
| $Ba^{2+}$ | 0.00 | 0.00 | 0.00 | 0.00 | 0.00 | 0.00 | 0.00 |
| $Zn^{2+}$ | 1.79 | 1.72 | 1.47 | 0.00 | 1.00 | 0.99 | 1.75 |
| $La^{3+}$ | 30.04 | 29.72 | 29.78 | 30.91 | 30.86 | 30.50 | 29.37 |
| $Gd^{3+}$ | 5.38 | 5.64 | 5.65 | 6.47 | 6.47 | 6.43 | 4.26 |
| $Y^{3+}$ | 0.51 | 0.49 | 0.49 | 0.50 | 0.00 | 0.00 | 0.50 |
| $Yb^{3+}$ | 0.00 | 0.00 | 0.00 | 0.00 | 0.00 | 0.00 | 0.00 |
| $Zr^{4+}$ | 5.70 | 5.70 | 6.20 | 5.78 | 6.03 | 6.00 | 5.57 |
| $Ti^{4+}$ | 21.40 | 21.12 | 21.21 | 20.69 | 20.94 | 20.81 | 21.13 |
| $Nb^{5+}$ | 7.25 | 7.92 | 7.19 | 7.29 | 7.29 | 7.24 | 9.09 |
| $Ta^{5+}$ | 0.00 | 0.00 | 0.00 | 0.00 | 0.00 | 0.00 | 0.00 |
| $W^{6+}$ | 0.00 | 0.00 | 0.00 | 0.00 | 0.00 | 0.00 | 0.00 |
| $Ge^{4+}$ | 0.00 | 0.00 | 0.00 | 0.00 | 0.00 | 0.00 | 0.00 |
| $Bi^{3+}$ | 0.00 | 0.00 | 0.00 | 0.00 | 0.00 | 0.00 | 0.00 |
| $Al^{3+}$ | 0.00 | 0.00 | 0.00 | 0.00 | 0.00 | 0.00 | 0.00 |
| Total | 100.00 | 100.00 | 100.00 | 100.00 | 100.00 | 100.00 | 100.00 |
| $Si^{4+} + B^{3+}$ | 27.93 | 27.69 | 28.01 | 28.36 | 27.41 | 28.03 | 28.33 |
| $Si^{4+}/(Si^{4+} + B^{3+})$ | 0.256 | 0.318 | 0.297 | 0.236 | 0.281 | 0.273 | 0.335 |
| $La^{2+} + Gd^{3+} + Y^{3+} + Yb^{3+}$ | 35.93 | 35.85 | 35.92 | 37.88 | 37.33 | 36.93 | 34.13 |
| $Y^{3}/(La^{3+} + Gd^{3+} + Y^{3+} + Yb^{3+})$ | 0.014 | 0.014 | 0.014 | 0.013 | 0.000 | 0.000 | 0.015 |
| $Ba^{2+}/(La^{3+} + Gd^{3+} + Y^{3+} + Yb^{3+})$ | 0.000 | 0.000 | 0.000 | 0.000 | 0.000 | 0.000 | 0.000 |
| $(Gd^{3+} + Y^{3+} + Yb^{3+})/(La^{3+} + Gd^{3+} + Y^{3+} + Yb^{3+})$ | 0.164 | 0.171 | 0.171 | 0.184 | 0.173 | 0.174 | 0.139 |
| $Ti^{4+} + Nb^{5+} + Ta^{5+} + W^{6+}$ | 28.65 | 29.04 | 28.40 | 27.98 | 28.23 | 28.05 | 30.22 |
| $(Zr^{4+} + Ti^{4+} + Nb^{5+} + Ta^{5+} + W^{6+})/Zr^{4+}$ | 6.026 | 6.095 | 5.581 | 5.841 | 5.682 | 5.675 | 6.425 |
| $Ti^{4+}/B^{3+}$ | 1.030 | 1.119 | 1.078 | 0.955 | 1.062 | 1.021 | 1.122 |
| $(Nb^{6+} + Ta^{5+})/Nb^{5+}$ | 1.000 | 1.000 | 1.000 | 1.000 | 1.000 | 1.000 | 1.000 |
| $La^{3+} + Gd^{3+} + Y^{3+} + Yb^{3+} + Zr^{4+} + Ti^{4+} + Nb^{5+} + Ta^{5+} + W^{6+} + Bi^{3+}$ | 70.28 | 70.59 | 70.52 | 71.64 | 71.59 | 70.98 | 69.92 |
| $(Ti^{4+} + Nb^{5+} + Ta^{5+} + W^{6+})/(La^{3+} + Gd^{3+} + Y^{3+} + Yb^{3+})$ | 0.797 | 0.810 | 0.791 | 0.739 | 0.756 | 0.780 | 0.885 |
| $(Nb^{5+} + Ta^{6+})/(Ti^{4+} + Nb^{6+} + Ta^{5+} + W^{6+})$ | 0.253 | 0.273 | 0.253 | 0.261 | 0.258 | 0.258 | 0.301 |
| $W^{6+}/(Ti^{4+} + Nb^{5+} + Ta^{5+} + W^{6+})$ | 0.000 | 0.000 | 0.000 | 0.000 | 0.000 | 0.000 | 0.000 |
| $Li^+ + Na^+ + K^+$ | 0.00 | 0.00 | 0.00 | 0.00 | 0.00 | 0.00 | 0.00 |
| $Mg^{2+} + Ca^{2+} + Sr^{2+} + Ba^{2+}$ | 0.00 | 0.00 | 0.00 | 0.00 | 0.00 | 0.00 | 0.00 |
| $(Si^{4+} + B^{3+})/(La^{3+} + Gd^{3+} + Y^{3+} + Yb^{3+})$ | 0.777 | 0.772 | 0.780 | 0.749 | 0.734 | 0.759 | 0.830 |
| $Zn^{2+}/(Ti^{4+} + Nb^{5+} + Ta^{5+} + W^{6+})$ | 0.062 | 0.059 | 0.052 | 0.000 | 0.035 | 0.035 | 0.058 |
| nd | 2.0521 | 2.0509 | 2.0489 | 2.0493 | 2.0519 | 2.0493 | 2.0516 |
| vd | 26.73 | 26.68 | 26.90 | 27.17 | 27.01 | 27.08 | 28.26 |
| nd − [2.205 − (0.0062 × vd)] | 0.0128 | 0.0113 | 0.0107 | 0.0128 | 0.0144 | 0.0120 | 0.0094 |
| $P_{g,F}$ | 0.6100 | 0.6075 | 0.6114 | 0.6080 | 0.8069 | 0.6064 | 0.6101 |
| $\Delta P_{g,F}$ | 0.0098 | 0.0072 | 0.0116 | 0.0086 | 0.0072 | 0.0068 | 0.0091 |
| Specific gravity | 5.23 | 5.23 | 5.23 | 5.29 | 5.30 | 5.28 | 5.15 |
| Tg (° C.) | 743 | 744 | 745 | 756 | 753 | 750 | 734 |
| Liquidus temp. (° C.) | 1270 | 1270 | 1270 | 1270 | 1270 | 1250 | 1250 |
| λ70 (nm) | 473 | 474 | 478 | 472 | 476 | 469 | 492 |

TABLE 1-continued

| | | | | | | | |
|---|---|---|---|---|---|---|---|
| λ5 (nm) | 372 | 373 | 376 | 372 | 372 | 372 | 377 |
| Number density of crystals deposited(/kg) | 0 | 0 | 0 | 0 | 0 | 0 | 0 |

| | No. | | | | | | | | | |
|---|---|---|---|---|---|---|---|---|---|---|
| | 8 Cation % | 9 Cation % | 10 Cation % | 11 Cation % | 12 Cation % | 13 Cation % | 14 Cation % | 15 Cation % | A Cation % | Ex. 16 of Literature 2 Cation % |
| $Si^{4+}$ | 7.73 | 7.73 | 7.73 | 7.73 | 7.73 | 7.73 | 10.73 | 5.00 | 2.15 | 8.08 |
| $B^{3+}$ | 20.40 | 20.40 | 20.40 | 20.40 | 19.40 | 18.40 | 16.40 | 24.13 | 25.88 | 21.07 |
| $Li^+$ | 0.00 | 0.00 | 0.00 | 0.00 | 0.00 | 0.00 | 0.00 | 0.00 | 0.00 | 0.00 |
| $Na^+$ | 0.00 | 0.00 | 0.00 | 0.00 | 0.00 | 0.00 | 0.00 | 0.00 | 0.00 | 0.00 |
| $K^+$ | 0.00 | 0.00 | 0.00 | 0.00 | 0.00 | 0.00 | 0.00 | 0.00 | 0.00 | 0.00 |
| $Mg^{2+}$ | 0.00 | 0.00 | 0.00 | 0.00 | 0.00 | 0.00 | 0.00 | 0.00 | 0.00 | 0.00 |
| $Ca^{2+}$ | 0.00 | 0.00 | 0.00 | 0.00 | 0.00 | 0.00 | 0.00 | 0.00 | 0.00 | 0.00 |
| $Sr^{2+}$ | 0.00 | 0.00 | 0.00 | 0.00 | 0.00 | 0.00 | 0.00 | 0.00 | 0.00 | 0.00 |
| $Ba^{2+}$ | 0.00 | 0.00 | 0.00 | 0.00 | 0.00 | 0.00 | 0.00 | 0.00 | 0.00 | 0.00 |
| $Zn^{2+}$ | 1.00 | 1.00 | 1.00 | 1.00 | 1.00 | 1.00 | 2.00 | 0.00 | 0.99 | 0.00 |
| $La^{3+}$ | 30.02 | 30.02 | 30.02 | 30.02 | 30.02 | 30.02 | 30.02 | 30.02 | 30.5 | 27.83 |
| $Gd^{3+}$ | 6.50 | 6.50 | 7.50 | 6.50 | 6.50 | 6.60 | 6.50 | 6.50 | 6.43 | 5.98 |
| $Y^{3+}$ | 0.00 | 0.00 | 0.00 | 0.00 | 0.00 | 0.00 | 0.00 | 0.00 | 0.00 | 9.55 |
| $Yb^{3+}$ | 0.00 | 0.00 | 0.00 | 0.00 | 0.00 | 0.00 | 0.00 | 0.00 | 0.00 | 0.00 |
| $Zr^{4+}$ | 6.06 | 6.06 | 7.06 | 6.06 | 6.08 | 6.06 | 6.06 | 6.06 | 6 | 5.61 |
| $Ti^{4+}$ | 17.97 | 20.97 | 20.97 | 19.97 | 20.97 | 20.97 | 20.97 | 20.97 | 20.81 | 14.17 |
| $Nb^{5+}$ | 7.32 | 4.32 | 2.32 | 7.32 | 7.32 | 7.32 | 7.32 | 7.32 | 7.24 | 7.71 |
| $Ta^{5+}$ | 3.00 | 3.00 | 3.00 | 3.00 | 1.00 | 1.00 | 0.00 | 0.00 | 0.00 | 0.00 |
| $W^{6+}$ | 0.00 | 0.00 | 0.00 | 1.00 | 0.00 | 1.00 | 0.00 | 0.00 | 0 | 0.00 |
| $Ge^{4+}$ | 0.00 | 0.00 | 0.00 | 0.00 | 0.00 | 0.00 | 0.00 | 0.00 | 0.00 | 0.00 |
| $Bi^{3+}$ | 0.00 | 0.00 | 0.00 | 0.00 | 0.00 | 0.00 | 0.00 | 0.00 | 0.00 | 0.00 |
| $Al^{3+}$ | 0.00 | 0.00 | 0.00 | 0.00 | 0.00 | 0.00 | 0.00 | 0.00 | 0.00 | 0.00 |
| Total | 100.00 | 100.00 | 100.00 | 100.00 | 100.00 | 100.00 | 100.00 | 100.00 | 100.00 | 100.00 |
| $Si^{4+} + B^{3+}$ | 28.13 | 28.13 | 28.13 | 28.13 | 27.13 | 26.13 | 27.13 | 29.13 | 28.03 | 29.15 |
| $Si^{4+}/(Si^{4+} + B^{3+})$ | 0.275 | 0.275 | 0.275 | 0.275 | 0.285 | 0.296 | 0.396 | 0.172 | 0.077 | 0.277 |
| $La^{2+} + Gd^{3+} + Y^{3+} + Yb^{3+}$ | 36.52 | 36.62 | 37.52 | 36.52 | 36.52 | 36.62 | 36.52 | 36.52 | 36.93 | 43.36 |
| $Y^{3+}/(La^{3+} + Gd^{3+} + Y^{3+} + Yb^{3+})$ | 0.000 | 0.000 | 0.000 | 0.000 | 0.000 | 0.000 | 0.000 | 0.000 | 0.000 | 0.220 |
| $Ba^{2+}/(La^{3+} + Gd^{3+} + Y^{3+} + Yb^{3+})$ | 0.000 | 0.000 | 0.000 | 0.000 | 0.000 | 0.000 | 0.000 | 0.000 | 0.000 | 0.000 |
| $(Gd^{3+} + Y^{3+} + Yb^{3+})/(La^{3+} + Gd^{3+} + Y^{3+} + Yb^{3+})$ | 0.178 | 0.178 | 0.200 | 0.178 | 0.178 | 0.178 | 0.178 | 0.178 | 0.174 | 0.358 |
| $Ti^{4+} + Nb^{5+} + Ta^{5+} + W^{6+}$ | 28.29 | 28.29 | 26.29 | 28.29 | 29.29 | 30.29 | 28.29 | 28.29 | 28.05 | 21.88 |
| $(Zr^{4+} + Ti^{4+} + Nb^{5+} + Ta^{5+} + W^{6+})/Zr^{4+}$ | 5.668 | 5.668 | 4.724 | 5.668 | 5.833 | 5.998 | 6.668 | 5.668 | 5.675 | 4.900 |
| $Ti^{4+}/B^{3+}$ | 0.881 | 1.028 | 1.028 | 0.979 | 1.081 | 1.140 | 1.279 | 0.869 | 0.804 | 0.673 |
| $(Nb^{6+} + Ta^{6+})/Nb^{5+}$ | 1.410 | 1.694 | 2.293 | 1.000 | 1.137 | 1.137 | 1.000 | 1.000 | 1.000 | 1.000 |
| $La^{3+} + Gd^{3+} + Y^{3+} + Yb^{3+} + Zr^{4+} + Ti^{4+} + Nb^{5+} + Ta^{5+} + W^{6+} + Bi^{3+}$ | 70.87 | 70.87 | 70.87 | 70.87 | 71.87 | 72.87 | 70.87 | 70.87 | 70.98 | 70.86 |
| $(Ti^{4+} + Nb^{5+} + Ta^{5+} + W^{6+})/(La^{3+} + Gd^{3+} + Y^{3+} + Yb^{3+})$ | 0.775 | 0.775 | 0.701 | 0.775 | 0.802 | 0.829 | 0.775 | 0.775 | 0.760 | 0.605 |
| $(Nb^{5+} + Ta^{6+})/(Ti^{4+} + Nb^{6+} + Ta^{5+} + W^{6+})$ | 0.365 | 0.259 | 0.202 | 0.259 | 0.284 | 0.275 | 0.259 | 0.259 | 0.258 | 0.352 |
| $W^{6+}/(Ti^{4+} + Nb^{5+} + Ta^{5+} + W^{5+})$ | 0.000 | 0.000 | 0.000 | 0.035 | 0.000 | 0.033 | 0.000 | 0.000 | 0.000 | 0.000 |
| $Li^+ + Na^+ + K^+$ | 0.00 | 0.00 | 0.00 | 0.00 | 0.00 | 000 | 0.00 | 0.00 | 0.00 | 0.00 |
| $Mg^{2+} + Ca^{2+} + Sr^{2+} + Ba^{2+}$ | 0.00 | 0.00 | 0.00 | 0.00 | 0.00 | 0.00 | 0.00 | 0.00 | 0.00 | 0.00 |
| $(Si^{4+} + B^{3+})/(La^{3+} + Gd^{3+} + Y^{3+} + Yb^{3+})$ | 0.770 | 0.770 | 0.750 | 0.770 | 0.743 | 0.715 | 0.743 | 0.798 | 0.759 | 0.672 |
| $Zn^{2+}/(Ti^{4+} + Nb^{5+} + Ta^{5+} + W^{6+})$ | 0.035 | 0.035 | 0.038 | 0.035 | 0.034 | 0.033 | 0.071 | 0.000 | 0.035 | 0.000 |
| nd | 2.0451 | 2.0463 | 2.0402 | 2.0494 | 2.0560 | 2.0620 | 2.0464 | 2.0533 | — | — |
| vd | 27.52 | 27.31 | 27.86 | 26.95 | 26.77 | 26.21 | 27.03 | 26.82 | — | — |
| nd − [2.205 − (0.0062 × vd)] | 0.0107 | 0.0106 | 0.0079 | 0.0115 | 0.0170 | 0.0195 | 0.0090 | 0.0146 | — | — |
| $P_{g,F}$ | 0.6030 | 0.6066 | 0.6014 | 0.6066 | 0.6078 | 0.8102 | 0.6064 | 0.6074 | — | — |
| $\Delta P_{g,F}$ | 0.0042 | 0.0075 | 0.0032 | 0.0068 | 0.0076 | 0.0091 | 0.0068 | 0.0074 | — | — |
| Specific gravity | 5.42 | 5.39 | 5.44 | 5.32 | 5.33 | 5.38 | 5.27 | 5.27 | — | — |
| Tg (° C.) | 746 | 749 | 769 | 741 | 747 | 748 | 749 | 738 | — | — |
| Liquidus temp. (° C.) | 1250 | 1250 | 1270 | 1250 | 1270 | 1290 | 1260 | 1260 | — | — |
| λ70 (nm) | 475 | 476 | 487 | 478 | 477 | 482 | 472 | 475 | — | — |
| λ5 (nm) | 372 | 373 | 389 | 375 | 374 | 376 | 379 | 374 | — | — |
| Number density of crystals deposited(/kg) | 0 | 0 | 0 | 0 | 0 | 0 | 0 | 0 | Clouded | Clouded |

TABLE 2

| | No. | | | | |
|---|---|---|---|---|---|
| | 16 Cation % | 17 Cation % | 18 Cation % | 19 Cation % | 20 Cation % |
| $Si^{4+}$ | 10.27 | 10.48 | 10.27 | 8.48 | 10.48 |
| $B^{3+}$ | 12.51 | 17.76 | 12.51 | 19.76 | 17.76 |
| $La^{3+}$ | 25.29 | 30.80 | 27.29 | 30.80 | 30.30 |
| $Gd^{3+}$ | 4.17 | 4.25 | 4.17 | 4.25 | 4.25 |
| $Y^{3+}$ | 0.49 | 0.50 | 0.49 | 0.50 | 0.00 |
| $Yb^{3+}$ | 0.00 | 0.00 | 0.00 | 0.00 | 0.00 |
| $Ti^{4+}$ | 33.88 | 23.58 | 31.88 | 23.58 | 23.58 |
| $Nb^{5+}$ | 5.95 | 6.07 | 5.95 | 6.07 | 6.07 |
| $Ta^{5+}$ | 0.00 | 0.00 | 0.00 | 0.00 | 0.00 |
| $W^{6+}$ | 0.00 | 0.00 | 0.00 | 0.00 | 0.00 |
| $Zr^{4+}$ | 5.72 | 4.81 | 5.72 | 4.81 | 5.81 |
| $Zn^{2+}$ | 1.72 | 1.75 | 1.72 | 1.75 | 1.75 |
| $Li^{+}$ | 0.00 | 0.00 | 0.00 | 0.00 | 0.00 |
| $Na^{+}$ | 0.00 | 0.00 | 0.00 | 0.00 | 0.00 |
| $K^{+}$ | 0.00 | 0.00 | 0.00 | 0.00 | 0.00 |
| $Mg^{2+}$ | 0.00 | 0.00 | 0.00 | 0.00 | 0.00 |
| $Ca^{2+}$ | 0.00 | 0.00 | 0.00 | 0.00 | 0.00 |
| $Sr^{2+}$ | 0.00 | 0.00 | 0.00 | 0.00 | 0.00 |
| $Ba^{2+}$ | 0.00 | 0.00 | 0.00 | 0.00 | 0.00 |
| $Ge^{4+}$ | 0.00 | 0.00 | 0.00 | 0.00 | 0.00 |
| $Te^{4+}$ | 0.00 | 0.00 | 0.00 | 0.00 | 0.00 |
| $Bi^{3+}$ | 0.00 | 0.00 | 0.00 | 0.00 | 0.00 |
| $Al^{3+}$ | 0.00 | 0.00 | 0.00 | 0.00 | 0.00 |
| Total | 100.00 | 100.00 | 100.00 | 100.00 | 100.00 |
| $Si^{4+} + B^{3+}$ | 22.78 | 28.24 | 22.78 | 28.24 | 28.24 |
| $Si^{4+}/(Si^{4+} + B^{3+})$ | 0.451 | 0.371 | 0.451 | 0.300 | 0.371 |
| $La^{3+} + Gd^{3+} + Y^{3+} + Yb^{3+}$ | 29.95 | 35.55 | 31.95 | 35.55 | 34.55 |
| $Y^{3+}/(La^{3+} + Gd^{3+} + Y^{3+} + Yb^{3+})$ | 0.016 | 0.014 | 0.015 | 0.014 | 0.000 |
| $Ba^{2+}/(La^{3+} + Gd^{3+} + Y^{3+} + Yb^{3+})$ | 0.000 | 0.000 | 0.000 | 0.000 | 0.000 |
| $(Gd^{3+} + Y^{3+} + Yb^{3+})/(La^{3+} + Gd^{3+} + Y^{3+} + Yb^{3+})$ | 0.156 | 0.134 | 0.146 | 0.134 | 0.123 |
| $Y^{3+}/(Gd^{3+} + Y^{3+} + Yb^{3+})$ | 0.105 | 0.105 | 0.105 | 0.105 | 0.000 |
| $Ti^{4+} + Nb^{5+} + Ta^{5+} + W^{6+}$ | 39.83 | 29.65 | 37.83 | 29.65 | 29.65 |
| $(Zr^{4+} + Ti^{4+} + Nb^{5+} + Ta^{5+} + W^{6+})/Zr^{4+}$ | 7.963 | 7.164 | 7.614 | 7.164 | 6.103 |
| $Ti^{4+}/B^{3+}$ | 2.708 | 1.328 | 2.548 | 1.193 | 1.328 |
| $(Nb^{5+} + Ta^{5+})/Nb^{5+}$ | 1.000 | 1.000 | 1.000 | 1.000 | 1.000 |
| $La^{3+} + Gd^{3+} + Y^{3+} + Yb^{3+} + Zr^{4+} + Ti^{4+} + Nb^{5+} + Ta^{5+} + W^{6+} + Bi^{3+}$ | 75.50 | 70.01 | 75.50 | 70.01 | 70.01 |
| $(Ti^{4+} + Nb^{5+} + Ta^{5+} + W^{6+})/(La^{3+} + Gd^{3+} + Y^{3+} + Yb^{3+})$ | 1.330 | 0.834 | 1.184 | 0.834 | 0.858 |
| $(Nb^{5+} + Ta^{5+})/(Ti^{4+} + Nb^{5+} + Ta^{5+} + W^{6+})$ | 0.149 | 0.205 | 0.157 | 0.205 | 0.205 |
| $Gd^{3+} + Y^{3+} + Yb^{3+}$ | 4.66 | 4.75 | 4.66 | 4.75 | 4.25 |
| $Zn^{2+}/(Ti^{4+} + Nb^{5+} + Ta^{5+} + W^{6+})$ | 0.043 | 0.059 | 0.045 | 0.059 | 0.059 |
| $W^{6+}/(Ti^{4+} + Nb^{5+} + Ta^{5+} + W^{6+})$ | 0.000 | 0.000 | 0.000 | 0.000 | 0.000 |
| $Li^{+} + Na^{+} + K^{+}$ | 0.00 | 0.00 | 0.00 | 0.00 | 0.00 |
| $Mg^{2+} + Ca^{2+} + Sr^{2+} + Ba^{2+}$ | 0.00 | 0.00 | 0.00 | 0.00 | 0.00 |
| $(Si^{4+} + B^{3+})/(La^{3+} + Gd^{3+} + Y^{3+} + Yb^{3+})$ | 0.761 | 0.794 | 0.713 | 0.794 | 0.817 |
| $Zn^{2+}/(Ti^{4+} + Nb^{5+} + Ta^{5+} + W^{6+})$ | 0.043 | 0.059 | 0.045 | 0.059 | 0.059 |
| $(Mg^{2+} + Ca^{2+} + Sr^{2+} + Ba^{2+})/(Ti^{4+} + Nb^{5+} + Ta^{5+} + W^{6+})$ | 0.000 | 0.000 | 0.000 | 0.000 | 0.000 |
| nd | 2.110 | 2.047 | 2.102 | 2.051 | 2.049 |
| νd | 22.8 | 26.4 | 23.5 | 26.3 | 26.3 |
| nd − [2.540 − (0.02 × νd)] | 0.0260 | 0.0350 | 0.0320 | 0.0370 | 0.0350 |
| $P_{g,F}$ | 0.623 | 0.608 | 0.618 | 0.607 | 0.608 |
| $\Delta P_{g,F}$ | 0.015 | 0.008 | 0.012 | 0.007 | 0.006 |
| Liquidus temp. LT (° C.) | 1240 | 1260 | 1280 | 1260 | 1260 |
| Liquidus temp. LT/(nd − 1) (° C.) | 1117 | 1203 | 1162 | 1199 | 1201 |
| Glass transition temp. (° C.) | 741 | 745 | 750 | 738 | 740 |
| Specific gravity | 5.02 | 5.16 | 5.09 | 5.17 | 5.14 |
| λ70 (nm) | | 476 | 583 | 475 | 481 |
| λ5 (nm) | | 375 | 388 | 375 | 375 |
| Number density of crystals deposited (/kg) | 0 | 0 | 0 | 0 | 0 |

| | No. | | | | |
|---|---|---|---|---|---|
| | 21 Cation % | 22 Cation % | 23 Cation % | 24 Cation % | 25 Cation % |
| $Si^{4+}$ | 9.48 | 9.50 | 9.23 | 8.96 | 8.72 |
| $B^{3+}$ | 17.76 | 18.82 | 18.25 | 17.74 | 17.25 |
| $La^{3+}$ | 30.80 | 29.37 | 28.52 | 27.71 | 26.94 |
| $Gd^{3+}$ | 4.25 | 4.26 | 4.14 | 4.02 | 3.91 |
| $Y^{3+}$ | 0.50 | 0.50 | 0.49 | 0.47 | 0.46 |
| $Yb^{3+}$ | 0.00 | 0.00 | 0.00 | 0.00 | 0.00 |
| $Ti^{4+}$ | 23.58 | 23.14 | 25.38 | 27.50 | 29.50 |
| $Nb^{5+}$ | 6.07 | 7.09 | 6.88 | 6.69 | 6.50 |
| $Ta^{5+}$ | 0.00 | 0.00 | 0.00 | 0.00 | 0.00 |
| $W^{6+}$ | 0.00 | 0.00 | 0.00 | 0.00 | 0.00 |

TABLE 2-continued

| | | | | | |
|---|---|---|---|---|---|
| $Zr^{4+}$ | 5.81 | 5.57 | 5.41 | 5.26 | 5.11 |
| $Zn^{2+}$ | 1.75 | 1.75 | 1.70 | 1.65 | 1.61 |
| $Li^+$ | 0.00 | 0.00 | 0.00 | 0.00 | 0.00 |
| $Na^+$ | 0.00 | 0.00 | 0.00 | 0.00 | 0.00 |
| $K^+$ | 0.00 | 0.00 | 0.00 | 0.00 | 0.00 |
| $Mg^{2+}$ | 0.00 | 0.00 | 0.00 | 0.00 | 0.00 |
| $Ca^{2+}$ | 0.00 | 0.00 | 0.00 | 0.00 | 0.00 |
| $Sr^{2+}$ | 0.00 | 0.00 | 0.00 | 0.00 | 0.00 |
| $Ba^{2+}$ | 0.00 | 0.00 | 0.00 | 0.00 | 0.00 |
| $Ge^{4+}$ | 0.00 | 0.00 | 0.00 | 0.00 | 0.00 |
| $Te^{4+}$ | 0.00 | 0.00 | 0.00 | 0.00 | 0.00 |
| $Bi^{3+}$ | 0.00 | 0.00 | 0.00 | 0.00 | 0.00 |
| $Al^{3+}$ | 0.00 | 0.00 | 0.00 | 0.00 | 0.00 |
| Total | 100.00 | 100.00 | 100.00 | 100.00 | 100.00 |
| $Si^{4+} + B^{3+}$ | 27.24 | 28.32 | 27.48 | 26.70 | 25.97 |
| $Si^{4+}/(Si^{4+} + B^{3+})$ | 0.348 | 0.335 | 0.336 | 0.336 | 0.336 |
| $La^{3+} + Gd^{3+} + Y^{3+} + Yb^{3+}$ | 35.55 | 34.13 | 33.15 | 32.20 | 31.31 |
| $Y^{3+}/(La^{3+} + Gd^{3+} + Y^{3+} + Yb^{3+})$ | 0.014 | 0.015 | 0.015 | 0.015 | 0.015 |
| $Ba^{2+}/(La^{3+} + Gd^{3+} + Y^{3+} + Yb^{3+})$ | 0.000 | 0.000 | 0.000 | 0.000 | 0.000 |
| $(Gd^{3+} + Y^{3+} + Yb^{3+})/(La^{3+} + Gd^{3+} + Y^{3+} + Yb^{3+})$ | 0.134 | 0.139 | 0.140 | 0.139 | 0.140 |
| $Y^{3+}/(Gd^{3+} + Y^{3+} + Yb^{3+})$ | 0.105 | 0.105 | 0.106 | 0.105 | 0.105 |
| $Ti^{4+} + Nb^{5+} + Ta^{5+} + W^{6+}$ | 29.65 | 30.23 | 32.26 | 34.19 | 36.00 |
| $(Zr^{4+} + Ti^{4+} + Nb^{5+} + Ta^{5+} + W^{6+})/Zr^{4+}$ | 6.103 | 6.427 | 6.963 | 7.500 | 8.045 |
| $Ti^{4+}/B^{3+}$ | 1.328 | 1.230 | 1.391 | 1.550 | 1.710 |
| $(Nb^{5+} + Ta^{5+})/Nb^{5+}$ | 1.000 | 1.000 | 1.000 | 1.000 | 1.000 |
| $La^{3+} + Gd^{3+} + Y^{3+} + Yb^{3+} + Zr^{4+} + Ti^{4+} + Nb^{5+} + Ta^{5+} + W^{6+} + Bi^{3+}$ | 71.01 | 69.93 | 70.82 | 71.65 | 72.42 |
| $(Ti^{4+} + Nb^{5+} + Ta^{5+} + W^{6+})/(La^{3+} + Gd^{3+} + Y^{3+} + Yb^{3+})$ | 0.834 | 0.886 | 0.973 | 1.062 | 1.150 |
| $(Nb^{5+} + Ta^{5+})/(Ti^{4+} + Nb^{5+} + Ta^{5+} + W^{6+})$ | 0.205 | 0.235 | 0.213 | 0.196 | 0.181 |
| $Gd^{3+} + Y^{3+} + Yb^{3+}$ | 4.75 | 4.76 | 4.63 | 4.49 | 4.37 |
| $Zn^{2+}/(Ti^{4+} + Nb^{5+} + Ta^{5+} + W^{6+})$ | 0.059 | 0.058 | 0.053 | 0.048 | 0.045 |
| $W^{6+}/(Ti^{4+} + Nb^{5+} + Ta^{5+} + W^{6+})$ | 0.000 | 0.000 | 0.000 | 0.000 | 0.000 |
| $Li^+ + Na^+ + K^+$ | 0.00 | 0.00 | 0.00 | 0.00 | 0.00 |
| $Mg^{2+} + Ca^{2+} + Sr^{2+} + Ba^{2+}$ | 0.00 | 0.00 | 0.00 | 0.00 | 0.00 |
| $(Si^{4+} + B^{3+})/(La^{3+} + Gd^{3+} + Y^{3+} + Yb^{3+})$ | 0.766 | 0.830 | 0.829 | 0.829 | 0.829 |
| $Zn^{2+}/(Ti^{4+} + Nb^{5+} + Ta^{5+} + W^{6+})$ | 0.059 | 0.058 | 0.053 | 0.048 | 0.045 |
| $(Mg^{2+} + Ca^{2+} + Sr^{2+} + Ba^{2+})/(Ti^{4+} + Nb^{5+} + Ta^{5+} + W^{6+})$ | 0.000 | 0.000 | 0.000 | 0.000 | 0.000 |
| nd | 2.054 | 2.053 | 2.065 | 2.076 | 2.086 |
| νd | 26.3 | 26.0 | 25.3 | 24.6 | 24.0 |
| nd − [2.540 − (0.02 × νd)] | 0.0400 | 0.0330 | 0.0310 | 0.0280 | 0.0260 |
| $P_{g,F}$ | 0.604 | 0.608 | 0.614 | 0.619 | 0.622 |
| $\Delta P_{g,F}$ | 0.003 | 0.006 | 0.011 | 0.015 | 0.017 |
| Liquidus temp.LT (° C.) | 1260 | 1220 | 1230 | 1230 | 1260 |
| Liquidus temp.LT/(nd − 1) (° C.) | 1195 | 1159 | 1155 | 1143 | 1160 |
| Glass transition temp. (° C.) | 740 | 735 | 733 | 731 | 730 |
| Specific gravity | 5.19 | 5.13 | 5.10 | 5.07 | 5.04 |
| λ70 (nm) | 475 | 488 | 526 | 543 | 646 |
| λ5 (nm) | 375 | 376 | 381 | 385 | 390 |
| Number density of crystals deposited(/kg) | 0 | 0 | 0 | 0 | 0 |

| | No. | | | | |
|---|---|---|---|---|---|
| | 26 Cation % | 27 Cation % | 28 Cation % | 29 Cation % | 30 Cation % |
| $Si^{4+}$ | 9.50 | 9.50 | 9.80 | 9.23 | 9.23 |
| $B^{3+}$ | 18.81 | 18.82 | 19.38 | 18.25 | 18.25 |
| $La^{3+}$ | 26.75 | 24.12 | 30.28 | 28.52 | 28.52 |
| $Gd^{3+}$ | 3.88 | 3.50 | 4.39 | 4.14 | 4.14 |
| $Y^{3+}$ | 0.50 | 0.50 | 0.52 | 0.49 | 0.49 |
| $Yb^{3+}$ | 0.00 | 0.00 | 0.00 | 0.00 | 0.00 |
| $Ti^{4+}$ | 26.15 | 29.15 | 23.86 | 22.46 | 22.46 |
| $Nb^{5+}$ | 7.09 | 7.09 | 4.21 | 9.80 | 6.88 |
| $Ta^{5+}$ | 0.00 | 0.00 | 0.00 | 0.00 | 0.00 |
| $W^{6+}$ | 0.00 | 0.00 | 0.00 | 0.00 | 2.92 |
| $Zr^{4+}$ | 5.57 | 5.57 | 5.75 | 5.41 | 5.41 |
| $Zn^{2+}$ | 1.75 | 1.75 | 1.81 | 1.70 | 1.70 |
| $Li^+$ | 0.00 | 0.00 | 0.00 | 0.00 | 0.00 |
| $Na^+$ | 0.00 | 0.00 | 0.00 | 0.00 | 0.00 |
| $K^+$ | 0.00 | 0.00 | 0.00 | 0.00 | 0.00 |
| $Mg^{2+}$ | 0.00 | 0.00 | 0.00 | 0.00 | 0.00 |
| $Ca^{2+}$ | 0.00 | 0.00 | 0.00 | 0.00 | 0.00 |
| $Sr^{2+}$ | 0.00 | 0.00 | 0.00 | 0.00 | 0.00 |
| $Ba^{2+}$ | 0.00 | 0.00 | 0.00 | 0.00 | 0.00 |
| $Ge^{4+}$ | 0.00 | 0.00 | 0.00 | 0.00 | 0.00 |

TABLE 2-continued

| | | | | | |
|---|---|---|---|---|---|
| $Te^{4+}$ | 0.00 | 0.00 | 0.00 | 0.00 | 0.00 |
| $Bi^{3+}$ | 0.00 | 0.00 | 0.00 | 0.00 | 0.00 |
| $Al^{3+}$ | 0.00 | 0.00 | 0.00 | 0.00 | 0.00 |
| Total | 100.00 | 100.00 | 100.00 | 100.00 | 100.00 |
| $Si^{4+} + B^{3+}$ | 28.31 | 28.32 | 29.18 | 27.48 | 27.48 |
| $Si^{4+}/(Si^{4+} + B^{3+})$ | 0.336 | 0.335 | 0.336 | 0.336 | 0.336 |
| $La^{3+} + Gd^{3+} + Y^{3+} + Yb^{3+}$ | 31.13 | 28.12 | 35.19 | 33.15 | 33.15 |
| $Y^{3+}/(La^{3+} + Gd^{3+} + Y^{3+} + Yb^{3+})$ | 0.016 | 0.018 | 0.015 | 0.015 | 0.015 |
| $Ba^{2+}/(La^{3+} + Gd^{3+} + Y^{3+} + Yb^{3+})$ | 0.000 | 0.000 | 0.000 | 0.000 | 0.000 |
| $(Gd^{3+} + Y^{3+} + Yb^{3+})/(La^{3+} + Gd^{3+} + Y^{3+} + Yb^{3+})$ | 0.141 | 0.142 | 0.140 | 0.140 | 0.140 |
| $Y^{3+}/(Gd^{3+} + Y^{3+} + Yb^{3+})$ | 0.114 | 0.125 | 0.106 | 0.106 | 0.106 |
| $Ti^{4+} + Nb^{5+} + Ta^{5+} + W^{6+}$ | 33.24 | 36.24 | 28.07 | 32.26 | 32.26 |
| $(Zr^{4+} + Ti^{4+} + Nb^{5+} + Ta^{5+} + W^{6+})/Zr^{4+}$ | 6.968 | 7.506 | 5.882 | 6.963 | 6.963 |
| $Ti^{4+}/B^{3+}$ | 1.390 | 1.549 | 1.231 | 1.231 | 1.231 |
| $(Nb^{5+} + Ta^{5+})/Nb^{5+}$ | 1.000 | 1.000 | 1.000 | 1.000 | 1.000 |
| $La^{3+} + Gd^{3+} + Y^{3+} + Yb^{3+} + Zr^{4+} + Ti^{4+} + Nb^{5+} + Ta^{5+} + W^{6+} + Bi^{3+}$ | 69.94 | 89.93 | 69.01 | 70.82 | 70.82 |
| $(Ti^{4+} + Nb^{5+} + Ta^{5+} + W^{6+})/(La^{3+} + Gd^{3+} + Y^{3+} + Yb^{3+})$ | 1.068 | 1.289 | 0.798 | 0.973 | 0.973 |
| $(Nb^{5+} + Ta^{5+})/(Ti^{4+} + Nb^{5+} + Ta^{5+} + W^{6+})$ | 0.213 | 0.196 | 0.150 | 0.304 | 0.213 |
| $Gd^{3+} + Y^{3+} + Yb^{3+}$ | 4.38 | 4.00 | 4.91 | 4.63 | 4.63 |
| $Zn^{2+}/(Ti^{4+} + Nb^{5+} + Ta^{5+} + W^{6+})$ | 0.053 | 0.048 | 0.064 | 0.053 | 0.053 |
| $W^{6+}/(Ti^{4+} + Nb^{5+} + Ta^{5+} + W^{6+})$ | 0.000 | 0.000 | 0.000 | 0.000 | 0.091 |
| $Li^{+} + Na^{+} + K^{+}$ | 0.00 | 0.00 | 0.00 | 0.00 | 0.00 |
| $Mg^{2+} + Ca^{2+} + Sr^{2+} + Ba^{2+}$ | 0.00 | 0.00 | 0.00 | 0.00 | 0.00 |
| $(Si^{4+} + B^{3+})/(La^{3+} + Gd^{3+} + Y^{3+} + Yb^{3+})$ | 0.909 | 1.007 | 0.829 | 0.829 | 0.829 |
| $Zn^{2+}/(Ti^{4+} + Nb^{5+} + Ta^{5+} + W^{6+})$ | 0.053 | 0.048 | 0.064 | 0.053 | 0.053 |
| $(Mg^{2+} + Ca^{2+} + Sr^{2+} + Ba^{2+})/(Ti^{4+} + Nb^{5+} + Ta^{5+} + W^{6+})$ | 0.000 | 0.000 | 0.000 | 0.000 | 0.000 |
| nd | 2.066 | 2.078 | 2.042 | 2.063 | 2.060 |
| νd | 24.8 | 23.6 | 26.7 | 25.5 | 25.4 |
| nd − [2.540 − (0.02 × νd)] | 0.0220 | 0.0100 | 0.0360 | 0.0330 | 0.0280 |
| $P_{g,F}$ | 0.614 | 0.621 | 0.608 | 0.613 | 0.613 |
| $\Delta P_{g,F}$ | 0.010 | 0.015 | 0.008 | 0.011 | 0.01 |
| Liquidus temp.LT (° C.) | 1260 | 1270 | 1250 | 1270 | 1260 |
| Liquidus temp.LT/(nd − 1) (° C.) | 1182 | 1178 | 1200 | 1195 | 1189 |
| Glass transition temp. (° C.) | 726 | 706 | 740 | 726 | 726 |
| Specific gravity | 5.03 | 4.91 | 5.14 | 5.13 | 5.23 |
| λ70 (nm) | 649 | | 478 | 529 | 564 |
| λ5 (nm) | 382 | | 374 | 379 | 380 |
| Number density of crystals deposited(/kg) | 0 | 0 | 0 | 0 | 0 |

| | No. | | | | |
|---|---|---|---|---|---|
| | 31 Cation % | 32 Cation % | 33 Cation % | 34 Cation % | 35 Cation % |
| $Si^{4+}$ | 13.72 | 10.67 | 9.23 | 9.32 | 9.14 |
| $B^{3+}$ | 12.03 | 18.06 | 18.25 | 18.43 | 18.07 |
| $La^{3+}$ | 24.32 | 31.35 | 28.52 | 28.80 | 28.24 |
| $Gd^{3+}$ | 4.01 | 4.33 | 4.14 | 4.18 | 4.10 |
| $Y^{3+}$ | 0.47 | 0.51 | 0.49 | 0.49 | 0.48 |
| $Yb^{3+}$ | 0.00 | 0.00 | 0.00 | 0.00 | 0.00 |
| $Ti^{4+}$ | 32.58 | 24.00 | 22.46 | 22.68 | 22.25 |
| $Nb^{5+}$ | 5.72 | 6.18 | 6.88 | 6.95 | 6.81 |
| $Ta^{5+}$ | 0.00 | 0.00 | 2.92 | 0.00 | 0.00 |
| $W^{6+}$ | 0.00 | 0.00 | 0.00 | 0.00 | 0.00 |
| $Zr^{4+}$ | 5.50 | 4.90 | 5.41 | 5.46 | 5.38 |
| $Zn^{2+}$ | 1.65 | 0.00 | 1.70 | 1.72 | 1.69 |
| $Li^{+}$ | 0.00 | 0.00 | 0.00 | 1.97 | 3.86 |
| $Na^{+}$ | 0.00 | 0.00 | 0.00 | 0.00 | 0.00 |
| $K^{+}$ | 0.00 | 0.00 | 0.00 | 0.00 | 0.00 |
| $Mg^{2+}$ | 0.00 | 0.00 | 0.00 | 0.00 | 0.00 |
| $Ca^{2+}$ | 0.00 | 0.00 | 0.00 | 0.00 | 0.00 |
| $Sr^{2+}$ | 0.00 | 0.00 | 0.00 | 0.00 | 0.00 |
| $Ba^{2+}$ | 0.00 | 0.00 | 0.00 | 0.00 | 0.00 |
| $Ge^{4+}$ | 0.00 | 0.00 | 0.00 | 0.00 | 0.00 |
| $Te^{4+}$ | 0.00 | 0.00 | 0.00 | 0.00 | 0.00 |
| $Bi^{3+}$ | 0.00 | 0.00 | 0.00 | 0.00 | 0.00 |
| $Al^{3+}$ | 0.00 | 0.00 | 0.00 | 0.00 | 0.00 |
| Total | 100.00 | 100.00 | 100.00 | 100.00 | 100.00 |
| $Si^{4+} + B^{3+}$ | 25.75 | 28.73 | 27.48 | 27.75 | 27.21 |
| $Si^{4+}/(Si^{4+} + B^{3+})$ | 0.533 | 0.371 | 0.336 | 0.336 | 0.336 |
| $La^{3+} + Gd^{3+} + Y^{3+} + Yb^{3+}$ | 28.80 | 36.19 | 33.15 | 33.47 | 32.82 |
| $Y^{3+}/(La^{3+} + Gd^{3+} + Y^{3+} + Yb^{3+})$ | 0.016 | 0.014 | 0.015 | 0.015 | 0.015 |
| $Ba^{2+}/(La^{3+} + Gd^{3+} + Y^{3+} + Yb^{3+})$ | 0.000 | 0.000 | 0.000 | 0.000 | 0.000 |
| $(Gd^{3+} + Y^{3+} + Yb^{3+})/(La^{3+} + Gd^{3+} + Y^{3+} + Yb^{3+})$ | 0.156 | 0.134 | 0.140 | 0.140 | 0.140 |
| $Y^{3+}/(Gd^{3+} + Y^{3+} + Yb^{3+})$ | 0.105 | 0.105 | 0.106 | 0.105 | 0.105 |
| $Ti^{4+} + Nb^{5+} + Ta^{5+} + W^{6+}$ | 38.30 | 30.18 | 32.26 | 29.63 | 29.06 |
| $(Zr^{4+} + Ti^{4+} + Nb^{5+} + Ta^{5+} + W^{6+})/Zr^{4+}$ | 7.964 | 7.159 | 6.963 | 6.427 | 6.422 |
| $Ti^{4+}/B^{3+}$ | 2.708 | 1.329 | 1.231 | 1.231 | 1.231 |

TABLE 2-continued

| | | | | | |
|---|---|---|---|---|---|
| $(Nb^{5+} + Ta^{5+})/Nb^{5+}$ | 1.000 | 1.000 | 1.424 | 1.000 | 1.000 |
| $La^{3+} + Gd^{3+} + Y^{3+} + Yb^{3+} + Zr^{4+} + Ti^{4+} + Nb^{5+} + Ta^{5+} + W^{6+} + Bi^{3+}$ | 72.60 | 71.27 | 70.82 | 68.56 | 67.24 |
| $(Ti^{4+} + Nb^{5+} + Ta^{5+} + W^{6+})/(La^{3+} + Gd^{3+} + Y^{3+} + Yb^{3+})$ | 1.330 | 0.834 | 0.973 | 0.885 | 0.885 |
| $(Nb^{5+} + Ta^{5+})/(Ti^{4+} + Nb^{5+} + Ta^{5+} + W^{6+})$ | 0.149 | 0.205 | 0.304 | 0.235 | 0.234 |
| $Gd^{3+} + Y^{3+} + Yb^{3+}$ | 4.48 | 4.84 | 4.63 | 4.67 | 4.58 |
| $Zn^{2+}/(Ti^{4+} + Nb^{5+} + Ta^{5+} + W^{6+})$ | 0.043 | 0.000 | 0.053 | 0.058 | 0.058 |
| $W^{6+}/(Ti^{4+} + Nb^{5+} + Ta^{5+} + W^{6+})$ | 0.000 | 0.000 | 0.000 | 0.000 | 0.000 |
| $Li^+ + Na^+ + K^+$ | 0.00 | 0.00 | 0.00 | 1.97 | 3.86 |
| $Mg^{2+} + Ca^{2+} + Sr^{2+} + Ba^{2+}$ | 0.00 | 0.00 | 0.00 | 0.00 | 0.00 |
| $(Si^{4+} + B^{3+})/(La^{3+} + Gd^{3+} + Y^{3+} + Yb^{3+})$ | 0.894 | 0.794 | 0.829 | 0.829 | 0.829 |
| $Zn^{2+}/(Ti^{4+} + Nb^{5+} + Ta^{5+} + W^{6+})$ | 0.043 | 0.000 | 0.053 | 0.058 | 0.058 |
| $(Mg^{2+} + Ca^{2+} + Sr^{2+} + Ba^{2+})/(Ti^{4+} + Nb^{5+} + Ta^{5+} + W^{6+})$ | 0.000 | 0.000 | 0.000 | 0.000 | 0.000 |
| nd | 2.096 | 2.048 | 2.059 | 2.050 | 2.046 |
| νd | 23.0 | 26.3 | 25.9 | 26.2 | 26.3 |
| nd − [2.540 − (0.02 × νd)] | 0.0160 | 0.0340 | 0.0370 | 0.0340 | 0.0320 |
| $P_{g,F}$ | 0.624 | 0.608 | 0.612 | 0.611 | 0.610 |
| $\Delta P_{g,F}$ | 0.017 | 0.008 | 0.010 | 0.010 | 0.009 |
| Liquidus temp.LT (° C.) | 1250 | 1260 | 1270 | 1230 | 1250 |
| Liquidus temp.LT/(nd − 1) (° C.) | 1141 | 1202 | 1199 | 1172 | 1195 |
| Glass transition temp. (° C.) | 738 | 750 | 736 | 710 | 702 |
| Specific gravity | 4.96 | 5.14 | 5.26 | 5.12 | 5.09 |
| λ70 (nm) | 528 | 479 | 531 | 478 | 483 |
| λ5 (nm) | 404 | 374 | 377 | 374 | 373 |
| Number density of crystals deposited(/kg) | 0 | 0 | 0 | 0 | 0 |

| | No. | | | | |
|---|---|---|---|---|---|
| | 36 Cation % | 37 Cation % | 38 Cation % | 39 Cation % | 40 Cation % |
| $Si^{4+}$ | 9.32 | 9.32 | 9.14 | 9.50 | 9.50 |
| $B^{3+}$ | 18.43 | 18.43 | 18.07 | 18.82 | 18.82 |
| $La^{3+}$ | 28.80 | 28.80 | 28.24 | 29.37 | 29.37 |
| $Gd^{3+}$ | 4.18 | 4.18 | 4.10 | 4.26 | 4.26 |
| $Y^{3+}$ | 0.49 | 0.49 | 0.48 | 0.50 | 0.50 |
| $Yb^{3+}$ | 0.00 | 0.00 | 0.00 | 0.00 | 0.00 |
| $Ti^{4+}$ | 22.68 | 22.68 | 22.25 | 23.14 | 23.14 |
| $Nb^{5+}$ | 6.95 | 6.95 | 6.81 | 4.08 | 1.07 |
| $Ta^{5+}$ | 0.00 | 0.00 | 0.00 | 3.01 | 6.02 |
| $W^{6+}$ | 0.00 | 0.00 | 0.00 | 0.00 | 0.00 |
| $Zr^{4+}$ | 5.46 | 5.46 | 5.36 | 5.57 | 5.57 |
| $Zn^{2+}$ | 1.72 | 1.72 | 1.69 | 1.75 | 1.75 |
| $Li^+$ | 0.00 | 0.00 | 0.00 | 0.00 | 0.00 |
| $Na^+$ | 1.97 | 0.00 | 0.00 | 0.00 | 0.00 |
| $K^+$ | 0.00 | 1.97 | 3.86 | 0.00 | 0.00 |
| $Mg^{2+}$ | 0.00 | 0.00 | 0.00 | 0.00 | 0.00 |
| $Ca^{2+}$ | 0.00 | 0.00 | 0.00 | 0.00 | 0.00 |
| $Sr^{2+}$ | 0.00 | 0.00 | 0.00 | 0.00 | 0.00 |
| $Ba^{2+}$ | 0.00 | 0.00 | 0.00 | 0.00 | 0.00 |
| $Ge^{4+}$ | 0.00 | 0.00 | 0.00 | 0.00 | 0.00 |
| $Te^{4+}$ | 0.00 | 0.00 | 0.00 | 0.00 | 0.00 |
| $Bi^{3+}$ | 0.00 | 0.00 | 0.00 | 0.00 | 0.00 |
| $Al^{3+}$ | 0.00 | 0.00 | 0.00 | 0.00 | 0.00 |
| Total | 100.00 | 100.00 | 100.00 | 100.00 | 100.00 |
| $Si^{4+} + B^{3+}$ | 27.75 | 27.75 | 27.21 | 28.32 | 28.32 |
| $Si^{4+}/(Si^{4+} + B^{3+})$ | 0.336 | 0.336 | 0.336 | 0.335 | 0.335 |
| $La^{3+} + Gd^{3+} + Y^{3+} + Yb^{3+}$ | 33.47 | 33.47 | 32.82 | 34.13 | 34.13 |
| $Y^{3+}/(La^{3+} + Gd^{3+} + Y^{3+} + Yb^{3+})$ | 0.015 | 0.015 | 0.015 | 0.015 | 0.015 |
| $Ba^{2+}/(La^{3+} + Gd^{3+} + Y^{3+} + Yb^{3+})$ | 0.000 | 0.000 | 0.000 | 0.000 | 0.000 |
| $(Gd^{3+} + Y^{3+} + Yb^{3+})/(La^{3+} + Gd^{3+} + Y^{3+} + Yb^{3+})$ | 0.140 | 0.140 | 0.140 | 0.139 | 0.139 |
| $Y^{3+}/(Gd^{3+} + Y^{3+} + Yb^{3+})$ | 0.105 | 0.105 | 0.105 | 0.105 | 0.105 |
| $Ti^{4+} + Nb^{5+} + Ta^{5+} + W^{6+}$ | 29.63 | 29.63 | 29.06 | 30.23 | 30.23 |
| $(Zr^{4+} + Ti^{4+} + Nb^{5+} + Ta^{5+} + W^{6+})/Zr^{4+}$ | 6.427 | 6.427 | 6.422 | 6.427 | 6.427 |
| $Ti^{4+}/B^{3+}$ | 1.231 | 1.231 | 1.231 | 1.230 | 1.230 |
| $(Nb^{5+} + Ta^{5+})/Nb^{5+}$ | 1.000 | 1.000 | 1.000 | 1.738 | 6.626 |
| $La^{3+} + Gd^{3+} + Y^{3+} + Yb^{3+} + Zr^{4+} + Ti^{4+} + Nb^{5+} + Ta^{5+} + W^{6+} + Bi^{3+}$ | 68.56 | 68.56 | 67.24 | 69.93 | 69.93 |
| $(Ti^{4+} + Nb^{5+} + Ta^{5+} + W^{6+})/(La^{3+} + Gd^{3+} + Y^{3+} + Yb^{3+})$ | 0.885 | 0.885 | 0.885 | 0.886 | 0.886 |
| $(Nb^{5+} + Ta^{5+})/(Ti^{4+} + Nb^{5+} + Ta^{5+} + W^{6+})$ | 0.235 | 0.235 | 0.234 | 0.235 | 0.235 |
| $Gd^{3+} + Y^{3+} + Yb^{3+}$ | 4.67 | 4.67 | 4.58 | 4.76 | 4.76 |
| $Zn^{2+}/(Ti^{4+} + Nb^{5+} + Ta^{5+} + W^{6+})$ | 0.058 | 0.058 | 0.058 | 0.058 | 0.058 |
| $W^{6+}/(Ti^{4+} + Nb^{5+} + Ta^{5+} + W^{6+})$ | 0.000 | 0.000 | 0.000 | 0.000 | 0.000 |
| $Li^+ + Na^+ + K^+$ | 1.97 | 1.97 | 3.86 | 0.00 | 0.00 |
| $Mg^{2+} + Ca^{2+} + Sr^{2+} + Ba^{2+}$ | 0.00 | 0.00 | 0.00 | 0.00 | 0.00 |
| $(Si^{4+} + B^{3+})/(La^{3+} + Gd^{3+} + Y^{3+} + Yb^{3+})$ | 0.829 | 0.829 | 0.829 | 0.830 | 0.830 |
| $Zn^{2+}/(Ti^{4+} + Nb^{5+} + Ta^{5+} + W^{6+})$ | 0.058 | 0.058 | 0.05B | 0.058 | 0.058 |
| $(Mg^{2+} + Ca^{2+} + Sr^{2+} + Ba^{2+})/(Ti^{4+} + Nb^{5+} + Ta^{5+} + W^{6+})$ | 0.000 | 0.000 | 0.000 | 0.000 | 0.000 |
| nd | 2.044 | 2.046 | 2.038 | 2.048 | 2.043 |
| νd | 26.2 | 26.2 | 26.3 | 26.5 | 26.9 |
| nd − [2.540 − (0.02 × νd)] | 0.0280 | 0.0300 | 0.0240 | 0.0380 | 0.0410 |

TABLE 2-continued

| | | | | | |
|---|---|---|---|---|---|
| $P_{g,F}$ | 0.610 | 0.610 | 0.612 | 0.610 | 0.609 |
| $\Delta P_{g,F}$ | 0.009 | 0.009 | 0.011 | 0.010 | 0.009 |
| Liquidus temp.LT (° C.) | 1245 | 1250 | 1270 | 1270 | 1300 |
| Liquidus temp.LT/(nd − 1) (° C.) | 1192 | 1195 | 1223 | 1211 | 1246 |
| Glass transition temp. (° C.) | 728 | 737 | 737 | 741 | 744 |
| Specific gravity | 5.10 | 5.10 | 5.07 | 5.26 | 5.39 |
| λ70 (nm) | 512 | 482 | 488 | 482 | 501 |
| λ5 (nm) | 376 | 377 | 376 | 374 | 373 |
| Number density of crystals deposited(/kg) | 0 | 0 | 0 | 0 | 0 |

| | No. | | | | |
|---|---|---|---|---|---|
| | 41 Cation % | 42 Cation % | 43 Cation % | 44 Cation % | 45 Cation % |
| $Si^{4+}$ | 9.41 | 9.23 | 9.23 | 9.90 | 9.14 |
| $B^{3+}$ | 18.61 | 18.25 | 21.17 | 19.60 | 18.07 |
| $La^{3+}$ | 29.08 | 28.52 | 28.52 | 26.42 | 32.10 |
| $Gd^{3+}$ | 4.22 | 4.14 | 4.14 | 4.44 | 4.10 |
| $Y^{3+}$ | 0.50 | 0.49 | 0.49 | 0.52 | 0.48 |
| $Yb^{3+}$ | 0.00 | 0.00 | 0.00 | 0.00 | 0.00 |
| $Ti^{4+}$ | 22.91 | 22.46 | 22.46 | 24.10 | 22.25 |
| $Nb^{5+}$ | 7.02 | 6.88 | 6.88 | 7.38 | 6.81 |
| $Ta^{5+}$ | 0.00 | 0.00 | 0.00 | 0.00 | 0.00 |
| $W^{6+}$ | 0.00 | 0.00 | 0.00 | 0.00 | 0.00 |
| $Zr^{4+}$ | 5.52 | 5.41 | 5.41 | 5.81 | 5.36 |
| $Zn^{2+}$ | 1.74 | 1.70 | 1.70 | 1.83 | 1.69 |
| $Li^+$ | 0.00 | 0.00 | 0.00 | 0.00 | 0.00 |
| $Na^+$ | 0.00 | 0.00 | 0.00 | 0.00 | 0.00 |
| $K^+$ | 0.00 | 0.00 | 0.00 | 0.00 | 0.00 |
| $Mg^{2+}$ | 0.00 | 0.00 | 0.00 | 0.00 | 0.00 |
| $Ca^{2+}$ | 0.00 | 0.00 | 0.00 | 0.00 | 0.00 |
| $Sr^{2+}$ | 0.00 | 0.00 | 0.00 | 0.00 | 0.00 |
| $Ba^{2+}$ | 0.99 | 2.92 | 0.00 | 0.00 | 0.00 |
| $Ge^{4+}$ | 0.00 | 0.00 | 0.00 | 0.00 | 0.00 |
| $Te^{4+}$ | 0.00 | 0.00 | 0.00 | 0.00 | 0.00 |
| $Bi^{3+}$ | 0.00 | 0.00 | 0.00 | 0.00 | 0.00 |
| $Al^{3+}$ | 0.00 | 0.00 | 0.00 | 0.00 | 0.00 |
| Total | 100.00 | 100.00 | 100.00 | 100.00 | 100.00 |
| $Si^{4+} + B^{3+}$ | 28.02 | 27.48 | 30.40 | 29.50 | 27.21 |
| $Si^{4+}/(Si^{4+} + B^{3+})$ | 0.336 | 0.336 | 0.304 | 0.336 | 0.336 |
| $La^{3+} + Gd^{3+} + Y^{3+} + Yb^{3+}$ | 33.80 | 33.15 | 33.15 | 31.38 | 36.68 |
| $Y^{3+}/(La^{3+} + Gd^{3+} + Y^{3+} + Yb^{3+})$ | 0.015 | 0.015 | 0.015 | 0.017 | 0.013 |
| $Ba^{2+}/(La^{3+} + Gd^{3+} + Y^{3+} + Yb^{3+})$ | 0.029 | 0.088 | 0.000 | 0.000 | 0.000 |
| $(Gd^{3+} + Y^{3+} + Yb^{3+})/(La^{3+} + Gd^{3+} + Y^{3+} + Yb^{3+})$ | 0.140 | 0.140 | 0.140 | 0.158 | 0.125 |
| $Y^{3+}/(Gd^{3+} + Y^{3+} + Yb^{3+})$ | 0.106 | 0.106 | 0.106 | 0.105 | 0.105 |
| $Ti^{4+} + Nb^{5+} + Ta^{5+} + W^{6+}$ | 29.93 | 29.34 | 29.34 | 31.48 | 29.06 |
| $(Zr^{4+} + Ti^{4+} + Nb^{5+} + Ta^{5+} + W^{6+})/Zr^{4+}$ | 6.422 | 6.423 | 6.423 | 6.418 | 6.422 |
| $Ti^{4+}/B^{3+}$ | 1.231 | 1.231 | 1.061 | 1.230 | 1.231 |
| $(Nb^{5+} + Ta^{5+})/Nb^{5+}$ | 1.000 | 1.000 | 1.000 | 1.000 | 1.000 |
| $La^{3+} + Gd^{3+} + Y^{3+} + Yb^{3+} + Zr^{4+} + Ti^{4+} + Nb^{5+} + Ta^{5+} + W^{6+} + Bi^{3+}$ | 69.25 | 67.90 | 67.90 | 68.67 | 71.10 |
| $(Ti^{4+} + Nb^{5+} + Ta^{5+} + W^{6+})/(La^{3+} + Gd^{3+} + Y^{3+} + Yb^{3+})$ | 0.886 | 0.885 | 0.885 | 1.003 | 0.792 |
| $(Nb^{5+} + Ta^{5+})/(Ti^{4+} + Nb^{5+} + Ta^{5+} + W^{6+})$ | 0.235 | 0.234 | 0.234 | 0.234 | 0.234 |
| $Gd^{3+} + Y^{3+} + Yb^{3+}$ | 4.72 | 4.63 | 4.63 | 4.96 | 4.58 |
| $Zn^{2+}/(Ti^{4+} + Nb^{5+} + Ta^{5+} + W^{6+})$ | 0.058 | 0.058 | 0.058 | 0.058 | 0.058 |
| $W^{6+}/(Ti^{4+} + Nb^{5+} + Ta^{5+} + W^{6+})$ | 0.000 | 0.000 | 0.000 | 0.000 | 0.000 |
| $Li^+ + Na^+ + K^+$ | 0.00 | 0.00 | 0.00 | 0.00 | 0.00 |
| $Mg^{2+} + Ca^{2+} + Sr^{2+} + Ba^{2+}$ | 0.99 | 2.92 | 0.00 | 0.00 | 0.00 |
| $(Si^{4+} + B^{3+})/(La^{3+} + Gd^{3+} + Y^{3+} + Yb^{3+})$ | 0.829 | 0.829 | 0.917 | 0.940 | 0.742 |
| $Zn^{2+}/(Ti^{4+} + Nb^{5+} + Ta^{5+} + W^{6+})$ | 0.058 | 0.058 | 0.058 | 0.058 | 0.058 |
| $(Mg^{2+} + Ca^{2+} + Sr^{2+} + Ba^{2+})/(Ti^{4+} + Nb^{5+} + Ta^{5+} + W^{6+})$ | 0.033 | 0.100 | 0.000 | 0.000 | 0.000 |
| nd | 2.048 | 2.039 | 2.043 | 2.054 | 2.051 |
| νd | 26.3 | 26.6 | 26.3 | 25.5 | 26.7 |
| nd − [2.540 − (0.02 × νd)] | 0.0340 | 0.0310 | 0.0289 | 0.0233 | 0.0451 |
| $P_{g,F}$ | 0.609 | 0.606 | 0.611 | 0.615 | 0.607 |
| $\Delta P_{g,F}$ | 0.008 | 0.006 | 0.010 | 0.012 | 0.007 |
| Liquidus temp.LT (° C.) | 1240 | 1270 | 1210 | 1230 | 1250 |
| Liquidus temp.LT/(nd − 1) (° C.) | 1183 | 1223 | 1160 | 1167 | 1189 |
| Glass transition temp. (° C.) | 737 | 743 | 725 | 724 | 731 |
| Specific gravity | 5.14 | 5.15 | 5.08 | 5.04 | 5.21 |
| λ70 (nm) | 477 | 473 | 519 | 587 | 489 |
| λ5 (nm) | 375 | 372 | 376 | 381 | 372 |
| Number density of crystals deposited(/kg) | 0 | 0 | 0 | 0 | 0 |

TABLE 2-continued

|  | No. | | | | |
|---|---|---|---|---|---|
|  | 46 Cation % | 47 Cation % | 48 Cation % | 49 Cation % | 50 Cation % |
| $Si^{4+}$ | 9.93 | 9.14 | 9.32 | 9.14 | 9.32 |
| $B^{3+}$ | 19.65 | 18.08 | 18.43 | 18.07 | 18.43 |
| $La^{3+}$ | 30.68 | 28.24 | 28.80 | 28.24 | 28.80 |
| $Gd^{3+}$ | 0.00 | 7.95 | 4.18 | 4.10 | 4.18 |
| $Y^{3+}$ | 0.52 | 0.48 | 0.49 | 0.48 | 0.49 |
| $Yb^{3+}$ | 0.00 | 0.00 | 0.00 | 0.00 | 0.00 |
| $Ti^{4+}$ | 24.17 | 22.25 | 22.68 | 22.25 | 22.68 |
| $Nb^{5+}$ | 7.40 | 6.81 | 6.95 | 6.81 | 6.95 |
| $Ta^{5+}$ | 0.00 | 0.00 | 0.00 | 0.00 | 0.00 |
| $W^{6+}$ | 0.00 | 0.00 | 0.00 | 0.00 | 0.00 |
| $Zr^{4+}$ | 5.82 | 5.36 | 5.46 | 5.36 | 5.46 |
| $Zn^{2+}$ | 1.83 | 1.69 | 1.72 | 1.69 | 1.72 |
| $Li^+$ | 0.00 | 0.00 | 0.00 | 0.00 | 0.00 |
| $Na^+$ | 0.00 | 0.00 | 0.00 | 0.00 | 0.00 |
| $K^+$ | 0.00 | 0.00 | 0.00 | 0.00 | 0.00 |
| $Mg^{2+}$ | 0.00 | 0.00 | 1.97 | 3.86 | 0.00 |
| $Ca^{2+}$ | 0.00 | 0.00 | 0.00 | 0.00 | 1.97 |
| $Sr^{2+}$ | 0.00 | 0.00 | 0.00 | 0.00 | 0.00 |
| $Ba^{2+}$ | 0.00 | 0.00 | 0.00 | 0.00 | 0.00 |
| $Ge^{4+}$ | 0.00 | 0.00 | 0.00 | 0.00 | 0.00 |
| $Te^{4+}$ | 0.00 | 0.00 | 0.00 | 0.00 | 0.00 |
| $Bi^{3+}$ | 0.00 | 0.00 | 0.00 | 0.00 | 0.00 |
| $Al^{3+}$ | 0.00 | 0.00 | 0.00 | 0.00 | 0.00 |
| Total | 100.00 | 100.00 | 100.00 | 100.00 | 100.00 |
| $Si^{4+} + B^{3+}$ | 29.58 | 27.22 | 27.75 | 27.21 | 27.75 |
| $Si^{4+}/(Si^{4+} + B^{3+})$ | 0.336 | 0.336 | 0.336 | 0.336 | 0.336 |
| $La^{3+} + Gd^{3+} + Y^{3+} + Yb^{3+}$ | 31.20 | 36.67 | 33.47 | 32.82 | 33.47 |
| $Y^{3+}/(La^{3+} + Gd^{3+} + Y^{3+} + Yb^{3+})$ | 0.017 | 0.013 | 0.015 | 0.015 | 0.015 |
| $Ba^{2+}/(La^{3+} + Gd^{3+} + Y^{3+} + Yb^{3+})$ | 0.000 | 0.000 | 0.000 | 0.000 | 0.000 |
| $(Gd^{3+} + Y^{3+} + Yb^{3+})/(La^{3+} + Gd^{3+} + Y^{3+} + Yb^{3+})$ | 0.017 | 0.230 | 0.140 | 0.140 | 0.140 |
| $Y^{3+}/(Gd^{3+} + Y^{3+} + Yb^{3+})$ | 1.000 | 0.057 | 0.105 | 0.105 | 0.105 |
| $Ti^{4+} + Nb^{5+} + Ta^{5+} + W^{6+}$ | 31.57 | 29.06 | 29.63 | 29.06 | 29.63 |
| $(Zr^{4+} + Ti^{4+} + Nb^{5+} + Ta^{5+} + W^{6+})/Zr^{4+}$ | 6.424 | 6.422 | 6.427 | 6.422 | 6.427 |
| $Ti^{4+}/B^{3+}$ | 1.230 | 1.231 | 1.231 | 1.231 | 1.231 |
| $(Nb^{5+} + Ta^{5+})/Nb^{5+}$ | 1.000 | 1.000 | 1.000 | 1.000 | 1.000 |
| $La^{3+} + Gd^{3+} + Y^{3+} + Yb^{3+} + Zr^{4+} + Ti^{4+} + Nb^{5+} + Ta^{5+} + W^{6+} + Bi^{3+}$ | 68.59 | 71.09 | 68.56 | 87.24 | 68.56 |
| $(Ti^{4+} + Nb^{5+} + Ta^{5+} + W^{6+})/(La^{3+} + Gd^{3+} + Y^{3+} + Yb^{3+})$ | 1.012 | 0.792 | 0.885 | 0.885 | 0.885 |
| $(Nb^{5+} + Ta^{5+})/(Ti^{4+} + Nb^{5+} + Ta^{5+} + W^{6+})$ | 0.234 | 0.234 | 0.235 | 0.234 | 0.235 |
| $Gd^{3+} + Y^{3+} + Yb^{3+}$ | 0.52 | 8.43 | 4.67 | 4.58 | 4.67 |
| $Zn^{2+}/(Ti^{4+} + Nb^{5+} + Ta^{5+} + W^{6+})$ | 0.058 | 0.058 | 0.058 | 0.058 | 0.058 |
| $W^{6+}/(Ti^{4+} + Nb^{5+} + Ta^{5+} + W^{6+})$ | 0.000 | 0.000 | 0.000 | 0.000 | 0.000 |
| $Li^+ + Na^+ + K^+$ | 0.00 | 0.00 | 0.00 | 0.00 | 0.00 |
| $Mg^{2+} + Ca^{2+} + Sr^{2+} + Ba^{2+}$ | 0.00 | 0.00 | 1.97 | 3.86 | 1.97 |
| $(Si^{4+} + B^{3+})/(La^{3+} + Gd^{3+} + Y^{3+} + Yb^{3+})$ | 0.948 | 0.742 | 0.829 | 0.829 | 0.829 |
| $Zn^{2+}/(Ti^{4+} + Nb^{5+} + Ta^{5+} + W^{6+})$ | 0.058 | 0.058 | 0.058 | 0.058 | 0.058 |
| $(Mg^{2+} + Ca^{2+} + Sr^{2+} + Ba^{2+})/(Ti^{4+} + Nb^{5+} + Ta^{5+} + W^{6+})$ | 0.000 | 0.000 | 0.066 | 0.133 | 0.066 |
| nd | 2.054 | 2.052 | 2.048 | 2.043 | 2.046 |
| vd | 25.4 | 26.7 | 26.3 | 26.5 | 26.3 |
| nd − [2.540 − (0.02 × vd)] | 0.0224 | 0.0455 | 0.0329 | 0.0321 | 0.0331 |
| $P_{g,F}$ | 0.613 | 0.613 | 0.609 | 0.609 | 0.609 |
| $\Delta P_{g,F}$ | 0.010 | 0.013 | 0.007 | 0.008 | 0.008 |
| Liquidus temp.LT (° C.) | 1250 | 1260 | 1240 | 1240 | 1250 |
| Liquidus temp.LT/(nd − 1) (° C.) | 1186 | 1198 | 1184 | 1189 | 1195 |
| Glass transition temp. (° C.) | 721 | 743 | 734 | 721 | 737 |
| Specific gravity | 4.96 | 5.28 | 5.11 | 5.09 | 5.10 |
| λ70 (nm) | 547 | 469 | 481 | 477 | 483 |
| λ5 (nm) | 379 | 372 | 376 | 376 | 374 |
| Number density of crystals deposited(/kg) | 0 | 0 | 0 | 0 | 0 |

|  | No. | | | | |
|---|---|---|---|---|---|
|  | 51 Cation % | 52 Cation % | 53 Cation % | 54 Cation % | 55 Cation % |
| $Si^{4+}$ | 9.32 | 9.32 | 9.14 | 9.32 | 9.14 |
| $B^{3+}$ | 18.43 | 18.43 | 18.07 | 18.43 | 18.07 |
| $La^{3+}$ | 28.80 | 28.80 | 28.24 | 28.80 | 28.24 |
| $Gd^{3+}$ | 4.18 | 4.18 | 4.10 | 4.18 | 4.10 |
| $Y^{3+}$ | 0.49 | 2.46 | 4.34 | 0.49 | 0.48 |
| $Yb^{3+}$ | 0.00 | 0.00 | 0.00 | 0.00 | 0.00 |
| $Ti^{4+}$ | 22.68 | 22.68 | 22.25 | 22.68 | 22.25 |
| $Nb^{5+}$ | 6.95 | 6.95 | 6.81 | 6.95 | 6.81 |
| $Ta^{5+}$ | 0.00 | 0.00 | 0.00 | 0.00 | 0.00 |
| $W^{6+}$ | 0.00 | 0.00 | 0.00 | 0.00 | 0.00 |

TABLE 2-continued

|  |  |  |  |  |  |
|---|---|---|---|---|---|
| $Zr^{4+}$ | 5.46 | 5.46 | 5.36 | 5.46 | 5.36 |
| $Zn^{2+}$ | 1.72 | 1.72 | 1.69 | 1.72 | 1.69 |
| $Li^+$ | 0.00 | 0.00 | 0.00 | 0.00 | 0.00 |
| $Na^+$ | 0.00 | 0.00 | 0.00 | 0.00 | 0.00 |
| $K^+$ | 0.00 | 0.00 | 0.00 | 0.00 | 0.00 |
| $Mg^{2+}$ | 0.00 | 0.00 | 0.00 | 0.00 | 0.00 |
| $Ca^{2+}$ | 0.00 | 0.00 | 0.00 | 0.00 | 0.00 |
| $Sr^{2+}$ | 1.97 | 0.00 | 0.00 | 0.00 | 0.00 |
| $Ba^{2+}$ | 0.00 | 0.00 | 0.00 | 0.00 | 0.00 |
| $Ge^{4+}$ | 0.00 | 0.00 | 0.00 | 0.00 | 0.00 |
| $Te^{4+}$ | 0.00 | 0.00 | 0.00 | 0.00 | 0.00 |
| $Bi^{3+}$ | 0.00 | 0.00 | 0.00 | 0.00 | 0.00 |
| $Al^{3+}$ | 0.00 | 0.00 | 0.00 | 1.97 | 3.86 |
| Total | 100.00 | 100.00 | 100.00 | 100.00 | 100.00 |
| $Si^{4+} + B^{3+}$ | 27.75 | 27.75 | 27.21 | 27.75 | 27.21 |
| $Si^{4+}/(Si^{4+} + B^{3+})$ | 0.336 | 0.336 | 0.336 | 0.336 | 0.336 |
| $La^{3+} + Gd^{3+} + Y^{3+} + Yb^{3+}$ | 33.47 | 35.44 | 36.68 | 33.47 | 32.82 |
| $Y^{3+}/(La^{3+} + Gd^{3+} + Y^{3+} + Yb^{3+})$ | 0.015 | 0.069 | 0.118 | 0.015 | 0.015 |
| $Ba^{2+}/(La^{3+} + Gd^{3+} + Y^{3+} + Yb^{3+})$ | 0.000 | 0.000 | 0.000 | 0.000 | 0.000 |
| $(Gd^{3+} + Y^{3+} + Yb^{3+})/(La^{3+} + Gd^{3+} + Y^{3+} + Yb^{3+})$ | 0.140 | 0.187 | 0.230 | 0.140 | 0.140 |
| $Y^{3+}/(Gd^{3+} + Y^{3+} + Yb^{3+})$ | 0.105 | 0.370 | 0.514 | 0.105 | 0.105 |
| $Ti^{4+} + Nb^{5+} + Ta^{5+} + W^{6+}$ | 29.63 | 29.63 | 29.06 | 29.63 | 29.06 |
| $(Zr^{4+} + Ti^{4+} + Nb^{5+} + Ta^{5+} + W^{6+})/Zr^{4+}$ | 6.427 | 6.427 | 6.422 | 6.427 | 6.422 |
| $Ti^{4+}/B^{3+}$ | 1.231 | 1.231 | 1.231 | 1.231 | 1.231 |
| $(Nb^{5+} + Ta^{5+})/Nb^{5+}$ | 1.000 | 1.000 | 1.000 | 1.000 | 1.000 |
| $La^{3+} + Gd^{3+} + Y^{3+} + Yb^{3+} + Zr^{4+} + Ti^{4+} + Nb^{5+} + Ta^{5+} + W^{6+} + Bi^{3+}$ | 68.56 | 70.53 | 71.10 | 68.56 | 67.24 |
| $(Ti^{4+} + Nb^{5+} + Ta^{5+} + W^{6+})/(La^{3+} + Gd^{3+} + Y^{3+} + Yb^{3+})$ | 0.885 | 0.836 | 0.792 | 0.885 | 0.885 |
| $(Nb^{5+} + Ta^{5+})/(Ti^{4+} + Nb^{5+} + Ta^{5+} + W^{6+})$ | 0.235 | 0.235 | 0.234 | 0.235 | 0.234 |
| $Gd^{3+} + Y^{3+} + Yb^{3+}$ | 4.67 | 6.64 | 8.44 | 4.67 | 4.58 |
| $Zn^{2+}/(Ti^{4+} + Nb^{5+} + Ta^{5+} + W^{6+})$ | 0.058 | 0.058 | 0.058 | 0.058 | 0.058 |
| $W^{6+}/(Ti^{4+} + Nb^{5+} + Ta^{5+} + W^{6+})$ | 0.000 | 0.000 | 0.000 | 0.000 | 0.000 |
| $Li^+ + Na^+ + K^+$ | 0.00 | 0.00 | 0.00 | 0.00 | 0.00 |
| $Mg^{2+} + Ca^{2+} + Sr^{2+} + Ba^{2+}$ | 1.97 | 0.00 | 0.00 | 0.00 | 0.00 |
| $(Si^{4+} + B^{3+})/(La^{3+} + Gd^{3+} + Y^{3+} + Yb^{3+})$ | 0.829 | 0.783 | 0.742 | 0.829 | 0.829 |
| $Zn^{2+}/(Ti^{4+} + Nb^{5+} + Ta^{5+} + W^{6+})$ | 0.058 | 0.058 | 0.058 | 0.058 | 0.058 |
| $(Mg^{2+} + Ca^{2+} + Sr^{2+} + Ba^{2+})/(Ti^{4+} + Nb^{5+} + Ta^{5+} + W^{6+})$ | 0.066 | 0.000 | 0.000 | 0.000 | 0.000 |
| nd | 2.044 | 2.051 | 2.052 | 2.045 | 2.039 |
| νd | 26.4 | 26.4 | 26.6 | 26.4 | 26.6 |
| nd − [2.540 − (0.02 × νd)] | 0.0318 | 0.0377 | 0.0441 | 0.0324 | 0.0301 |
| $P_{g,F}$ | 0.607 | 0.607 | 0.609 | 0.612 | 0.611 |
| $\Delta P_{g,F}$ | 0.006 | 0.006 | 0.009 | 0.012 | 0.010 |
| Liquidus temp.LT (° C.) | 1250 | 1240 | 1270 | 1270 | 1280 |
| Liquidus temp.LT/(nd − 1) (° C.) | 1197 | 1180 | 1208 | 1215 | 1232 |
| Glass transition temp. (° C.) | 738 | 741 | 739 | 735 | 728 |
| Specific gravity | 5.13 | 5.15 | 5.17 | 5.10 | 5.07 |
| λ70 (nm) | 480 | 478 | 476 | 490 | 500 |
| λ5 (nm) | 374 | 374 | 372 | 375 | 374 |
| Number density of crystals deposited(/kg) | 0 | 0 | 0 | 0 | 0 |

|  | No. | | | | |
|---|---|---|---|---|---|
|  | 56 Cation % | 57 Cation % | 58 Cation % | 59 Cation % | 60 Cation % |
| $Si^{4+}$ | 9.70 | 9.32 | 9.50 | 9.50 | 9.23 |
| $B^{3+}$ | 19.20 | 18.43 | 18.82 | 18.81 | 18.25 |
| $La^{3+}$ | 29.97 | 28.80 | 29.37 | 29.37 | 28.52 |
| $Gd^{3+}$ | 4.35 | 4.18 | 0.00 | 2.26 | 4.14 |
| $Y^{3+}$ | 0.51 | 0.49 | 0.00 | 0.50 | 0.49 |
| $Yb^{3+}$ | 0.00 | 0.00 | 4.76 | 2.01 | 0.00 |
| $Ti^{4+}$ | 23.61 | 22.68 | 23.14 | 23.14 | 22.46 |
| $Nb^{5+}$ | 7.23 | 6.95 | 7.09 | 7.09 | 6.88 |
| $Ta^{5+}$ | 0.00 | 0.00 | 0.00 | 0.00 | 0.00 |
| $W^{6+}$ | 0.00 | 0.00 | 0.00 | 0.00 | 0.00 |
| $Zr^{4+}$ | 3.64 | 7.43 | 5.57 | 5.57 | 5.41 |
| $Zn^{2+}$ | 1.79 | 1.72 | 1.75 | 1.75 | 4.62 |
| $Li^+$ | 0.00 | 0.00 | 0.00 | 0.00 | 0.00 |
| $Na^+$ | 0.00 | 0.00 | 0.00 | 0.00 | 0.00 |
| $K^+$ | 0.00 | 0.00 | 0.00 | 0.00 | 0.00 |
| $Mg^{2+}$ | 0.00 | 0.00 | 0.00 | 0.00 | 0.00 |
| $Ca^{2+}$ | 0.00 | 0.00 | 0.00 | 0.00 | 0.00 |
| $Sr^{2+}$ | 0.00 | 0.00 | 0.00 | 0.00 | 0.00 |
| $Ba^{2+}$ | 0.00 | 0.00 | 0.00 | 0.00 | 0.00 |
| $Ge^{4+}$ | 0.00 | 0.00 | 0.00 | 0.00 | 0.00 |

TABLE 2-continued

| | | | | | |
|---|---|---|---|---|---|
| $Te^{4+}$ | 0.00 | 0.00 | 0.00 | 0.00 | 0.00 |
| $Bi^{3+}$ | 0.00 | 0.00 | 0.00 | 0.00 | 0.00 |
| $Al^{3+}$ | 0.00 | 0.00 | 0.00 | 0.00 | 0.00 |
| Total | 100.00 | 100.00 | 100.00 | 100.00 | 100.00 |
| $Si^{4+} + B^{3+}$ | 28.90 | 27.75 | 28.32 | 28.31 | 27.48 |
| $Si^{4+}/(Si^{4+} + B^{3+})$ | 0.336 | 0.336 | 0.335 | 0.336 | 0.336 |
| $La^{3+} + Gd^{3+} + Y^{3+} + Yb^{3+}$ | 34.83 | 33.47 | 34.13 | 34.14 | 33.15 |
| $Y^{3+}/(La^{3+} + Gd^{3+} + Y^{3+} + Yb^{3+})$ | 0.015 | 0.015 | 0.000 | 0.015 | 0.015 |
| $Ba^{2+}/(La^{3+} + Gd^{3+} + Y^{3+} + Yb^{3+})$ | 0.000 | 0.000 | 0.000 | 0.000 | 0.000 |
| $(Gd^{3+} + Y^{3+} + Yb^{3+})/(La^{3+} + Gd^{3+} + Y^{3+} + Yb^{3+})$ | 0.140 | 0.140 | 0.139 | 0.140 | 0.140 |
| $Y^{3+}/(Gd^{3+} + Y^{3+} + Yb^{3+})$ | 0.105 | 0.105 | 0.000 | 0.105 | 0.106 |
| $Ti^{4+} + Nb^{5+} + Ta^{5+} + W^{6+}$ | 30.84 | 29.63 | 30.23 | 30.23 | 29.34 |
| $(Zr^{4+} + Ti^{4+} + Nb^{5+} + Ta^{5+} + W^{6+})/Zr^{4+}$ | 9.473 | 4.988 | 6.427 | 6.427 | 6.423 |
| $Ti^{4+}/B^{3+}$ | 1.230 | 1.231 | 1.230 | 1.230 | 1.231 |
| $(Nb^{5+} + Ta^{5+})/Nb^{5+}$ | 1.000 | 1.000 | 1.000 | 1.000 | 1.000 |
| $La^{3+} + Gd^{3+} + Y^{3+} + Yb^{3+} + Zr^{4+} + Ti^{4+} + Nb^{5+} + Ta^{5+} + W^{6+} + Bi^{3+}$ | 69.31 | 70.53 | 69.93 | 69.94 | 67.90 |
| $(Ti^{4+} + Nb^{5+} + Ta^{5+} + W^{6+})/(La^{3+} + Gd^{3+} + Y^{3+} + Yb^{3+})$ | 0.885 | 0.885 | 0.886 | 0.885 | 0.885 |
| $(Nb^{5+} + Ta^{5+})/(Ti^{4+} + Nb^{5+} + Ta^{5+} + W^{6+})$ | 0.234 | 0.235 | 0.235 | 0.235 | 0.234 |
| $Gd^{3+} + Y^{3+} + Yb^{3+}$ | 4.86 | 4.67 | 4.76 | 4.77 | 4.63 |
| $Zn^{2+}/(Ti^{4+} + Nb^{5+} + Ta^{5+} + W^{6+})$ | 0.058 | 0.058 | 0.058 | 0.058 | 0.157 |
| $W^{6+}/(Ti^{4+} + Nb^{5+} + Ta^{5+} + W^{6+})$ | 0.000 | 0.000 | 0.000 | 0.000 | 0.000 |
| $Li^{+} + Na^{+} + K^{+}$ | 0.00 | 0.00 | 0.00 | 0.00 | 0.00 |
| $Mg^{2+} + Ca^{2+} + Sr^{2+} + Ba^{2+}$ | 0.00 | 0.00 | 0.00 | 0.00 | 0.00 |
| $(Si^{4+} + B^{3+})/(La^{3+} + Gd^{3+} + Y^{3+} + Yb^{3+})$ | 0.830 | 0.829 | 0.830 | 0.829 | 0.829 |
| $Zn^{2+}/(Ti^{4+} + Nb^{5+} + Ta^{5+} + W^{6+})$ | 0.058 | 0.058 | 0.058 | 0.058 | 0.157 |
| $(Mg^{2+} + Ca^{2+} + Sr^{2+} + Ba^{2+})/(Ti^{4+} + Nb^{5+} + Ta^{5+} + W^{6+})$ | 0.000 | 0.000 | 0.000 | 0.000 | 0.000 |
| nd | 2.049 | 2.056 | 2.051 | 2.052 | 2.050 |
| νd | 26.1 | 26.2 | 26.1 | 26.1 | 26.2 |
| nd − [2.540 − (0.02 × νd)] | 0.0298 | 0.0393 | 0.0329 | 0.0334 | 0.0343 |
| $P_{g,F}$ | 0.612 | 0.609 | 0.611 | 0.610 | 0.607 |
| $\Delta P_{g,F}$ | 0.011 | 0.008 | 0.010 | 0.008 | 0.006 |
| Liquidus temp.LT (° C.) | 1240 | 1260 | 1240 | 1250 | 1250 |
| Liquidus temp.LT/(nd − 1) (° C.) | 1182 | 1193 | 1180 | 1188 | 1190 |
| Glass transition temp. (° C.) | 732 | 724 | 731 | 720 | 721 |
| Specific gravity | 5.12 | 5.15 | 5.21 | 5.16 | 5.15 |
| λ70 (nm) | 493 | 500 | 485 | 513 | 479 |
| λ5 (nm) | 377 | 377 | 377 | 376 | 375 |
| Number density of crystals deposited(/kg) | 0 | 0 | 0 | 0 | 0 |

| | No. | | | | |
|---|---|---|---|---|---|
| | 61 Cation % | 62 Cation % | 63 Cation % | 64 Cation % | 65 Cation % |
| $Si^{4+}$ | 9.32 | 9.14 | 9.14 | 9.91 | 5.49 |
| $B^{3+}$ | 18.43 | 18.07 | 18.07 | 16.79 | 18.82 |
| $La^{3+}$ | 28.80 | 28.24 | 31.56 | 27.71 | 29.37 |
| $Gd^{3+}$ | 4.18 | 4.10 | 4.58 | 4.02 | 4.26 |
| $Y^{3+}$ | 0.49 | 0.48 | 0.54 | 0.47 | 0.50 |
| $Yb^{3+}$ | 0.00 | 0.00 | 0.00 | 0.00 | 0.00 |
| $Ti^{4+}$ | 22.68 | 22.25 | 22.25 | 27.50 | 23.14 |
| $Nb^{5+}$ | 6.95 | 6.81 | 6.81 | 6.69 | 7.09 |
| $Ta^{5+}$ | 0.00 | 0.00 | 0.00 | 0.00 | 0.00 |
| $W^{6+}$ | 0.00 | 0.00 | 0.00 | 0.00 | 0.00 |
| $Zr^{4+}$ | 5.46 | 5.36 | 5.36 | 5.26 | 5.57 |
| $Zn^{2+}$ | 1.72 | 1.69 | 1.69 | 1.65 | 1.75 |
| $Li^{+}$ | 0.00 | 0.00 | 0.00 | 0.00 | 0.00 |
| $Na^{+}$ | 0.00 | 0.00 | 0.00 | 0.00 | 0.00 |
| $K^{+}$ | 0.00 | 0.00 | 0.00 | 0.00 | 0.00 |
| $Mg^{2+}$ | 0.00 | 0.00 | 0.00 | 0.00 | 0.00 |
| $Ca^{2+}$ | 0.00 | 0.00 | 0.00 | 0.00 | 0.00 |
| $Sr^{2+}$ | 0.00 | 0.00 | 0.00 | 0.00 | 0.00 |
| $Ba^{2+}$ | 0.00 | 0.00 | 0.00 | 0.00 | 0.00 |
| $Ge^{4+}$ | 1.97 | 3.86 | 0.00 | 0.00 | 4.01 |
| $Te^{4+}$ | 0.00 | 0.00 | 0.00 | 0.00 | 0.00 |
| $Bi^{3+}$ | 0.00 | 0.00 | 0.00 | 0.00 | 0.00 |
| $Al^{3+}$ | 0.00 | 0.00 | 0.00 | 0.00 | 0.00 |
| Total | 100.00 | 100.00 | 100.00 | 100.00 | 100.00 |
| $Si^{4+} + B^{3+}$ | 27.75 | 27.21 | 27.21 | 26.70 | 24.31 |
| $Si^{4+}/(Si^{4+} + B^{3+})$ | 0.336 | 0.336 | 0.336 | 0.371 | 0.226 |
| $La^{3+} + Gd^{3+} + Y^{3+} + Yb^{3+}$ | 33.47 | 32.82 | 36.68 | 32.20 | 34.13 |
| $Y^{3+}/(La^{3+} + Gd^{3+} + Y^{3+} + Yb^{3+})$ | 0.015 | 0.015 | 0.015 | 0.015 | 0.015 |
| $Ba^{2+}/(La^{3+} + Gd^{3+} + Y^{3+} + Yb^{3+})$ | 0.000 | 0.000 | 0.000 | 0.000 | 0.000 |
| $(Gd^{3+} + Y^{3+} + Yb^{3+})/(La^{3+} + Gd^{3+} + Y^{3+} + Yb^{3+})$ | 0.140 | 0.140 | 0.140 | 0.139 | 0.139 |
| $Y^{3+}/(Gd^{3+} + Y^{3+} + Yb^{3+})$ | 0.105 | 0.105 | 0.105 | 0.105 | 0.105 |
| $Ti^{4+} + Nb^{5+} + Ta^{5+} + W^{6+}$ | 29.63 | 29.06 | 29.06 | 34.19 | 30.23 |
| $(Zr^{4+} + Ti^{4+} + Nb^{5+} + Ta^{5+} + W^{6+})/Zr^{4+}$ | 6.427 | 6.422 | 6.422 | 7.500 | 6.427 |
| $Ti^{4+}/B^{3+}$ | 1.231 | 1.231 | 1.231 | 1.638 | 1.230 |

TABLE 2-continued

| | | | | | |
|---|---|---|---|---|---|
| $(Nb^{5+} + Ta^{5+})/Nb^{5+}$ | 1.000 | 1.000 | 1.000 | 1.000 | 1.000 |
| $La^{3+} + Gd^{3+} + Y^{3+} + Yb^{3+} + Zr^{4+} + Ti^{4+} + Nb^{5+} + Ta^{5+} + W^{6+} + Bi^{3+}$ | 88.58 | 67.24 | 71.10 | 71.65 | 69.93 |
| $(Ti^{4+} + Nb^{5+} + Ta^{5+} + W^{6+})/(La^{3+} + Gd^{3+} + Y^{3+} + Yb^{3+})$ | 0.885 | 0.885 | 0.792 | 1.062 | 0.886 |
| $(Nb^{5+} + Ta^{5+})/(Ti^{4+} + Nb^{5+} + Ta^{5+} + W^{6+})$ | 0.235 | 0.234 | 0.234 | 0.196 | 0.235 |
| $Gd^{3+} + Y^{3+} + Yb^{3+}$ | 4.67 | 4.58 | 5.12 | 4.49 | 4.76 |
| $Zn^{2+}/(Ti^{4+} + Nb^{5+} + Ta^{5+} + W^{6+})$ | 0.058 | 0.058 | 0.058 | 0.048 | 0.058 |
| $W^{6+}/(Ti^{4+} + Nb^{5+} + Ta^{5+} + W^{6+})$ | 0.000 | 0.000 | 0.000 | 0.000 | 0.000 |
| $Li^+ + Na^+ + K^+$ | 0.00 | 0.00 | 0.00 | 0.00 | 0.00 |
| $Mg^{2+} + Ca^{2+} + Sr^{2+} + Ba^{2+}$ | 0.00 | 0.00 | 0.00 | 0.00 | 0.00 |
| $(Si^{4+} + B^{3+})/(La^{3+} + Gd^{3+} + Y^{3+} + Yb^{3+})$ | 0.829 | 0.829 | 0.742 | 0.829 | 0.712 |
| $Zn^{2+}/(Ti^{4+} + Nb^{5+} + Ta^{5+} + W^{6+})$ | 0.058 | 0.058 | 0.058 | 0.048 | 0.058 |
| $(Mg^{2+} + Ca^{2+} + Sr^{2+} + Ba^{2+})/(Ti^{4+} + Nb^{5+} + Ta^{5+} + W^{6+})$ | 0.000 | 0.000 | 0.000 | 0.000 | 0.000 |
| nd | 2.046 | 2.039 | 2.051 | 2.074 | 2.061 |
| νd | 26.2 | 26.4 | 26.7 | 24.6 | 26.0 |
| nd − [2.540 − (0.02 × νd)] | 0.0303 | 0.0260 | 0.0446 | 0.0264 | 0.0411 |
| $P_{g,F}$ | 0.611 | 0.608 | 0.606 | 0.617 | 0.613 |
| $\Delta P_{g,F}$ | 0.010 | 0.007 | 0.006 | 0.013 | 0.012 |
| Liquidus temp.LT (° C.) | 1230 | 1220 | 1250 | 1230 | 1230 |
| Liquidus temp.LT/(nd − 1) (° C.) | 1176 | 1174 | 1189 | 1145 | 1159 |
| Glass transition temp. (° C.) | 733 | 714 | 748 | 724 | 724 |
| Specific gravity | 5.12 | 5.10 | 5.22 | 5.06 | 5.21 |
| λ70 (nm) | 511 | 500 | 471 | 490 | 498 |
| λ5 (nm) | 376 | 374 | 372 | 382 | 376 |
| Number density of crystals deposited(/kg) | 0 | 0 | 0 | 0 | 0 |

| | No. | | | | | | Literature 1 | |
|---|---|---|---|---|---|---|---|---|
| | 66 | 67 | 68 | 69 | 70 | B | 3 | 5 |
| | Cation % | Cation % | Cation % | Cation % | Cation % | Cation % | | |
| $Si^{4+}$ | 10.46 | 10.27 | 9.93 | 9.93 | 9.93 | 2.60 | 7.41 | 10.67 |
| $B^{3+}$ | 15.27 | 14.99 | 19.65 | 19.65 | 19.65 | 28.81 | 18.48 | 24.56 |
| $La^{3+}$ | 26.70 | 26.22 | 27.18 | 25.18 | 25.18 | 26.28 | 29.13 | 21.63 |
| $Gd^{3+}$ | 3.87 | 3.80 | 0.00 | 2.00 | 0.00 | 4.26 | 0.00 | 0.00 |
| $Y^{3+}$ | 0.46 | 0.45 | 4.02 | 4.02 | 4.02 | 0.50 | 14.02 | 0.00 |
| $Yb^{3+}$ | 0.00 | 0.00 | 0.00 | 0.00 | 2.00 | 0.00 | 0.00 | 8.14 |
| $Ti^{4+}$ | 30.14 | 29.60 | 24.17 | 24.17 | 24.17 | 23.14 | 30.96 | 24.07 |
| $Nb^{5+}$ | 6.44 | 6.33 | 7.40 | 7.40 | 7.40 | 7.09 | 0.00 | 4.02 |
| $Ta^{5+}$ | 0.00 | 0.00 | 0.00 | 0.00 | 0.00 | 0.00 | 0.00 | 0.00 |
| $W^{6+}$ | 0.00 | 1.79 | 0.00 | 0.00 | 0.00 | 0.00 | 0.00 | 6.91 |
| $Zr^{4+}$ | 5.07 | 4.98 | 5.82 | 5.82 | 5.82 | 5.57 | 0.00 | 0.00 |
| $Zn^{2+}$ | 1.59 | 1.57 | 1.83 | 1.83 | 1.83 | 1.75 | 0.00 | 0.00 |
| $Li^+$ | 0.00 | 0.00 | 0.00 | 0.00 | 0.00 | 0.00 | 0.00 | 0.00 |
| $Na^+$ | 0.00 | 0.00 | 0.00 | 0.00 | 0.00 | 0.00 | 0.00 | 0.00 |
| $K^+$ | 0.00 | 0.00 | 0.00 | 0.00 | 0.00 | 0.00 | 0.00 | 0.00 |
| $Mg^{2+}$ | 0.00 | 0.00 | 0.00 | 0.00 | 0.00 | 0.00 | 0.00 | 0.00 |
| $Ca^{2+}$ | 0.00 | 0.00 | 0.00 | 0.00 | 0.00 | 0.00 | 0.00 | 0.00 |
| $Sr^{2+}$ | 0.00 | 0.00 | 0.00 | 0.00 | 0.00 | 0.00 | 0.00 | 0.00 |
| $Ba^{2+}$ | 0.00 | 0.00 | 0.00 | 0.00 | 0.00 | 0.00 | 0.00 | 0.00 |
| $Ge^{4+}$ | 0.00 | 0.00 | 0.00 | 0.00 | 0.00 | 0.00 | 0.00 | 0.00 |
| $Te^{4+}$ | 0.00 | 0.00 | 0.00 | 0.00 | 0.00 | 0.00 | 0.00 | 0.00 |
| $Bi^{3+}$ | 0.00 | 0.00 | 0.00 | 0.00 | 0.00 | 0.00 | 0.00 | 0.00 |
| $Al^{3+}$ | 0.00 | 0.00 | 0.00 | 0.00 | 0.00 | 0.00 | 0.00 | 0.00 |
| Total | 100.00 | 100.00 | 100.00 | 100.00 | 100.00 | 100.00 | 100.00 | 100.00 |
| $Si^{4+} + B^{3+}$ | 25.73 | 25.26 | 29.58 | 29.58 | 29.58 | 31.41 | 25.89 | 35.23 |
| $Si^{4+}/(Si^{4+} + B^{3+})$ | 0.407 | 0.407 | 0.336 | 0.336 | 0.336 | 0.083 | 0.286 | 0.303 |
| $La^{3+} + Gd^{3+} + Y^{3+} + Yb^{3+}$ | 31.03 | 30.47 | 31.20 | 31.20 | 31.20 | 31.04 | 43.15 | 29.77 |
| $Y^{3+}/(La^{3+} + Gd^{3+} + Y^{3+} + Yb^{3+})$ | 0.015 | 0.015 | 0.129 | 0.129 | 0.129 | 0.016 | 0.325 | 0.000 |
| $Ba^{2+}/(La^{3+} + Gd^{3+} + Y^{3+} + Yb^{3+})$ | 0.000 | 0.000 | 0.000 | 0.000 | 0.000 | 0.000 | 0.000 | 0.000 |
| $(Gd^{3+} + Y^{3+} + Yb^{3+})/(La^{3+} + Gd^{3+} + Y^{3+} + Yb^{3+})$ | 0.140 | 0.139 | 0.129 | 0.193 | 0.193 | 0.153 | 0.325 | 0.273 |
| $Y^{3+}/(Gd^{3+} + Y^{3+} + Yb^{3+})$ | 0.106 | 0.106 | 1.000 | 0.668 | 0.608 | 0.105 | 1.000 | 0.000 |
| $Ti^{4+} + Nb^{5+} + Ta^{5+} + W^{6+}$ | 36.58 | 37.72 | 31.57 | 31.57 | 31.57 | 30.23 | 30.96 | 35.00 |
| $(Zr^{4+} + Ti^{4+} + Nb^{5+} + Ta^{5+} + W^{6+})/Zr^{4+}$ | 8.215 | 8.574 | 6.424 | 6.424 | 6.424 | 6.427 | — | — |
| $Ti^{4+}/B^{3+}$ | 1.974 | 1.975 | 1.230 | 1.230 | 1.230 | 0.803 | 1.675 | 0.980 |
| $(Nb^{5+} + Ta^{5+})/Nb^{5+}$ | 1.000 | 1.000 | 1.000 | 1.000 | 1.000 | 1.000 | — | 1.000 |
| $La^{3+} + Gd^{3+} + Y^{3+} + Yb^{3+} + Zr^{4+} + Ti^{4+} + Nb^{5+} + Ta^{5+} + W^{6+} + Bi^{3+}$ | 72.68 | 73.17 | 68.59 | 68.59 | 68.59 | 66.84 | 74.11 | 64.77 |
| $(Ti^{4+} + Nb^{5+} + Ta^{5+} + W^{6+})/(La^{3+} + Gd^{3+} + Y^{3+} + Yb^{3+})$ | 1.179 | 1.238 | 1.012 | 1.012 | 1.012 | 0.974 | 0.717 | 1.176 |
| $(Nb^{5+} + Ta^{5+})/(Ti^{4+} + Nb^{5+} + Ta^{5+} + W^{6+})$ | 0.176 | 0.168 | 0.234 | 0.234 | 0.234 | 0.235 | 0.000 | 0.115 |
| $Gd^{3+} + Y^{3+} + Yb^{3+}$ | 4.33 | 4.25 | 4.02 | 6.02 | 6.02 | 4.76 | 14.02 | 8.14 |
| $Zn^{2+}/(Ti^{4+} + Nb^{5+} + Ta^{5+} + W^{6+})$ | 0.043 | 0.042 | 0.058 | 0.058 | 0.058 | 0.058 | 0.000 | 0.000 |
| $W^{6+}/(Ti^{4+} + Nb^{5+} + Ta^{5+} + W^{6+})$ | 0.000 | 0.047 | 0.000 | 0.000 | 0.000 | 0.000 | 0.000 | 0.197 |
| $Li^+ + Na^+ + K^+$ | 0.00 | 0.00 | 0.00 | 0.00 | 0.00 | 0.00 | 0.00 | 0.00 |
| $Mg^{2+} + Ca^{2+} + Sr^{2+} + Ba^{2+}$ | 0.00 | 0.00 | 0.00 | 0.00 | 0.00 | 0.00 | 0.00 | 0.00 |
| $(Si^{4+} + B^{3+})/(La^{3+} + Gd^{3+} + Y^{3+} + Yb^{3+})$ | 0.829 | 0.829 | 0.948 | 0.948 | 0.948 | 1.012 | 0.600 | 1.183 |
| $Zn^{2+}/(Ti^{4+} + Nb^{5+} + Ta^{5+} + W^{6+})$ | 0.043 | 0.042 | 0.058 | 0.058 | 0.058 | 0.058 | 0.000 | 0.000 |
| $(Mg^{2+} + Ca^{2+} + Sr^{2+} + Ba^{2+})/(Ti^{4+} + Nb^{5+} + Ta^{5+} + W^{6+})$ | 0.000 | 0.000 | 0.000 | 0.000 | 0.000 | 0.000 | 0.000 | 0.000 |
| nd | 2.085 | 2.088 | 2.051 | 2.051 | 2.050 | — | — | — |

TABLE 2-continued

| | | | | | | | | |
|---|---|---|---|---|---|---|---|---|
| νd | 23.8 | 23.5 | 25.4 | 25.4 | 25.3 | — | — | — |
| nd − [2.540 − (0.02 × νd)] | 0.0212 | 0.0186 | 0.0189 | 0.0186 | 0.0170 | — | — | — |
| $P_{g,F}$ | 0.619 | 0.621 | 0.613 | 0.613 | 0.613 | — | — | — |
| $\Delta P_{g,F}$ | 0.014 | 0.015 | 0.010 | 0.010 | 0.010 | — | — | — |
| Liquidus temp.LT (° C.) | 1240 | 1240 | 1240 | 1240 | 1250 | — | — | — |
| Liquidus temp.LT/(nd − 1) (° C.) | 1143 | 1139 | 1139 | 1139 | 1139 | — | — | — |
| Glass transition temp. (° C.) | 732 | 728 | 720 | 720 | 719 | — | — | — |
| Specific gravity | 5.02 | 5.08 | 4.90 | 4.94 | 4.96 | — | — | — |
| λ70 (nm) | 493 | 499 | 640 | 635 | 688 | — | — | — |
| λ5 (nm) | 384 | 391 | 384 | 384 | 384 | — | — | — |
| Number density of crystals deposited(/kg) | 0 | 0 | 0 | 0 | 0 | 998 | Clouded | Clouded |

(Production Example 1 of Press-molding Glass Gob)

Next, press-molding glass gobs fmade of each of optical glasses of Nos. 1 to 70 were produced as follows.

First, glass starting materials were compounded so that each of the above-described glasses was able to be obtained, which were poured into a crucible made of platinum or a crucible made of platinum alloy and heated, molten, clarified and stirred to thereby give homogeneous molten glass. Next, the molten glass was flowed out at a certain flow rate from an outflow pipe, casted into a mold horizontally arranged on the lower side of the outflow pipe, and a glass plate having a certain thickness was molded. The molded glass plate was continuously drawn to the horizontal direction from the opening provided on the side surface of the mold, which was conveyed into an annealing furnace with a belt conveyer and gradually cooled.

The gradually cooled glass plate was cut off or cleaved off to thereby produce glass pieces, and these glass pieces were subjected to barrel polishing to thereby form press-molding glass gobs.

Press-molding glass gobs can also be obtained by arranging a cylindrical mold on the lower side of the outflow pipe, casting molten glass into the mold to thereby molding it into column-like glass, drawing out the glass from an opening at the bottom part of the mold vertically downward at a constant rate, then cooling it gradually, cutting or cleaving it to thereby form glass pieces, and subjecting these glass pieces to barrel polishing.

(Production Example 2 of Press-molding Glass Gob)

Molten glass was flowed out from the outflow pipe in the same way as in the production example 1 of a press-molding glass gob, the lower end of the flown-out molten glass was received with a molding mold, after that, the molding mold was lowered quickly to thereby cut off the molten glass flow by the surface tension, and a molten glass gob of a desired amount was obtained on the molding mold. In addition, gas was ejected from the molding mold to thereby give upward wind pressure to the glass, and, the glass was molded into a glass gob while floating the glass, which was taken out from the molding mold and annealed. Then the glass gob was subjected to barrel polishing to thereby form a press-molding glass gob.

(Production Example 1 of Optical Element Blank)

After uniformly applying a release agent made of boron nitride powder to the whole surface of respective press-molding glass gobs obtained in the production example 2 of a press-molding glass gob, the above gob was softened by heating, which was press-molded, with the result that a blank of various lenses such as a concave-meniscus lens, a convex-meniscus lens, a biconvex lens, a biconcave lens, a plano-convex lens or a plano-concave lens, or a prism was produced.

(Production Example 2 of Optical Element Blank)

A molten glass was produced in the same way as in the production example 1 of a press-molding glass gob, which was supplied to the molding surface of a lower mold obtained by uniformly applying a release agent of boron nitride powder, and the molten glass flow was cut with a cutting blade when the amount of the molten glass on the lower mold reached a desired amount.

The molten glass gob obtained on the lower mold in this way was pressed with the upper mold and the lower mold, with the result that a blank of various lenses such as a concave-meniscus lens, a convex-meniscus lens, a biconvex lens, a biconcave lens, a plano-convex lens or a plano-concave lens, or a prism was produced.

(Production Example 1 of Optical Element)

Each of blanks having been produced in production examples 1 and 2 of an optical element blank was annealed. The annealing was performed so that distortion inside the glass was reduced and optical properties such as a refractive index became desired values.

Next, each of blanks was ground and polished to thereby produce various lenses such as a concave-meniscus lens, a convex-meniscus lens, a biconvex lens, a biconcave lens, a plano-convex lens or a plano-concave lens, or a prism. The surface of the obtained optical element may be coated with an antireflective film.

(Production Example 2 of Optical Element)

In the same way as in the production example 1 of a press-molding glass gob, a glass plate and column-shaped glass were produced, and the obtained glass molded articles were annealed so that strain inside the glass was reduced and optical properties such as a refractive index became desired values.

Next, these glass molded articles were cut, ground and polished to thereby produce various lenses such as a concave-meniscus lens, a convex-meniscus lens, a biconvex lens, a biconcave lens, a plano-convex lens or a plano-concave lens, or a prism. The surface of the obtained optical element may be coated with an antireflective film.

Finally, the above-described respective aspects will be summarized.

An aspect provides optical glass that is oxide glass, containing $Si^{4+}$, $B^{3+}$, $La^{3+}$, $Ti^{4+}$, $Nb^{5+}$, and $Zr^{4+}$ as essential components; containing, denoted as cation %, $Si^{4+}$ and $B^{3+}$ of 5 to 55% in total, $La^{3+}$ of 10 to 50%, with a total content of $La^{3+}$, $Gd^{3+}$, $Y^{3+}$ and $Yb^{3+}$ being equal to or less than 70%, and $Ti^{4+}$, $Nb^{5+}$, $Ta^{5+}$ and $W^{6+}$ of 22 to 55% in total, with a content of $Ti^{4+}$ being equal to or less than 22%, wherein a cation ratio of a content of $Si^{4+}$ to the total content of $Si^{4+}$ and $B^{3+}[Si^{4+}/(Si^{4+}+B^{3+})]$ is equal to or less than 0.40; the total content of $La^{3+}$, $Gd^{3+}$, $Y^{3+}$, $Yb^{3+}$, $Zr^{4+}$, $Ti^{4+}$, $Nb^{5+}$, $Ta^{5+}$, $W^{6+}$ and $Bi^{3+}$ is equal to or more than 65%; a cation ratio of a content of $Y^{3+}$ to the total content of $La^{3+}$, $Gd^{3+}$, $Y^{3+}$ and $Yb^{3+}[Y^{3+}/(La^{3+}+Gd^{3+}+Y^{3+}+Yb^{3+})]$ is equal to or less than 0.12; a cation ratio of a content of $Ba^{2+}$ to the total content of $La^{3+}$, $Gd^{3+}$, $Y^{3+}$ and $Yb^{3+}[Ba^{2+}/(La^{3+}+Gd^{3+}+Y^{3+}+Yb^{3+})]$ is equal to or less than 0.40; a cation ratio of the total content of $Zr^{4+}$, $Ti^{4+}$, $Nb^{5+}$, $Ta^{5+}$ and $W^{6+}$ to a content of $Zr^{4+}[(Zr^{4+}+Ti^{4+}+Nb^{5+}+Ta^{5+}+W^{6+})/Zr^{4+}]$ is equal to or more than 2; a cation ratio of a content of $Ti^{4+}$ to a content of $B^{3+}(Ti^{4+}/B^{3+})$ is equal to or more than 0.85; and an Abbé number vd is in a range from 23 to 35, and a refractive index nd satisfies Expression (1) below, $$nd \geq 2.205-(0.0062 \times vd) \tag{1}$$

The above-described optical glass is high refractive index and low dispersion glass, and when compared with the conventional high refractive index and low dispersion glass, the optical glass can realize a higher refractive index while maintaining glass stability, at the same Abbé number vd.

From the viewpoint of achieving a high refractive index and low dispersion while maintaining glass stability, in the above-described optical glass, the cation ratio of the total content of $Nb^{5+}$ and $Ta^{5+}$ to the total content of $Ti^{4+}$, $Nb^{5+}$, $Ta^{5+}$ and $W^{6+}[(Nb^{5+}+Ta^{5+})/(Ti^{4+}+Nb^{5+}+Ta^{5+}+W^{6+})]$ is preferably equal to or less than 0.41.

The above-described optical glass preferably contains $Zr^{4+}$ in an amount equal to or more than 1 cation %. As the result, it is possible to enhance a refractive index, to improve chemical durability, to improve resistance to devitrification by the coexistence with $Ti^{4+}$, and to suppress the rise of liquidus temperature.

Another aspect provides optical glass that is oxide glass, containing $Si^{4+}$, $B^{3+}$, $La^{3+}$, $Ti^{4+}$, $Nb^{5+}$, and $Zr^{4+}$ as essential components; containing, denoted as cation %, $Si^{4+}$ and $B^{3+}$ of 5 to 55% in total, $La^{3+}$ of 10 to 50%, with a total content of $La^{3+}$, $Gd^{3+}$, $Y^{3+}$ and $Yb^{3+}$ being equal to or less than 70%, $Ti^{4+}$, $Nb^{5+}$, $Ta^{5+}$ and $W^{6+}$ of 23 to 70% in total, with a content of $Ti^{4+}$ being more than 22%, wherein a cation ratio of a content of $Y^{3+}$ to the total content of $La^{3+}$, $Gd^{3+}$, $Y^{3+}$ and $Yb^{3+}[Y^{3+}/(La^{3+}+Gd^{3+}+Y^{3+}+Yb^{3+})]$ is equal to or less than 0.14; a cation ratio of a content of $Ba^{2+}$ to the total content of $La^{3+}$, $Gd^{3+}$, $Y^{3+}$ and $Yb^{3+}[Ba^{2+}/(La^{3+}+Gd^{3+}+Y^{3+}+Yb^3)]$ is equal to or less than 0.40; a cation ratio of the total content of $Zr^{4+}$, $Ti^{4+}$, $Nb^{5+}$, $Ta^{5+}$ and $W^{6+}$ to a content of $Zr^{4+}[(Zr^{4+}+Ti^{4+}+Nb^{5+}+Ta^{5+}+W^{6+})/Zr^{4+}]$ is equal to or more than 2; a cation ratio of a content of $Ti^{4+}$ to a content of $B^{3+}(Ti^{4+}/B^{3+})$ is equal to or more than 0.85; and an Abbé number vd is in a range from equal to or more than 18 to less than 35, and a refractive index nd satisfies Expression (2) below, $$nd \geq 2.540-(0.02 \times vd) \tag{2}$$

The above-described optical glass is also high refractive index and low dispersion glass, and when compared with the conventional high refractive index and low dispersion glass, the optical glass can realize a higher refractive index while maintaining glass stability, at the same Abbé number vd.

According to a further aspect, a press-molding glass gob, an optical element blank and an optical element, comprised of each of the optical glasses according to the above-described respective aspects, are provided.

According to an aspect of the present invention, optical glass which can be stably supplied, and which has excellent glass stability and is provided with a high refractive index and a low dispersion property can be provided, and furthermore, a press-molding glass gob, an optical element blank and an optical element can be provided using the optical glass.

The implementation modes that have been disclosed herein are but examples in all regards and are not to be considered as limitations. The scope of the present invention is disclosed by the scope of the claims and not by the description given above. All modifications falling within the meaning and scope that are equivalent to the scope of the claims are intended to be covered.

For example, the optical glass according to an aspect of the present invention can be produced by performing composition adjustment described in the description on the above-described exemplified glass composition.

Furthermore, it is also possible to arbitrarily combine two or more items described as an exemplification or a preferable range in the description.

The present invention is useful in manufacturing fields of various optical elements such as optical elements for imaging optical systems and projection optical systems.

The invention claimed is:

1. Optical glass, which is oxide glass:
   comprising $Si^{4+}$, $B^{3+}$, $La^{3+}$, $Ti^{4+}$, $Nb^{5+}$, and $Zr^{4+}$ as essential components;
   comprising, denoted as cation %;
   $Si^{4+}$ and $B^{3+}$ of 5 to 35% in total,
   $La^{3+}$ of 10 to 50%, with a total content of $La^{3+}$, $Gd^{3+}$, $Y^{3+}$ and $Yb^{3+}$ being from 11% to 70%, and
   $Ti^{4+}$, $Nb^{5+}$, $Ta^{5+}$ and $W^{6+}$ of 22 to 55% in total, with a content of $Ti^{4+}$ being from 10% to 22%, wherein
   a cation ratio of a content of $Si^{4+}$ to a total content of $Si^{4+}$ and $B^{3+}$, $Si^{4+}/(Si^{4+}+B^{3+})$, is from 0.10 to 0.40;
   a total content of $La^{3+}$, $Gd^{3+}$, $Y^{3+}$, $Zr^{4+}$, $Ti^{4+}$, $Nb^{4+}$, $Ta^{5+}$, $W^{6+}$ and $Bi^3$ $^+$ is equal to or more than 65%;
   a cation ratio of a content of $Y^{3+}$ to a total content of $La^{3+}$, $Gd^{3+}$, $Y^{3+}$ and $Yb^3$ $^+$, $Y^{3+}/(La^{3+}+Gd^{3+}+Y^{3+}+Yb^{3+})$, is equal to or less than 0.12;
   a cation ratio of a content of $Ba^{2+}$ to a total content of $La^{3+}$, $Gd^{3+}$, $Y^{3+}$ and $Yb^{3+}$, $Ba^{2+}/(La^{3+}+Gd^{3+}+Y^{3+}+Yb^{3+})$, is equal to or less than 0.40;
   a cation ratio of a total content of $Zr^{4+}$, $Ti^{4+}$, $Nb^{5+}$, $Ta^{5+}$ and $W^{6+}$ to a content of $Zr^{4+}$, $(Zr^{4+}Ti^{4+}+Ta^{5+W6+})/Zr^{4+}$, is equal to or more than 2;
   a cation ratio of a content of $Ti^{4+}$ to a content of $B^{3+}$, $Ti^{4+}/B^{3+}$, is equal to or more than 0. 85; and
   an Abbé number vd is in a range from 23 to 35, and a refractive index nd satisfies Expression (1) below, $$nd \geq 2.205-(0.0062 \times vd) \tag{1}$$

2. The optical glass according to claim 1, wherein a cation ratio of a total content of $Nb^{5+}$ and $Ta^{5+}$ to a total content of $Ti^4$ $^+$, $Nb^{5+}$, $Ta^{5+}$ and $W^{6+}$, $(Nb^{5+}+Ta^{5+})/(Ti^{4+}+Nb^{5+}Ta^{5+}+W^{6+})$, is from 0.10 to 0.41.

3. The optical glass according to claim 1, which comprises $Zr^{4+}$ in an amount equal to or more than 1 cation %.

4. A press-molding glass gob, which is comprised of the optical glass according to claim 1.

5. An optical element blank, which is comprised of the optical glass according claim 1.

6. An optical element, which is comprised of the optical glass according to claim 1.

* * * * *